US005529344A

United States Patent [19]
Yasui et al.

[11] Patent Number: 5,529,344
[45] Date of Patent: Jun. 25, 1996

[54] SEAT BELT DEVICE FOR AUTOMOBILE

[75] Inventors: Shinichi Yasui, Nagoya; Motonobu Sugiura, Okazaki; Makoto Isomura, Seto; Yasunori Suezawa, Toyota; Takuya Nezaki, Mizunami; Toru Ito, Toyota; Shuji Yamada, Susono, all of Japan

[73] Assignee: Toyota Jidosha Kabushiki Kaisha, Japan

[21] Appl. No.: 352,689

[22] Filed: Nov. 30, 1994

[30] Foreign Application Priority Data

Nov. 30, 1993 [JP] Japan .................................. 5-323344
Dec. 21, 1993 [JP] Japan .................................. 5-344676

[51] Int. Cl.⁶ ............................................. B60R 22/00
[52] U.S. Cl. ............................................. 280/808
[58] Field of Search ................................. 280/808

[56] References Cited

U.S. PATENT DOCUMENTS

| | | | |
|---|---|---|---|
| 3,779,595 | 12/1973 | Suzuki et al. | 296/187 |
| 4,480,853 | 11/1984 | Ando et al. | 280/808 |
| 4,642,853 | 2/1987 | Plesniarski et al. | 280/808 |
| 4,645,232 | 2/1987 | Hamada et al. | 280/808 |
| 4,955,639 | 9/1990 | Yamamoto | 280/808 |
| 5,096,224 | 3/1992 | Murakami et al. | 280/808 |
| 5,163,730 | 11/1992 | Welch | 296/189 |

FOREIGN PATENT DOCUMENTS

| | | |
|---|---|---|
| 61-196156 | 12/1986 | Japan . |
| 234368 | 3/1990 | Japan . |
| 2237873 | 3/1990 | Japan . |
| 413453 | 2/1992 | Japan . |
| 4130568 | 11/1992 | Japan . |

Primary Examiner—Kenneth R. Rice
Attorney, Agent, or Firm—Cushman Darby & Cushman

[57] ABSTRACT

There is disclosed a seat belt device for an automobile including a seat belt anchor mounted on a center pillar for the automobile and composed of a plurality of parts, and a seat belt slidably supported by the seat belt anchor. A displacement permission space is defined between an anchor plate of the seat belt anchor and the center pillar, and a spacer constituted by a metallic bellows is disposed as an energy absorber in the displacement permission space.

42 Claims, 50 Drawing Sheets

SEAT BELT DEVICE FOR AUTOMOBILE

BACKGROUND OF THE INVENTION

1. Field of the Invention

This invention relates to a seat belt device for an automobile, and more particularly, to a seat belt device including a seat belt anchor mounted on a center pillar and composed of a plurality of parts, and a seat belt slidably supported by the seat belt anchor.

2. Description of the Related Art

A pillar structure for a vehicle body proposed in Japanese Patent Public Disclosure (KOKAI) No. 2-237873 has a seat belt anchor portion comprising a seat belt reinforcing panel disposed on the inside of a center pillar composed of an outer panel and an inner panel, an outer panel reinforcing panel connected to the inside of the outer panel, a contact surface formed by a part of the outer panel reinforcing panel so as to be spaced from the outer panel, and a seat belt support member mounted on a connection portion between the contact surface and the seat belt reinforcing panel. According to the pillar structure described above, the amount of projection of the seat belt anchor portion into a compartment can be reduced.

The center pillar is formed to have high rigidity in order to ensure sufficient strength to withstand a load applied to a vehicle body. The seat belt anchor portion provided on the center pillar also has high rigidity. Therefore, in case that a load larger than the load applied at the time of normal traveling, i.e., an impact load in case of a collision is applied to the vehicle body, when the head of an occupant is struck against the anchor portion, there is a possibility of applying a large amount of impact energy to the head of the occupant. However, it is difficult to relieve the impact load only by reducing the amount of projection of the anchor portion into the compartment like the pillar structure described above.

SUMMARY OF THE INVENTION

It is an object of the present invention to provide a seat belt device for an automobile, which can ensure the safety of an occupant when a large load such as an impact load is applied.

According to the present invention, there is provided a seat belt device for an automobile including a seat belt anchor mounted on a center pillar of the automobile and composed of a plurality of parts, and a seat belt slidably supported by the seat belt anchor. The seat belt device according to the present invention comprises means for mounting one of the plurality of parts of the seat belt anchor on the center pillar, a displacement permission space for permitting at least one selected from at least one of the plurality of parts of the seat belt anchor and the mounting means to displace outward of a compartment in order to absorb energy, and energy absorbing means disposed in the displacement permission space.

In one aspect of the present invention, the displacement permission space includes at least one of a space between at least two of the plurality of parts of the seat belt anchor and a space between at least one of the plurality of parts of the seat belt anchor and the center pillar.

In another aspect of the present invention, the displacement permission space is defined so as to permit at least one selected from the part mounted by the mounting means and the mounting means to displace outward of the compartment, and one of the part and the mounting means is deformed within the displacement permission space to absorb energy.

The displacement permission space can be determined in the range of 10 to 30 mm. Preferably, a plurality of displacement permission spaces and a plurality of energy absorbing means are respectively provided.

The plurality of parts of the seat belt anchor may include an anchor plate for supporting a seat belt, a bolt for fixing the anchor plate, a nut for screwing the bolt, a cap mounted on the anchor plate, a rail fixed to a center pillar, a slider movable along the rail, and other parts according to a mode of energy absorption.

The seat belt anchor can be constituted to be of a height adjustable type, in addition to a height fixed type. In the seat belt anchor of the height adjustable type, the anchor plate is mounted on the slider, and the slider is moved along the rail. The present invention provides various modes of enabling the absorption of energy in any case of the seat belt anchor of the fixed type and that of the adjustable type.

In case that a load larger than the load applied at the time of normal traveling is applied to an automobile, when the head and other parts of an occupant are struck against the seat belt device, the energy absorbing means is displaced or deformed within the displacement permission space to absorb the energy. Accordingly, the impact to the occupant can be relieved.

In case that the plurality of displacement permission spaces and the plurality of energy absorbing means are respectively provided, the impact energy can be effectively absorbed in a small space.

In case that the height of the seat belt anchor can be adjusted, since the seat belt anchor of this type is provided with the rail and the slider as a peculiar structure, the displacement permission space can be provided in relation to the rail or the slider in such a state that the length of projection of the seat belt device into the compartment is held as small as possible.

BRIEF DESCRIPTION OF THE DRAWINGS

The foregoing and other objects and features of the present invention will become apparent from the following description of preferred embodiments of the invention with reference to the accompanying drawings, in which:

FIG. 25 is a sectional view showing a slider and a nut as an embodiment for use in the seat belt device for the automobile shown in FIG. 22, in which

FIG. 26 is a sectional view showing a slider and a nut as another embodiment for use in the seat belt device for the automobile shown in FIG. 22, in which

FIG. 41 shows the energy absorption part shown in FIG. 40, in which

FIG. 43 is a sectional view taken along a line 43—43 in FIG. 42, in which

FIG. 44 shows the different structure of a center pillar and a rail of the seat belt device for the automobile shown in FIG. 42, in which

FIG. 56 shows a seat belt device for an automobile as a yet further embodiment according to the present invention, in which

FIG. 57 Shows a seat belt device for an automobile as a yet further embodiment according to the present invention, in which

DETAILED DESCRIPTION OF THE PREFERRED EMBODIMENTS

Figure 1:
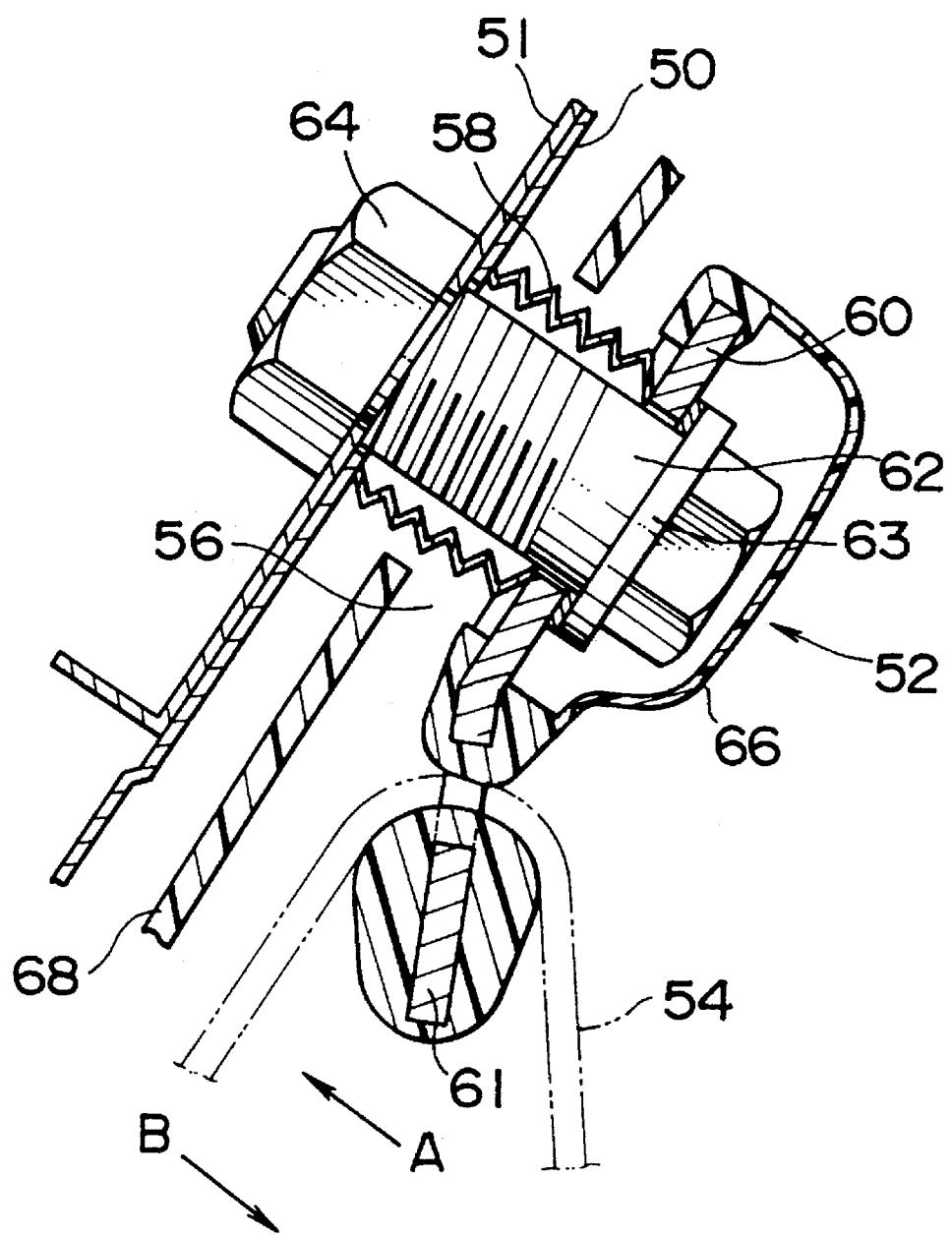
FIG. 1 is a sectional view taken along a substantially vertical plane of a seat belt device for an automobile as an embodiment according to the present invention.

According to the present invention, there is provided a seat belt device for an automobile including a seat belt anchor 52 mounted on a center pillar 50 having a structure well known per se for the automobile and composed of a plurality of parts, and a seat belt 54 slidably supported by the seat belt anchor 52, as shown in FIG. 1. The seat belt device of the present invention comprises a space 56 defined between at least two of the plurality of parts of the seat belt anchor 52 or between at least one of the plurality of parts and the center pillar 50 to permit the displacement for the absorption of energy, and a means 58 displaced within the space 56 to absorb the energy.

In an embodiment shown in FIG. 1, the seat belt anchor 52 includes an anchor plate 60 allowing for the piercing of the seat belt 54 to support the same, a bolt 62 inserted into a hole of the center pillar 50 for fixing the anchor plate 60, a nut 64 welded to a reinforcing panel 51 of the center pillar 50 to screw the bolt 62, and a resin-made cap 66 mounted on the anchor plate 60. The center pillar 50 is covered with a garnish 68.

The displacement permission space 56 is defined between the anchor plate 60 and the center pillar 50, and the energy absorbing means 58 is constituted by a spacer composed of a metallic bellows. Otherwise, the energy absorbing means 58 can be constituted by a resin-made spacer. The spacer 58 presses the anchor plate 60 against a step portion 63 of the bolt 62 to hold the anchor plate 60 for use. However, when a load outward of a compartment in the direction indicated by an arrow A is applied to a support portion 61 of the anchor plate 60, the spacer 58 is deformed, and as a result, the energy due to the load described above is absorbed by the deformation of the spacer.

Figure 2:
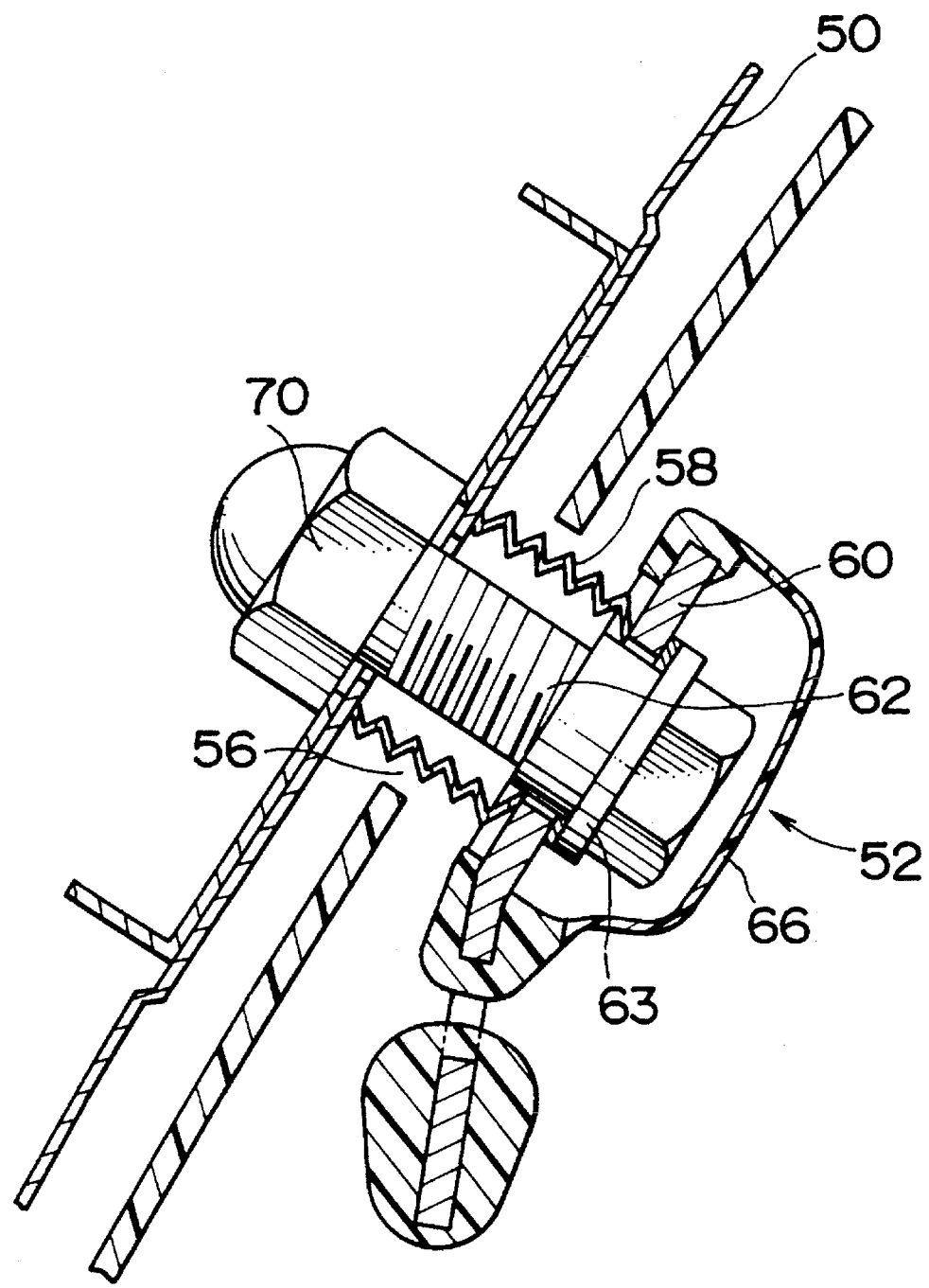
FIG. 2 is a sectional view taken along a substantially vertical plane of a seat belt device for an automobile as another embodiment according to the present invention.
Figure 3:
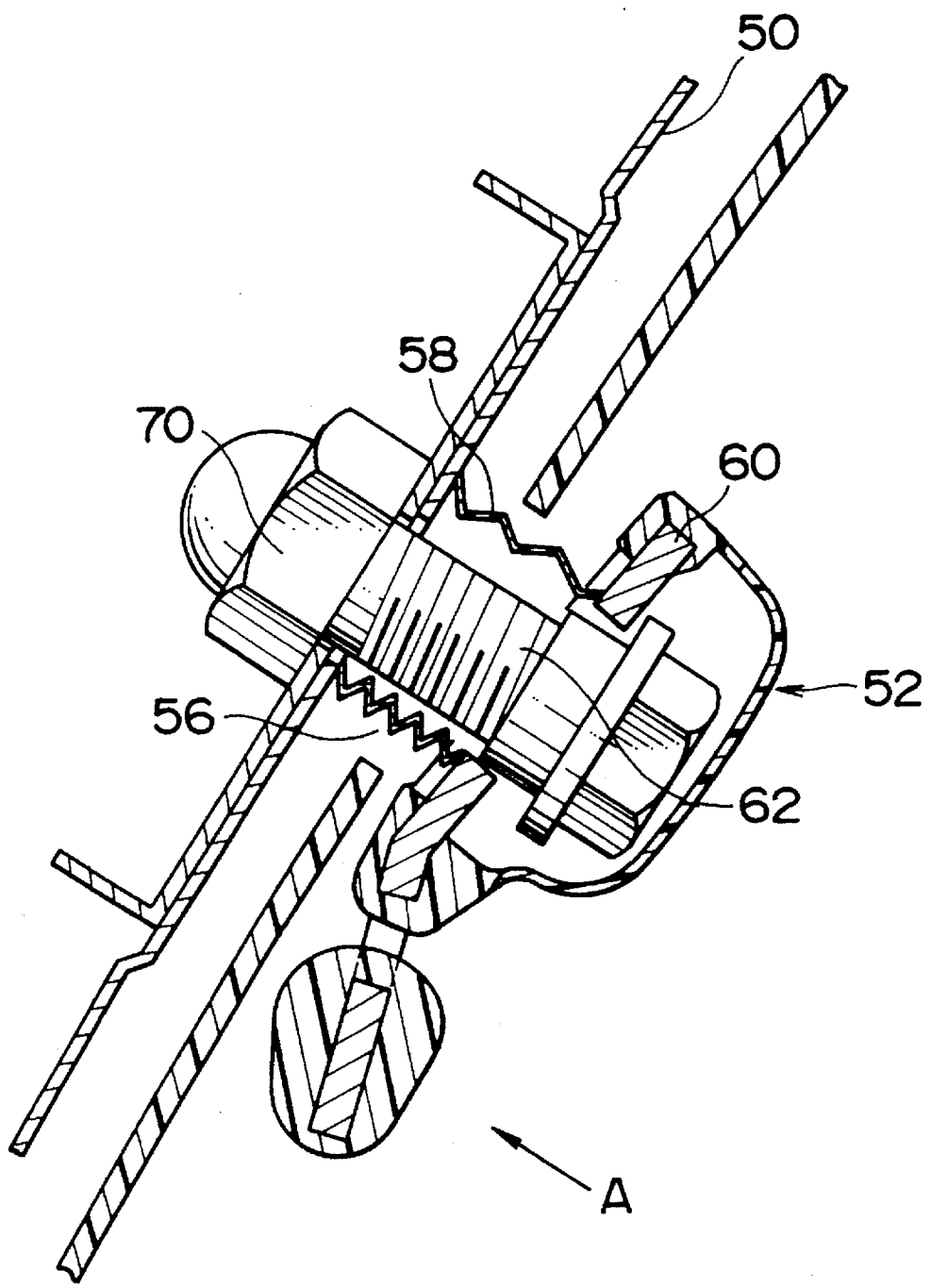
FIG. 3 is a sectional view showing the operation of the seat belt device for the automobile shown in FIG. 2.

In an embodiment shown in FIGS. 2 and 3, a capped nut 70 is used instead of the nut 64. Thanks to the capped nut, since the screwing amount of the bolt 62 can be regulated, the distance from the center pillar 50 to the step portion 63 of the bolt can be always held constant. Accordingly, the embodiment using the capped nut ensures that the spacer 58 constituting the energy absorbing means is deformed by a predetermined amount by the application of a predetermined load. In the embodiment shown in FIG. 1, the similar effect to that of the embodiment shown in FIGS. 2 and 3 can be obtained by butting a shoulder portion of the bolt 62 against the reinforcing panel 51. FIG. 3 shows the state of the spacer 58 deformed by a load in the direction indicated by an arrow A. The other constitution of the embodiment shown in FIG. 3 is similar to that of the embodiment shown in FIG. 2.

A plurality of displacement permission spaces and a plurality of energy absorbing means can be respectively provided. A combination of the plurality of displacement permission spaces and the absorbing means corresponding to each displacement permission space can be selectively obtained by selecting a plurality of displacement permission spaces and a plurality of absorbing means among the embodiments described before or later. For example, when the displacement permission space 56 and the absorbing means 58 shown in FIG. 1 are combined with a displacement permission space 76 and an absorbing means 78 shown in FIG. 4, the absorbing means 78, 58 can be deformed respectively by the displacement of the cap 66 and that of the anchor plate 60.

The energy absorbing means has rigidity against a load inward of a compartment, and rigidity against a load outward of the compartment and lower than the rigidity described above. In other words, the energy absorbing means is mounted such that it is hard to deform by the load inward of the compartment, while being easy to deform by the load outward of the compartment. For example, in the embodiment shown in FIG. 1, the spacer 58 constituting the absorbing means is mounted on the outside of the anchor plate 60. Therefore, even though a load inward of the compartment in the direction indicated by an arrow B is applied to the anchor plate 60, the spacer 58 is not deformed substantially and exerts infinite rigidity as it were. On the other hand, in case that a load outward of the compartment in the direction indicated by an arrow A is applied to the anchor plate 60, when the load exceeds a predetermined value, the absorbing means 58 is deformed.

According to the mode described above, it is possible to attain an original function of a seat belt device to the effect that an occupant is prevented from moving in the direction of pulling the seat belt due to the rigidity against the inward load. Further, the energy can be absorbed more speedily by the low outward rigidity to reduce an impact to the occupant.

In embodiments shown in FIGS. 4 through 8, a seat belt anchor 72 includes the anchor plate 60 for supporting the seat belt 54, a bolt 80 for fixing the anchor plate 60 and having a short head 81, and the cap 66 mounted on the anchor plate 60. Similarly to the embodiment shown in FIG. 1, the bolt 80 is fixed to the center pillar. A displacement permission space 76 is defined between the head 81 of the bolt 80 and the cap 66, and an absorbing means is disposed in the displacement permission space 76 or provided on the cap.

Figure 4:
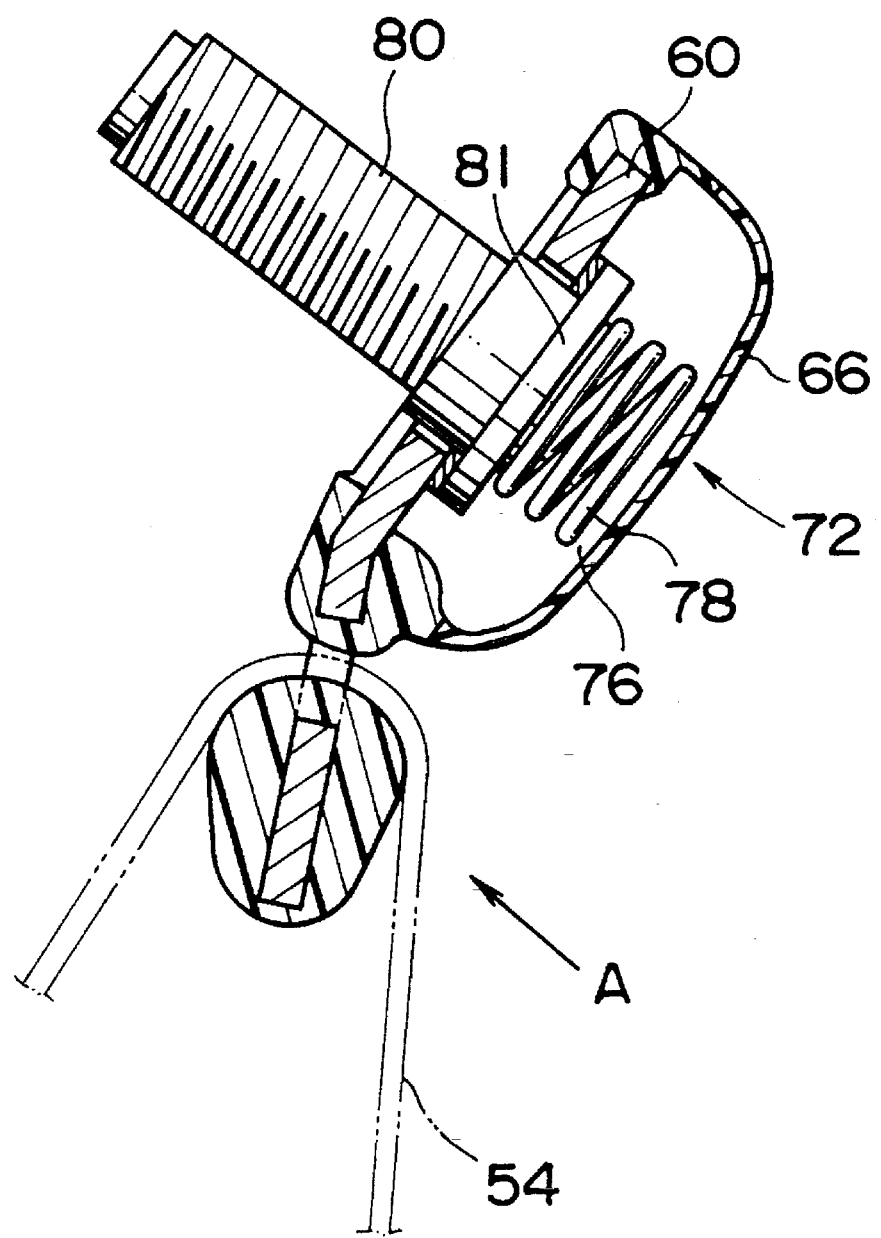
FIG. 4 is a sectional view taken along a substantially vertical plane of a seat belt device for an automobile as a further embodiment according to the present invention, and showing the state of the seat belt device prior to mounting.

In the embodiment shown in FIG. 4, as the result of shortening the head 81 of the bolt 80, the displacement permission space 76 of about 10 mm is defined between the head 81 and the cap 66. An absorbing means 78 is constituted by a coil spring which is disposed in the displacement permission space 76 and fixed to the head 81 of the bolt 80 by means of adhesion or welding. In the embodiment shown in FIG. 5, an absorbing means 82 is constituted by a metallic bellows which is disposed in the displacement permission space 76 and fixed to the head 81 of the bolt 80 by means of adhesion or welding. In the embodiment shown in FIG. 6, an absorbing means 84 is constituted by a bent plate spring steel which is disposed in the displacement permission space 76 and fixed to the head 81 of the bolt 80 by means of adhesion or welding. In the embodiment shown in FIG. 6, a steel or other metallic plate material having a small thickness can be used instead of the spring steel.

Figure 7:
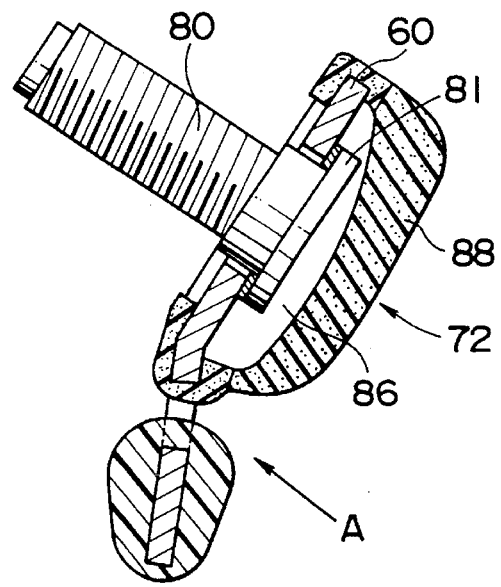
FIG. 7 is a sectional view taken along a substantially vertical plane of a seat belt device for an automobile as a yet further embodiment according to the present invention, and showing the state of the seat belt device prior to mounting.
Figure 8:
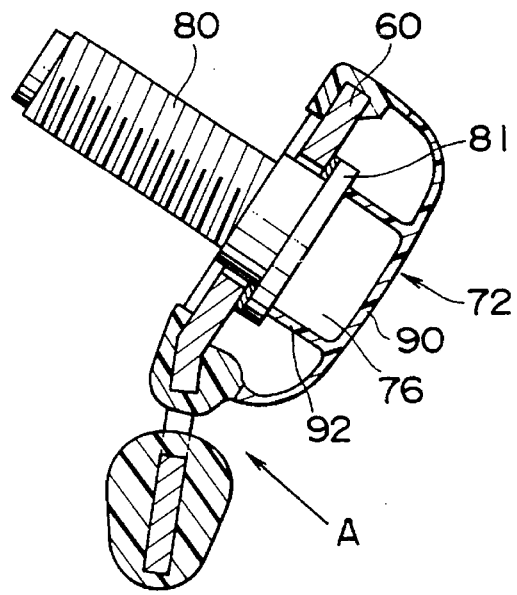
FIG. 8 is a sectional view taken along a substantially vertical plane of a seat belt device for an automobile as a yet further embodiment according to the present invention, and showing the state of the seat belt device prior to mounting.

In the embodiment shown in FIG. 7, no energy absorbing means is provided in a displacement permission space 86. However, the thickness of a cap 88 itself is increased, and the cap 88 is formed by soft resin such as urethane rubber to constitute an absorbing means. Further, in the embodiment shown in FIG. 8, a rib 92 is provided on a resin-made cap 90 to constitute an absorbing means. The rib 92 is disposed in the displacement permission space 76 and butted against the head 81 of the bolt 80.

Figure 5:
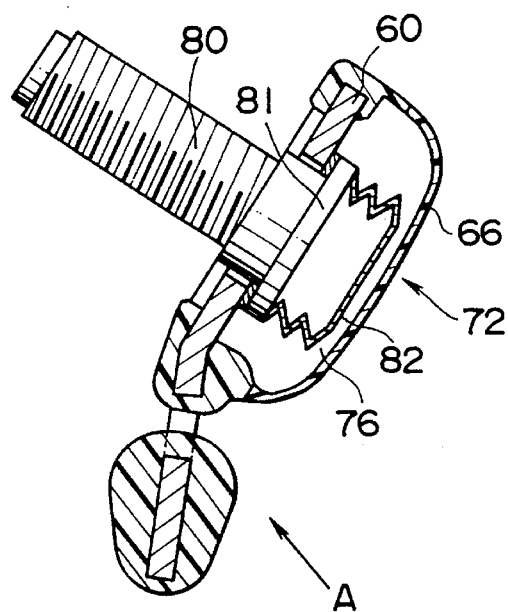
FIG. 5 is a sectional view taken along a substantially vertical plane of a seat belt device for an automobile as a still further embodiment according to the present invention, and showing the state of the seat belt device prior to mounting.
Figure 6:
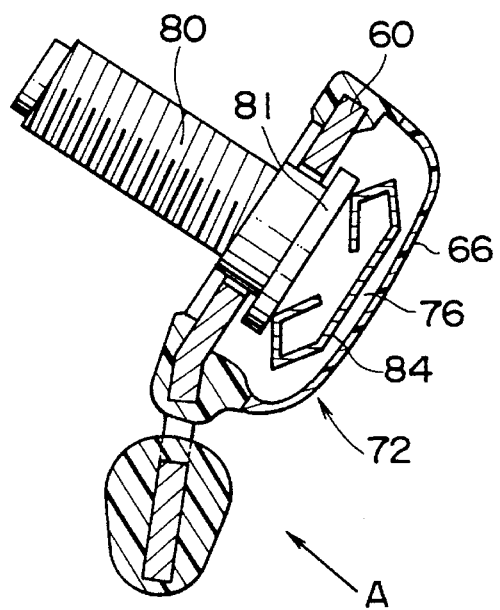
FIG. 6 is a sectional view taken along a substantially vertical plane of a seat belt device for an automobile as a yet further embodiment according to the present invention, and showing the state of the seat belt device prior to mounting.

In the embodiments shown in FIGS. 4 through 6, when a load outward of the compartment in the direction indicated by an arrow A is applied to the cap 66 to displace the cap 66, the absorbing means 78, 82 or 84 is elastically or plastically deformed to absorb the energy due to the load. On the other hand, in the embodiment shown in FIG. 7, when a load outward of the compartment in the direction indicated by an arrow A is applied to the cap 88, the cap 88 is brought into contact with the head 81 of the bolt 80 and deformed to absorb the energy. Further, in the embodiment shown in FIG. 8, the rib 92 is buckled to absorb the energy. According to the modes shown in FIGS. 4 through 8, since any tensile load of the seat belt is not applied to the cap, the energy absorption characteristics of the absorbing means can be arbitrarily determined.

Figure 9:
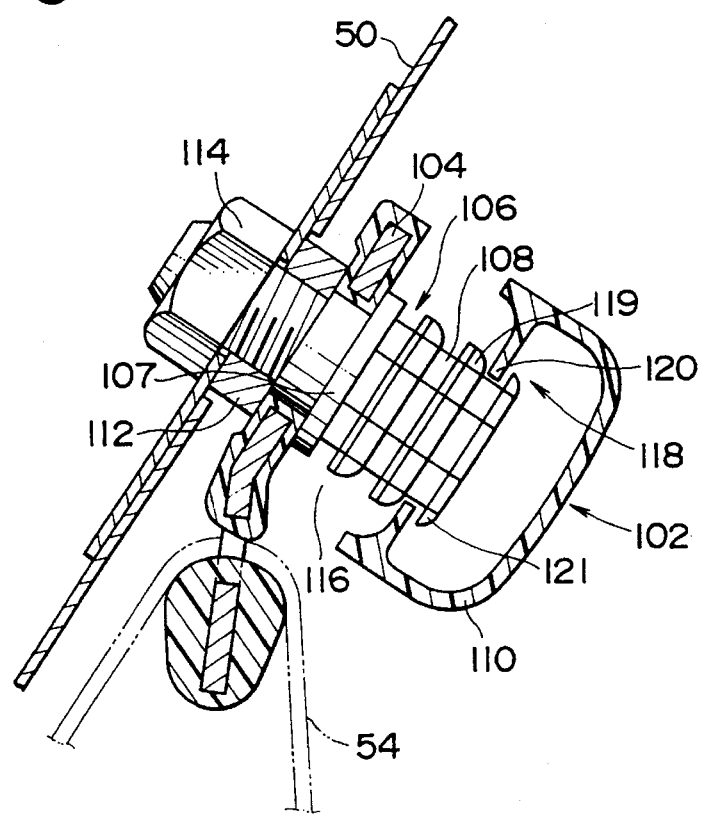
FIG. 9 is a sectional view taken along a substantially vertical plane of a seat belt device for an automobile as a yet further embodiment according to the present invention.
Figure 10:
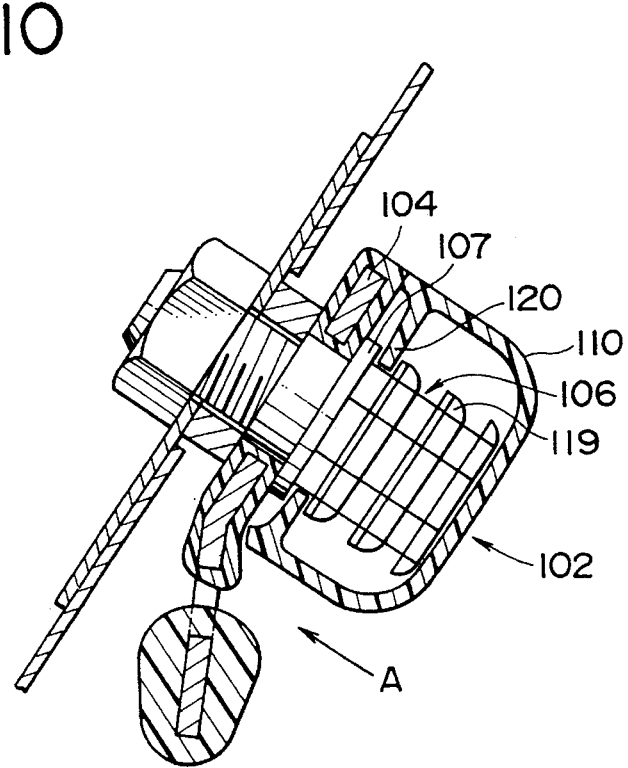
FIG. 10 is a sectional view showing the operation of the seat belt device for the automobile shown in FIG. 9.

In an embodiment shown in FIGS. 9 and 10, a seat belt anchor 102 includes an anchor plate 104 for supporting the seat belt 54, a bolt 106 for fixing the anchor plate 104 to the center pillar 50, having a step portion 107 pressed against the anchor plate 104 and a spacing portion 108 extending from the step portion 107 and a resin-made cap 110 mounted on the spacing portion 108 of the bolt 106. A spacer 112 is interposed between the center pillar 50 and the anchor plate 104, and the bolt 106 is screwed into a nut 114 welded to the center pillar 50.

A displacement permission space 116 is defined between the cap 110 and the step portion 107 of the bolt 106. An energy absorbing means 118 is constituted by a plurality of projections 119 provided on the spacing portion 108 of the bolt 106, and a claw 120 provided on the cap 110 and capable of getting over the projections 119. Each projection 119 is formed fanwise outward of the compartment as shown in the drawing. Otherwise, the projection can be formed to have a trapezoidal section such as a thread of a trapezoidal screw. Further, as another form of the projection, a plurality of protuberances can be arranged in the axial and circumferential directions specifically or unspecifically. On the other hand, the claw 120 of the cap is provided integrally with the cap 110 and has a bore smaller than the outer diameter of the projection 119. Further, the claw 120 can be formed to be continuous in the circumferential direction or made discontinuous by slits. The cap 110 is mounted on the bolt 106 by forcing the cap 110 onto the bolt 106 to make the claw 120 get over a hook piece 121 provided on the end of the bolt 106 and having an outer diameter smaller than that of the projection 119.

When a load outward of the compartment in the direction indicated by an arrow A is applied to the cap 110, the claw 120 of the cap 110 gets over the projections 119 of the bolt while being deformed to absorb the energy due to the load, as shown in FIG. 10. According to the mode described above, the seat belt device of the present invention can cope with the absorption of energy by slightly modifying the bolt and the cap of the conventional seat belt device.

Figure 11:
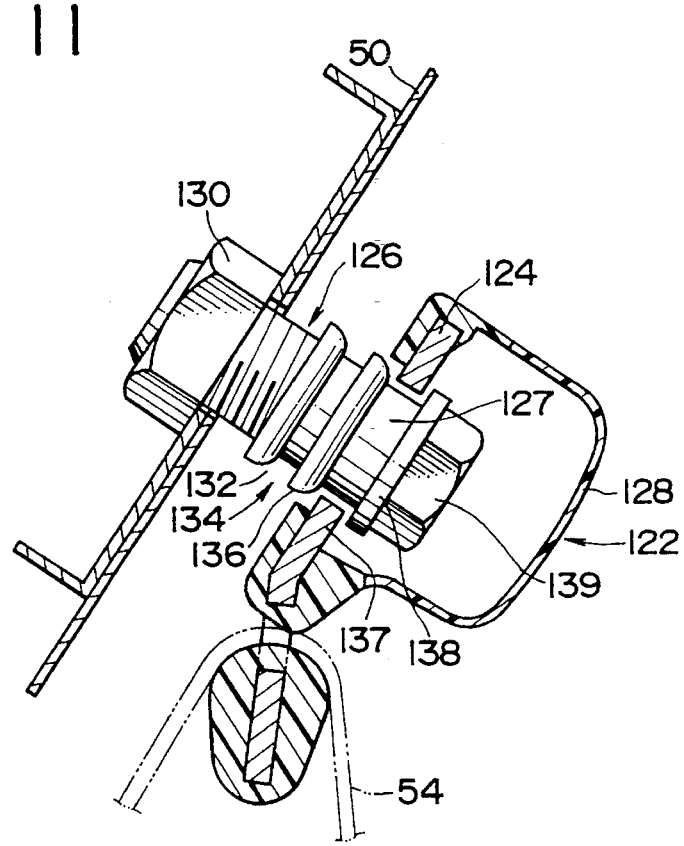
FIG. 11 is a sectional view taken along a substantially vertical plane of a seat belt device for an automobile as a yet further embodiment according to the present invention.
Figure 12:
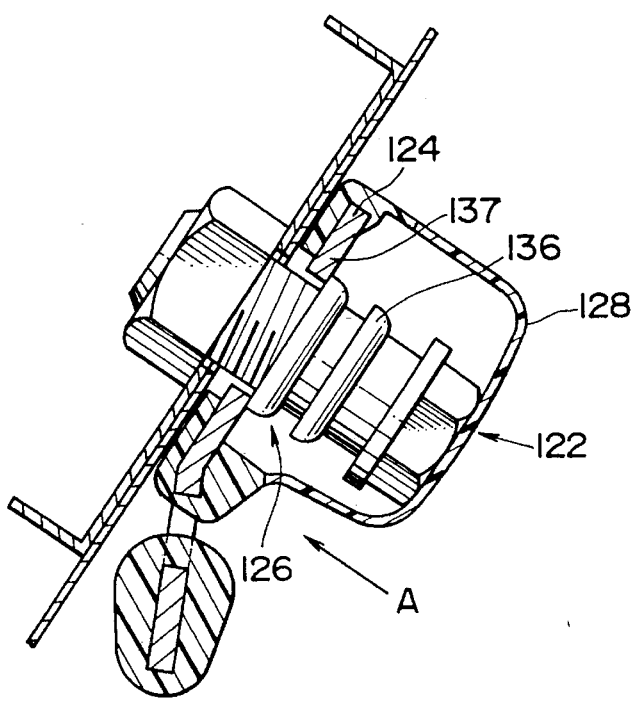
FIG. 12 is a sectional view showing the operation of the seat belt device for the automobile shown in FIG. 11.

In an embodiment shown in FIGS. 11 and 12, a seat belt anchor 122 includes an anchor plate 124 for supporting the seat belt 54, a bolt 126 having a spacing portion 127 and for mounting the anchor plate 124 on the spacing portion 127, and a resin-made cap 128 mounted on the anchor plate 124. The bolt 126 is screwed into a nut 130 welded to the center pillar 50.

A displacement permission space 132 is defined between the anchor plate 124 and the center pillar 50. An absorbing means 134 is constituted by a plurality of projections 136 provided on the spacing portion 127 of the bolt 126, and a claw 137 provided on the anchor plate 124 and capable of getting over the projections 136. The projections 136 can be formed to be substantially similar to the projections 119 in the embodiment shown in FIG. 9. On the other hand, since the anchor plate 124 is generally made of steel, the claw 137 is formed so as to have a bore little smaller than the outer diameter of the projection 136. Further, the claw 137 has a plurality of slits provided at intervals in the circumferential direction such as to make the claw 137 discontinuous. In order to facilitate the mounting of the anchor plate 124 on the bolt 126, a head 139 having a step portion 138 of the bolt 126 is manufactured as a part independent of the spacing portion 127. Then, the head 139 is fixed to the spacing portion 127 with a screw (not shown) by means of spline connection.

As shown in FIG. 12, when a load outward of the compartment in the direction indicated by an arrow A is applied to the cap 128, the claw 137 of the anchor plate 124 formed integrally with the cap 128 gets over the projections 136 of the bolt 126 to absorb the energy due to the load. According to the mode described above, the seat belt device of the present invention can cope with the absorption of energy by slightly modifying the anchor plate and the bolt, which are provided as parts originally mounted on the seat belt device. In addition, any special energy absorbing part is not needed.

Figure 13:
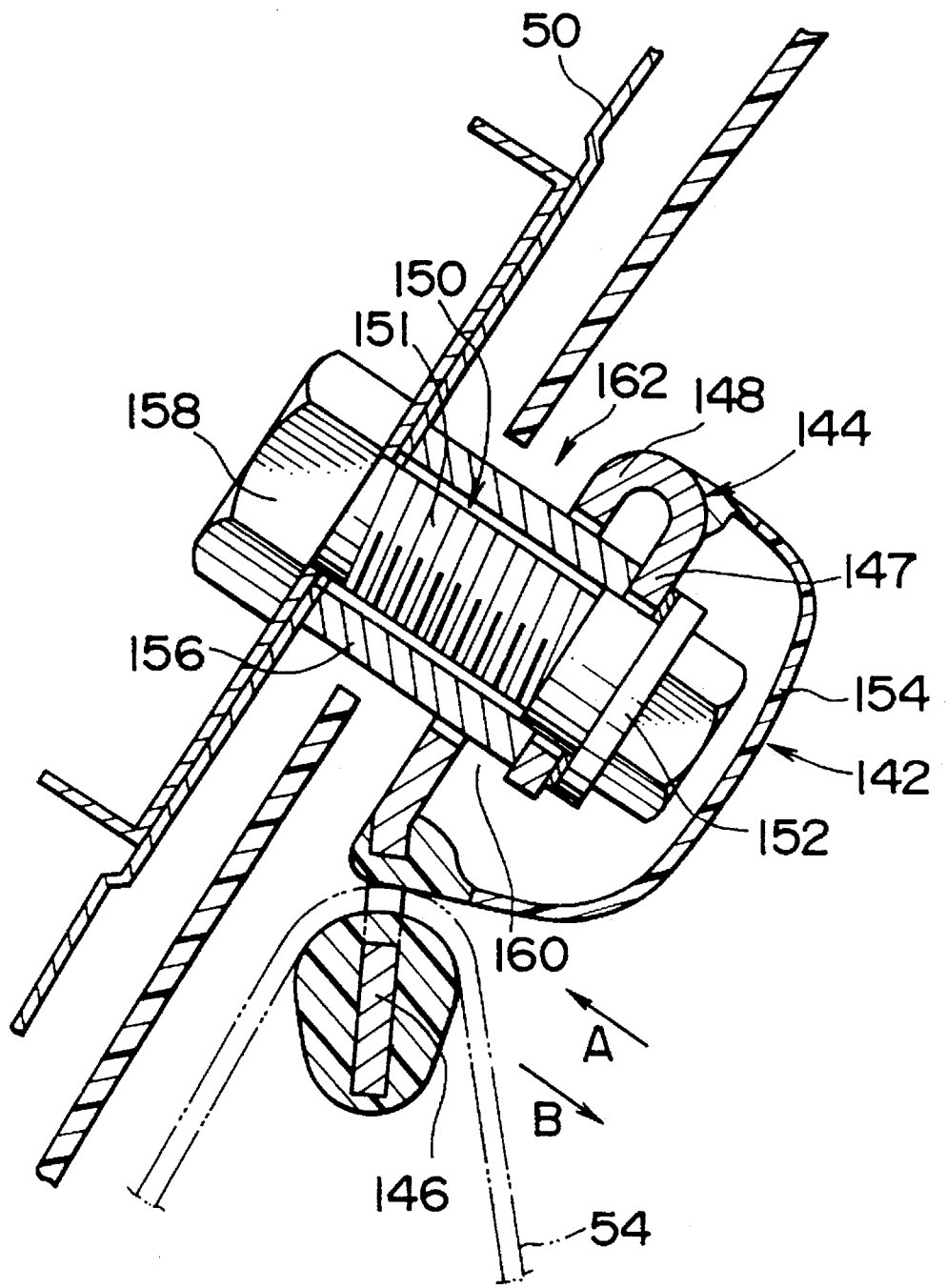
FIG. 13 is a sectional view taken along a substantially vertical plane of a seat belt device for an automobile as a yet further embodiment according to the present invention.
Figure 14:
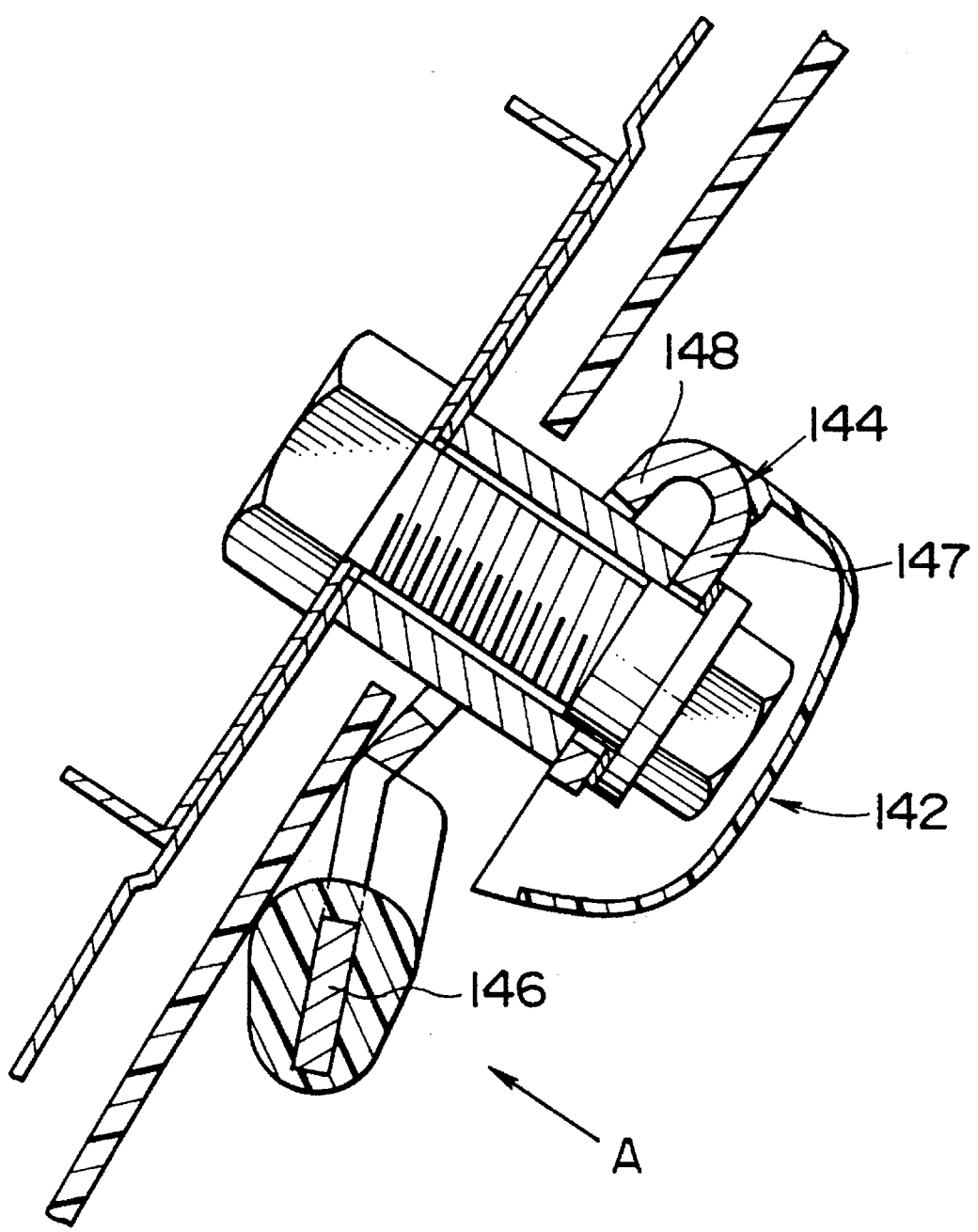
FIG. 14 is a sectional view showing the operation of the seat belt device for the automobile shown in FIG. 13.

In an embodiment shown in FIGS. 13 and 14, a seat belt anchor 142 includes an anchor plate 144 having a support portion 146 for supporting the seat belt 54, a fixed portion 147 and a connection portion 148 extending in an approximately U-like shape from the support portion 146 to the fixed portion 147, a bolt 150 having a spacing portion 151 and for mounting the fixed portion 147 of the anchor plate 144 on the spacing portion 151, and a cap 154 mounted on the anchor plate 144. The fixed portion 147 of the anchor plate 144 is attached to the step portion 152 of the bolt 150, and the bolt 150 is screwed through a spacer 156 into a nut 158 welded to the center pillar 50 to fix the bolt 150 to the center pillar 50.

A displacement permission space 160 is defined between the fixed portion 147 of the anchor plate 144 and the center pillar 50. An energy absorbing means 162 is constituted by the connection portion 148 of the anchor plate 144 disposed in the displacement permission space 160 such that the connection portion can be extended by a load outward of the compartment in the direction indicated by an arrow A. The connection portion 148 is constituted in an approximately U-like shape. Thus, in case that the load in the direction indicated by the arrow A to get the connection portion 148 to extend is applied to the support portion 146, the connection portion 148 is deformed more easily, in comparison with the case that a load in the direction indicated by an arrow B to get the connection portion 148 to narrow is applied to the support portion 146.

As shown in FIG. 14, when the load outward of the compartment in the direction indicated by the arrow A is applied to the support portion 146 of the anchor plate 144, the connection portion 148 is extended to absorb the energy due to the load. According to the mode described above, energy due to an obliquely-applied load can also be absorbed. Further, only the anchor plate makes it possible to attain a function of substantially withstanding a tensile load applied to the seat belt inserted into the support portion and another function of extending the anchor plate by the load outward of the compartment to absorb the energy.

Figure 15:
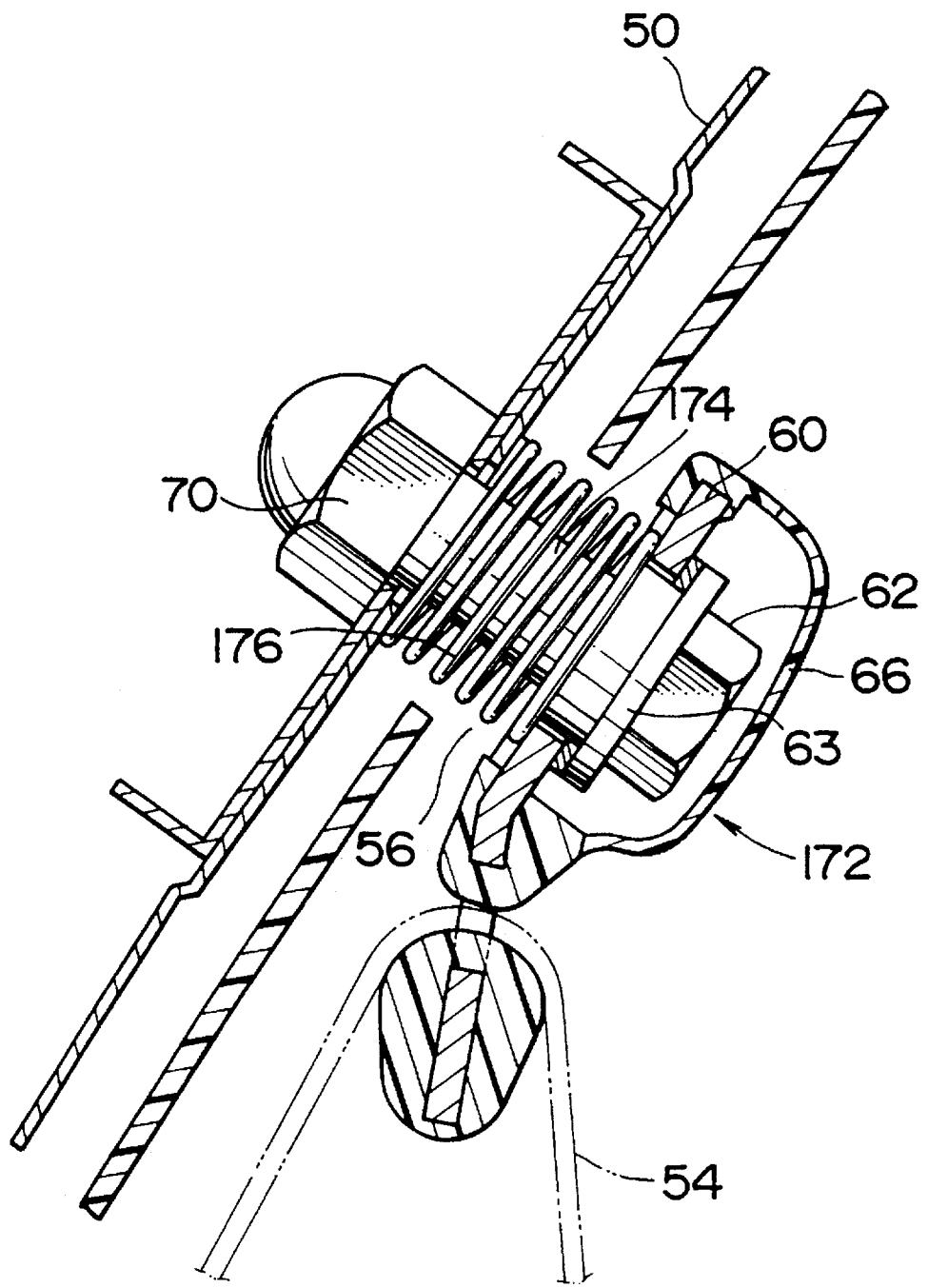
FIG. 15 is a sectional view taken along a substantially vertical plane of a seat belt device for an automobile as a yet further embodiment according to the present invention.
Figure 16:
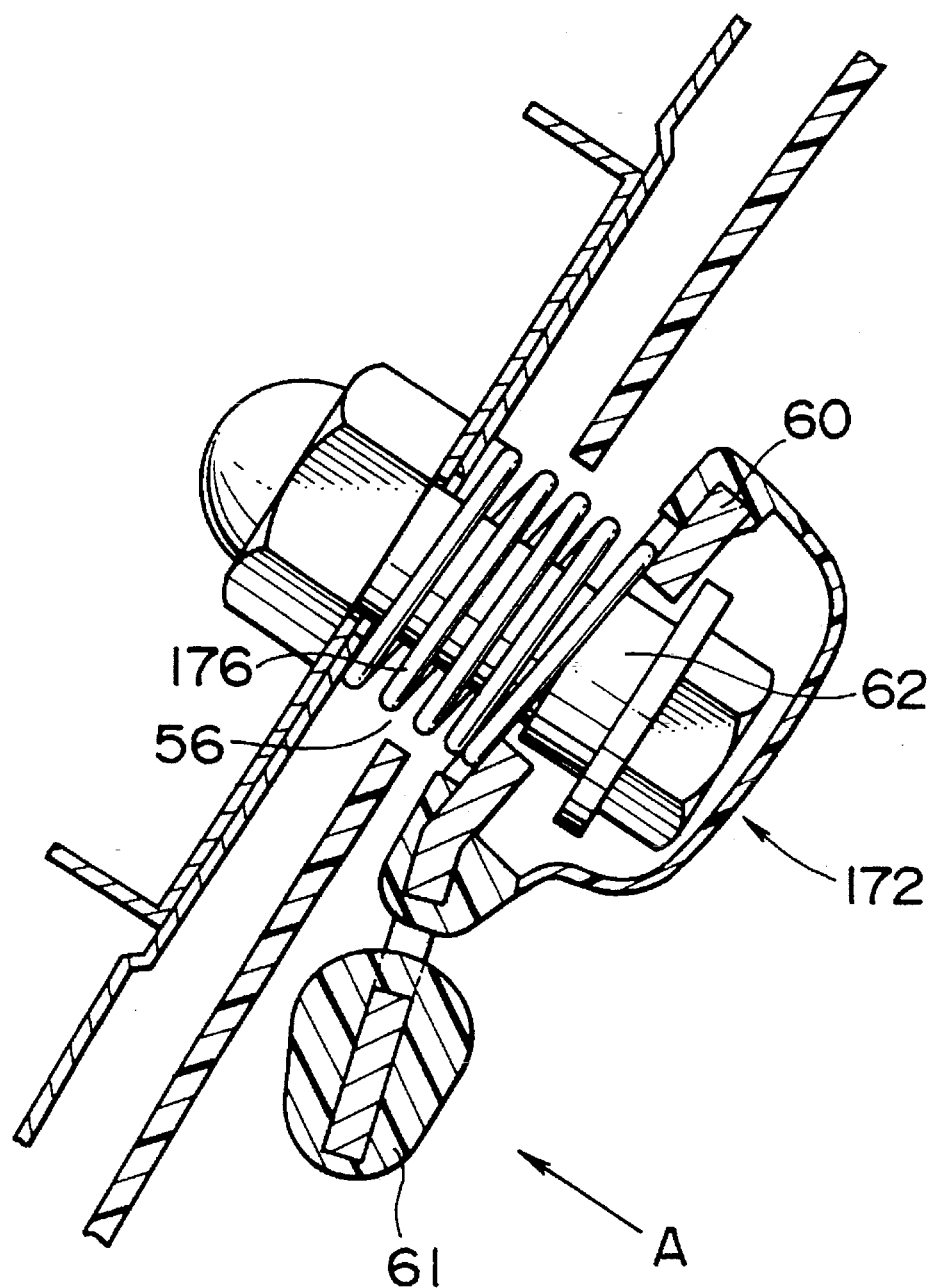
FIG. 16 is a sectional view showing the operation of the seat belt device for the automobile shown in FIG. 15.
Figure 17:
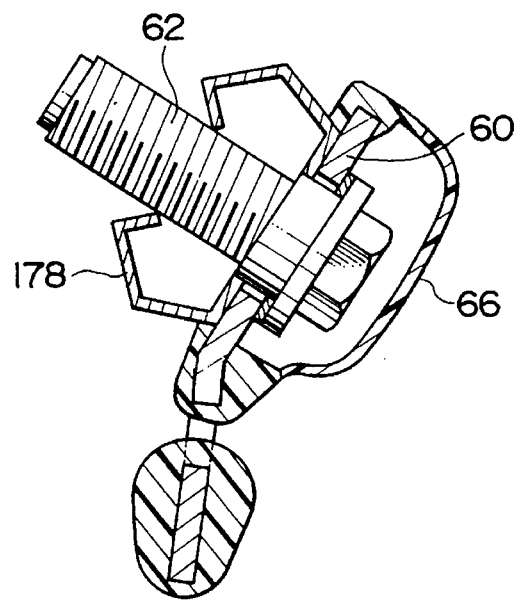
FIG. 17 is a sectional view taken along a substantially vertical plane of a seat belt device for an automobile as a yet further embodiment according to the present invention, and showing the state of the seat belt device prior to mounting.

A seat belt anchor 172 in embodiments shown in FIGS. 15 through 17 belongs to the same category as the seat belt anchor 52 shown in FIG. 1 and includes the anchor plate 60 for supporting the seat belt 54, the bolt 62 for mounting the anchor plate 60, and the cap 66 mounted on the anchor plate 60. The bolt 62 has the step portion 63 and a spacing portion 174. The anchor plate 60 is attached to the step portion 63 of the bolt, and a spacer 176 is interposed between the anchor plate 60 and the center pillar 50. Then, the bolt 62 is screwed and fixed into the capped nut 70 welded to the center pillar 50. As a result, the anchor plate 60 is mounted on the spacing portion 174 of the bolt 62 displaceably outward of the compartment. Then, the displacement permission space 56 is defined between the anchor plate 60 and the center pillar 50, and the spacer 176 constitutes a deformable energy absorbing means.

The spacer 176 in an embodiment shown in FIG. 15 is constituted by a coil spring, and a spacer 178 in an embodiment shown in FIG. 17 is constituted by a bent plate spring steel. The spacer 178 can be also constituted by a steel or other metal plate having a small thickness and resin or the like, instead of the spring steel. As shown in FIG. 16, when a load outward of the compartment in the direction indicated by an arrow A is applied to the support portion 61 of the anchor plate 60, the spacer 176 is deformed to absorb the energy due to the load. According to the modes shown in FIGS. 15 through 17, the energy due to an obliquely-applied load can also be absorbed, and a value of an energy-absorbable load can be arbitrarily determined. Further, an existing space can be effectively utilized.

Figure 18:
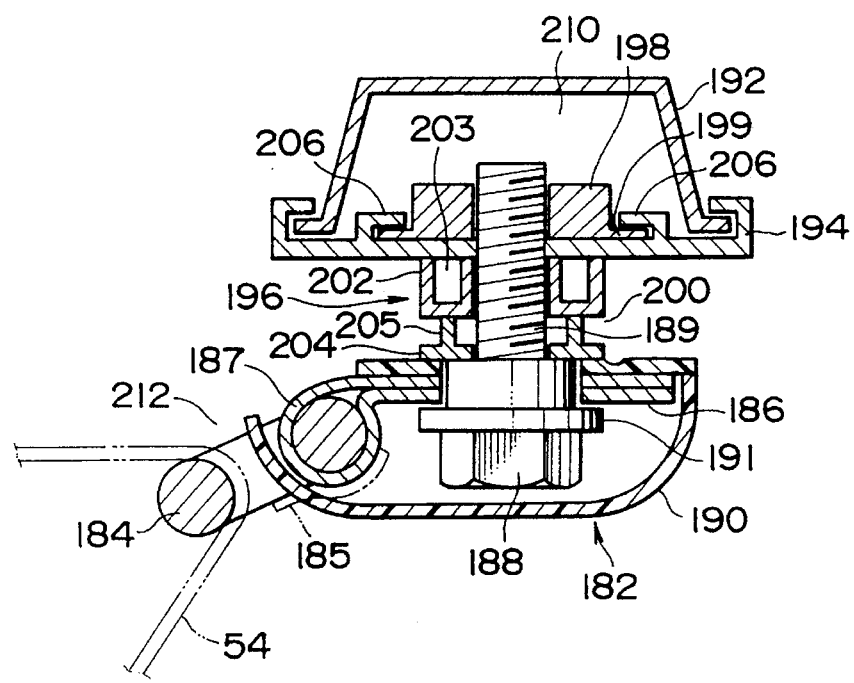
FIG. 18 is a sectional view taken along a substantially horizontal plane of a seat belt device for an automobile as a yet further embodiment according to the present invention, and showing an anchor plate in a turned state for the convenience of explanation.

In an embodiment shown in FIG. 18, a seat belt anchor 182 includes a ring 184 allowing for the piercing of the seat belt 54, an anchor plate 186 for supporting the ring 184 such that the ring 184 can swing outward of the compartment, a bolt 188 having a spacing portion 189 and for mounting the anchor plate 186 on the spacing portion 189 displaceably outward of the compartment, a resin-made cap 190 mounted on the anchor plate 186, a rail 192 fixed to the center pillar (not shown), and a slider 194 movably mounted on the rail 192. The anchor plate 186 is formed by a folded plate material. The ring 184 is pinched by a bend portion 187 of the folded plate material to apply appropriate frictional force to the ring 184. The movement of the ring 184 inward of the compartment is prevented by a stopper 185 provided on the anchor plate 186. The anchor plate 186 is attached to a step portion 191 of the bolt 188, and the bolt 188 is inserted into the slider 194 through the spacer 196. Then, the nut 198 is screwed to fix the bolt 188 to the slider 194.

A displacement permission space 200 is defined between the anchor plate 186 and the slider 194, and the spacer 196 constitutes an energy absorbing means in the displacement permission space 200. The spacer 196 is composed of a first spacer piece 202 having a concave portion 203 at a portion facing to the slider 194, and a second spacer piece 204 having a convex portion 205 at a portion facing to the first spacer piece 202 and disposed between the anchor plate 186 and the first spacer piece 202. Both the first and second spacer pieces 202, 204 may be made of steel and other metal and take the ring-like shape. In the mounting state, the convex portion 205 of the second spacer piece 204 faces to a substantially center portion of the concave portion of the first spacer piece 202.

In the embodiment shown in FIG. 18, another displacement permission space 210 is defined between the rail 192 and the slider 194. The nut 198 has a pair of flanges 199 at two flats of the nut. The flanges 199 are held by a pair of claws 206 provided on the slider 194. The claws 206 can be deformed by a load of a predetermined value outward of the compartment and constitute another energy absorbing means.

Figure 19:
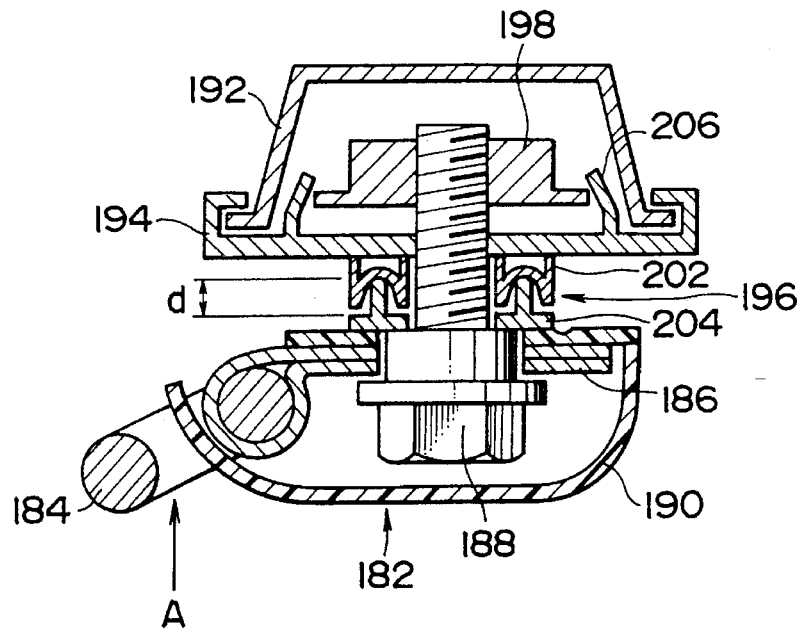
FIG. 19 is a sectional view showing the operation of the seat belt device for the automobile shown in FIG. 18.

As shown in FIG. 19, when a load outward of the compartment in the direction indicated by an arrow A is applied to the cap 190, the cap 190 is butted against the bolt 188 and displaced in the direction indicated by the arrow A together with the bolt 188. In this manner, the convex portion of the second spacer piece 204 of the spacer 196 deforms the first piece 202, and simultaneously the nut 198 fixed to the bolt 188 with screwing is displaced to forcibly extend the claws 206. Accordingly, although the energy can be absorbed by the amount of deformation d of the first spacer piece 202 and the extension of the claws 206, the degree of deformation of the first spacer piece 202 and the claws 206 can be obtained by a calculation, so that the energy to be absorbed is simply adjusted. According to the mode described above, an energy-absorbable load can be easily adjusted, and the required energy absorption can be attained in a small space.

In case that the deformation of the claws 206 is not used for the absorption of energy, in other words, the energy is absorbed only by the spacer 196, a guide is provided at a position of the claw 206. In this case, the guide is adapted to prevent the nut 198 from turning, while moving the nut 198 along the guide following the movement of the bolt 188 for the absorption of energy.

In the embodiment shown in FIG. 18, a further displacement permission space 212 is defined on the outside of the ring 184, and another energy absorbing means is constituted by utilizing the friction between the ring 184 and the anchor plate 186.

Figure 20:
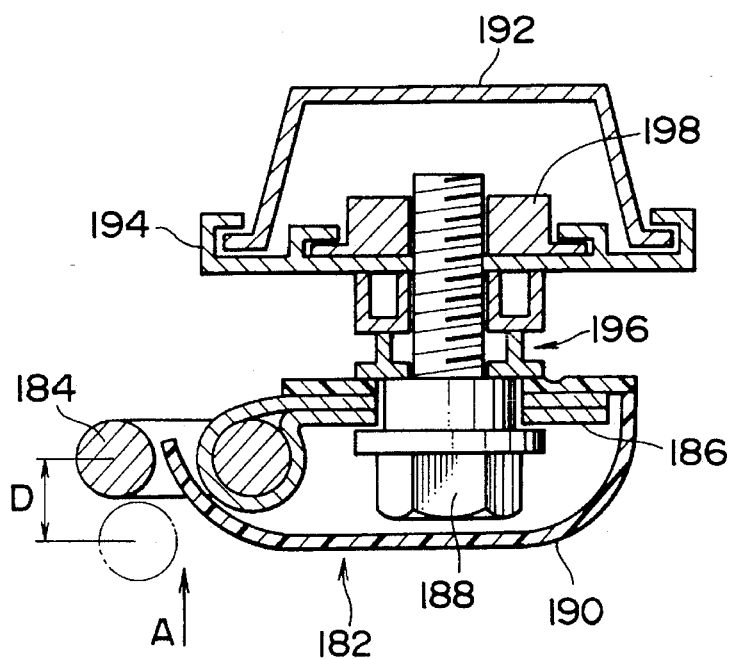
FIG. 20 is a sectional view showing the different operation of the seat belt device for the automobile shown in FIG. 18.

As shown in FIG. 20, when a load of not less than a predetermined value outward of the compartment in the direction indicated by an arrow A is applied to the ring 184, the ring 184 is rotated against the friction between the anchor plate 186 and the ring, and the frictional force corresponding to the distance D resulting from the rotation of the ring is generated. The frictional force thus generated is utilized for the absorption of energy. According to the mode described above, it is possible to set the support portion of the seat belt free outward simultaneously with the absorption of energy.

Figure 21:
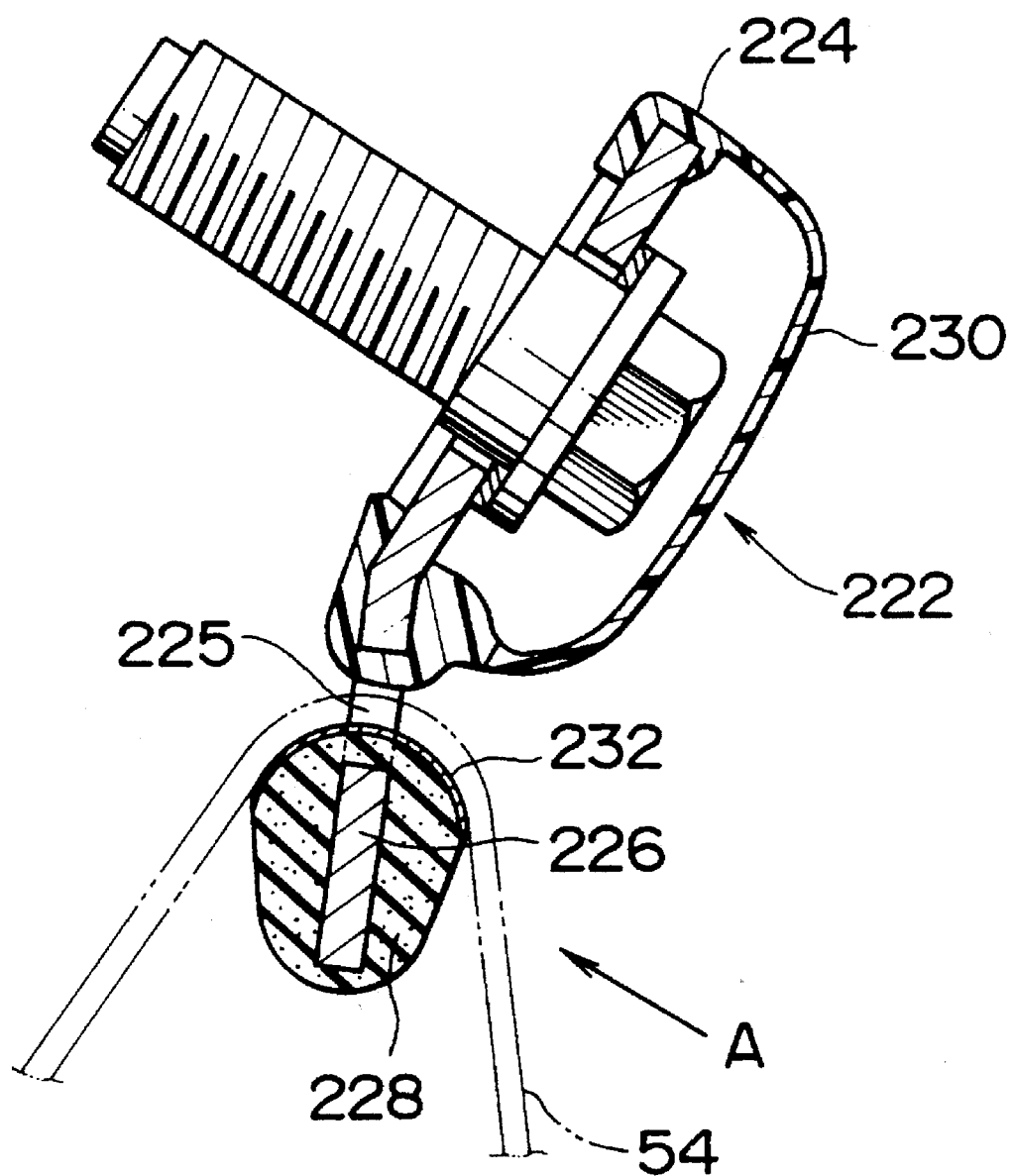
FIG. 21 is a sectional view taken along a substantially vertical plane of a seat belt device for an automobile as a yet further embodiment according to the present invention, and showing the state of the seat belt device prior to mounting.

In an embodiment shown in FIG. 21, a seat belt anchor 222 includes an anchor plate 224 having a support portion 226 for supporting the seat belt 54 and provided with a hole 225 allowing for the piercing of the seat belt 54, a cushion material 228 for covering a portion of the support portion 226 located at least below the hole 225, and a resin-made cap 230 mounted on the anchor plate 224. The cushion material 228 is formed by a material having high compressibility such as foamed urethane. However, since such a highly compressible material has large frictional coefficient, a portion of the cushion material 228 at least contacting the seat belt 54 is covered with a covering material 232 having low frictional coefficient such as nylon. The covering material 232 may be constituted in the form of a thin film or a thin plate.

A displacement permission space is defined as a compressible range of the cushion material 228, and the cushion material 228 constitutes an absorbing means. Accordingly, when a load of not less than a predetermined value outward of the compartment in the direction indicated by an arrow A is applied to the cushion material 228, the cushion material 228 is compressed to absorb the energy due to the load. According to the mode described above, the energy due to an obliquely-applied load can also be absorbed. Further, the smoothness of slip of the seat belt can be ensured by the covering material having the low frictional coefficient.

Figure 22:
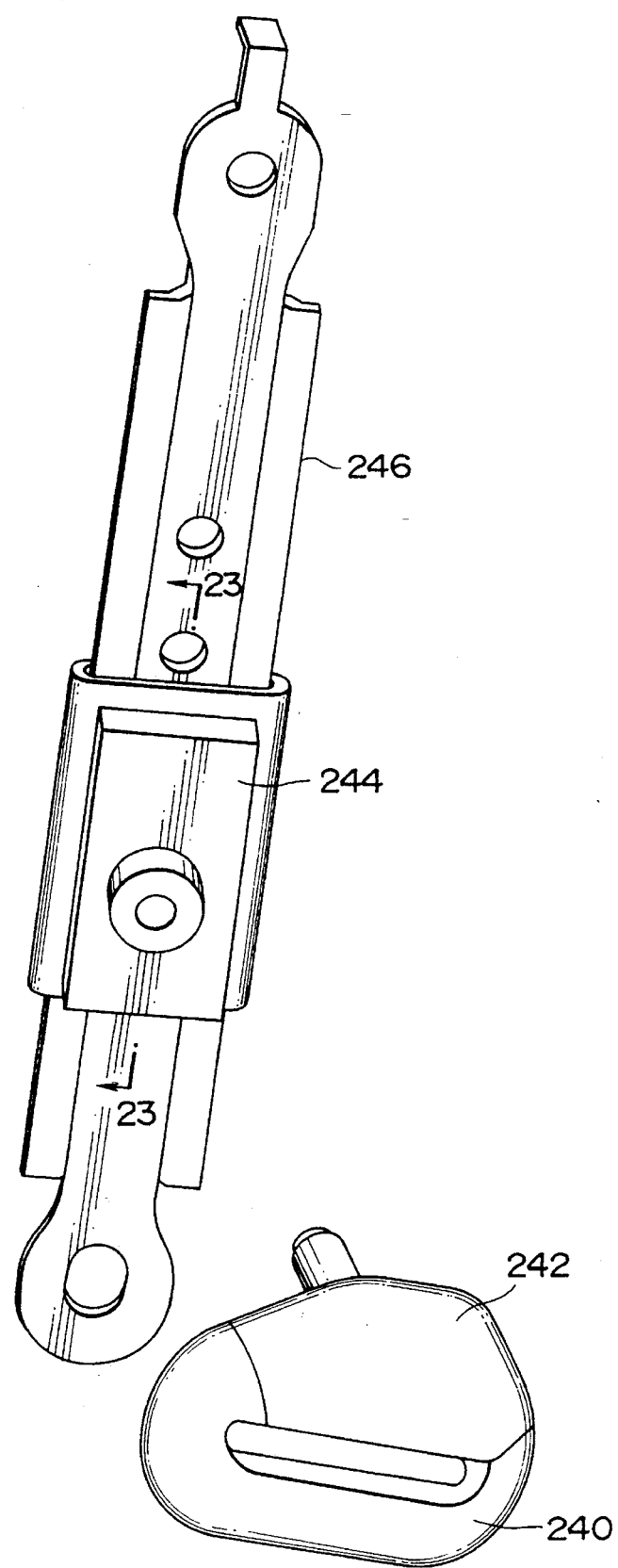
FIG. 22 is an exploded perspective view showing a seat belt device of a slide type for an automobile as an embodiment according to the present invention.

The seat belt anchors may include a seat belt anchor of a fixed type, in which the anchor plate is fixedly mounted on the center pillar, and a seat belt anchor of a slide type, in which an anchor plate 240 with a cap 242 is mounted on a slider 244, and the slider 244 is moved along a rail 246 fixed to the center pillar (not shown), as shown in FIG. 22. In the seat belt anchor of any type, the anchor plate is mounted so as to be rotated around the axis of the bolt. The above-mentioned embodiments have mainly described about the seat belt anchor of the fixed type with the exception of some embodiments. However, even though the seat belt anchor has been described as that of the fixed type, each seat belt anchor is provided with the bolt, and therefore, as long as the bolt is mounted on the slider, the seat belt anchor of the fixed type can be applied to the seat belt anchor of the slide type as it is. Next will be mainly described embodiments of the seat belt anchor of the slide type.

Figure 23:
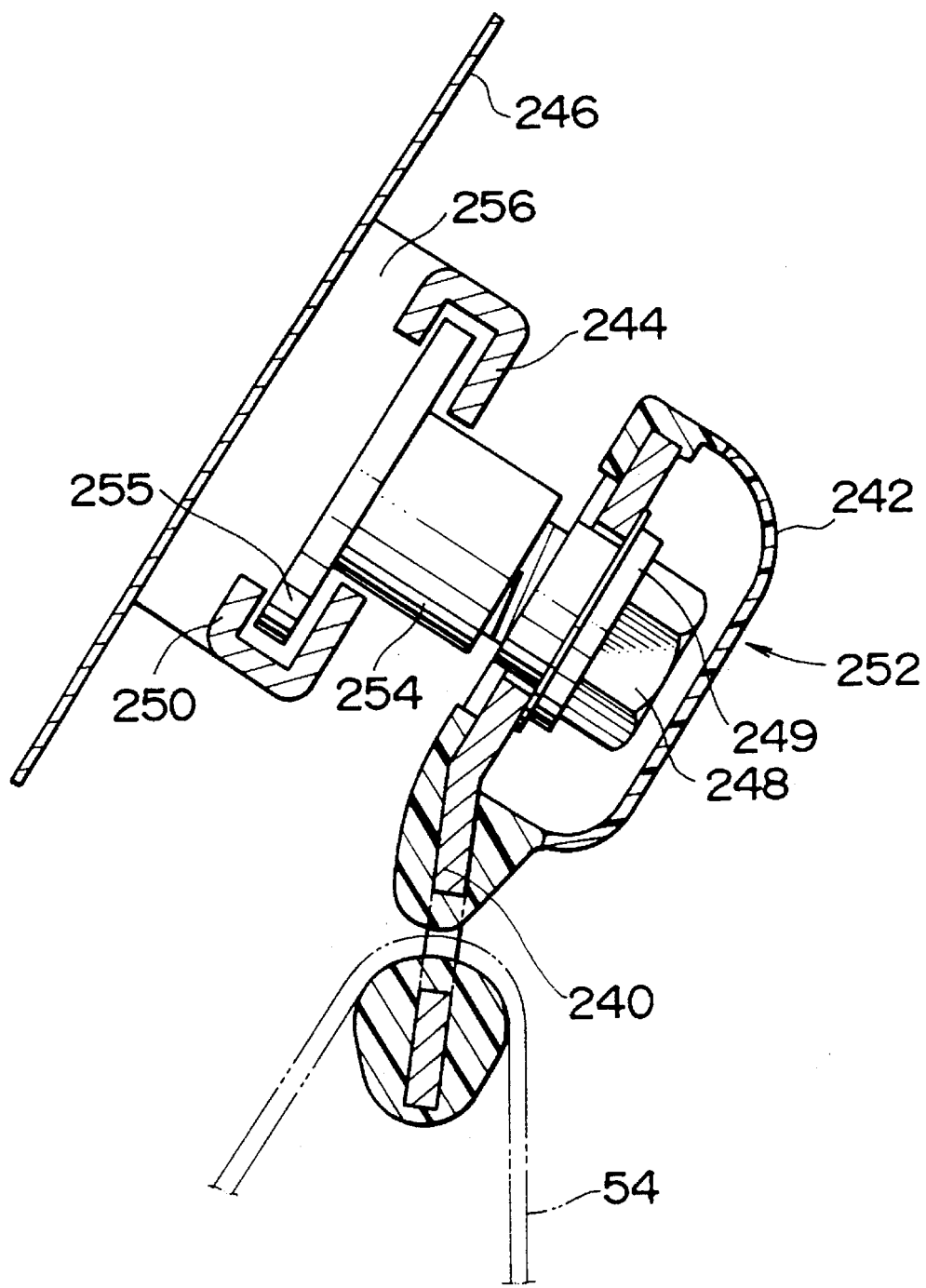
FIG. 23 is a sectional view taken along a line 23—23 in FIG. 22.

In an embodiment shown in FIGS. 22 and 23, a seat belt anchor 252 includes an anchor plate 240 for supporting the seat belt 54, a resin-made cap 242 mounted on the anchor plate 240, a bolt 248 for fixing the anchor plate 240, a rail 246 fixed to the center pillar, a slider 244 movable along the rail 246, and a nut 254 fixed to the slider 244 for screwing the bolt 248 by a fixing means 250. The anchor plate 240 is attached to a step portion 249 of the bolt 248, and the bolt 248 is screwed into the nut 254. The nut 254 has a flange 255 which is mounted on the slider 244 by a claw constituting the fixing means 250. The claw 250 can be deformed outward of the compartment. As a result, a displacement permission space 256 is defined on the outside of a mounting portion of the slider 244, and the fixing means 250 constitutes an energy absorbing means.

Figure 24:
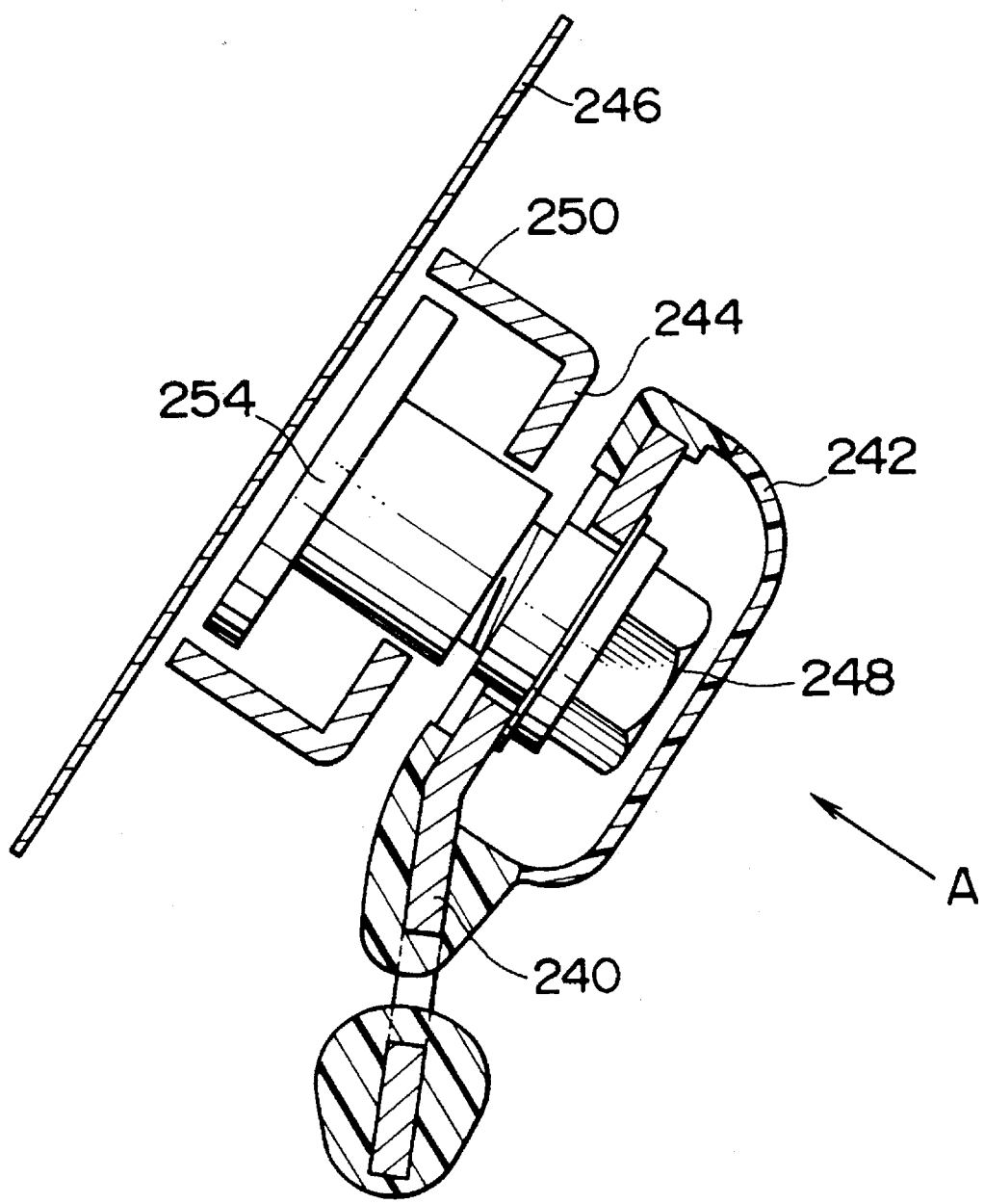
FIG. 24 is a sectional view showing the operation of the seat belt device for the automobile shown in FIG. 23.

As shown in FIG. 24, when a load of not less than a predetermined value outward of the compartment in the direction indicated by an arrow A is applied to the cap 242 or the anchor plate 240, the bolt 248 and the nut 254 are moved to force the claw 250 open, and as a result, the energy due to the load is absorbed. According to the mode described above, the energy can be absorbed only by modifying the space between the rail and the slider. Further, since a tensile load applied to the seat belt can be received by the substantially wide area, the strength can be ensured. Furthermore, a value of an energy-absorbable load can be arbitrarily determined by modifying the shape or thickness of the claw without varying the number of parts.

Figure 25A:
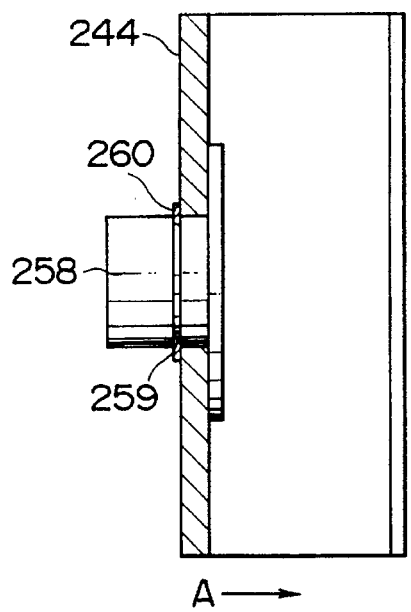
FIG. 25(a) shows the fixed state of the slider and the nut.
Figure 25B:
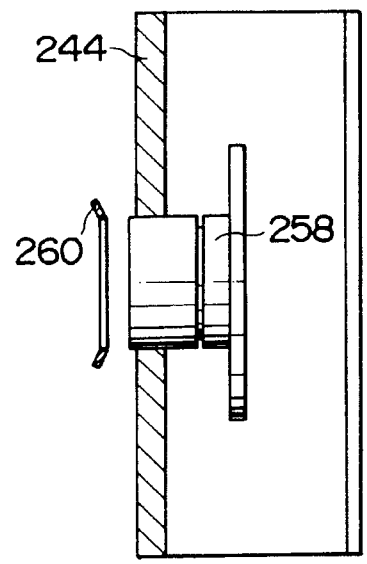
FIG. 25(b) shows the state of the slider and the nut after the absorption of energy.

In an embodiment shown in FIG. 25, a nut 258 which is used instead of the nut 254 has a groove 259 extending in the circumferential direction, and a means 260 for fixing the nut 258 to the slider 244 is constituted by a C-ring. When a load of not less than a predetermined value outward of the compartment in the direction indicated by an arrow A is applied from the bolt to the nut 258, the C-ring 260 gets out of the slider 244 to absorb the energy. According to the mode described above, a value of an energy-absorbable load can be arbitrarily determined by selecting the material of the C-ring.

Figure 26A:
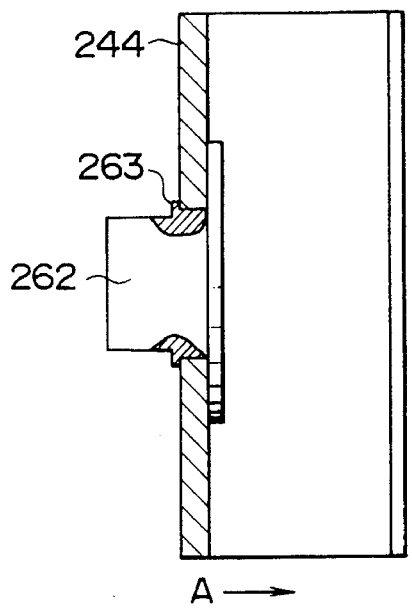
FIG. 26(a) shows the fixed state of the slider and the nut.
Figure 26B:
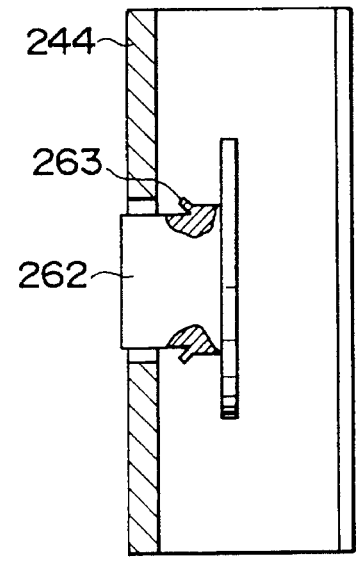
FIG. 26(b) shows the state of the slider and the nut after the absorption of energy.

In an embodiment shown in FIG. 26, a nut 262 has a caulking portion 263, which is caulked to constitute a fixing means. When a load of not less than a predetermined value outward of the compartment in the direction indicated by an arrow A is applied to the nut 262, the caulking portion 263 gets out of the slider 244 to absorb the energy. According to the mode described above, a value of an energy-absorbable load can be arbitrarily determined by the amount of caulking without varying the number of parts.

Figure 27:
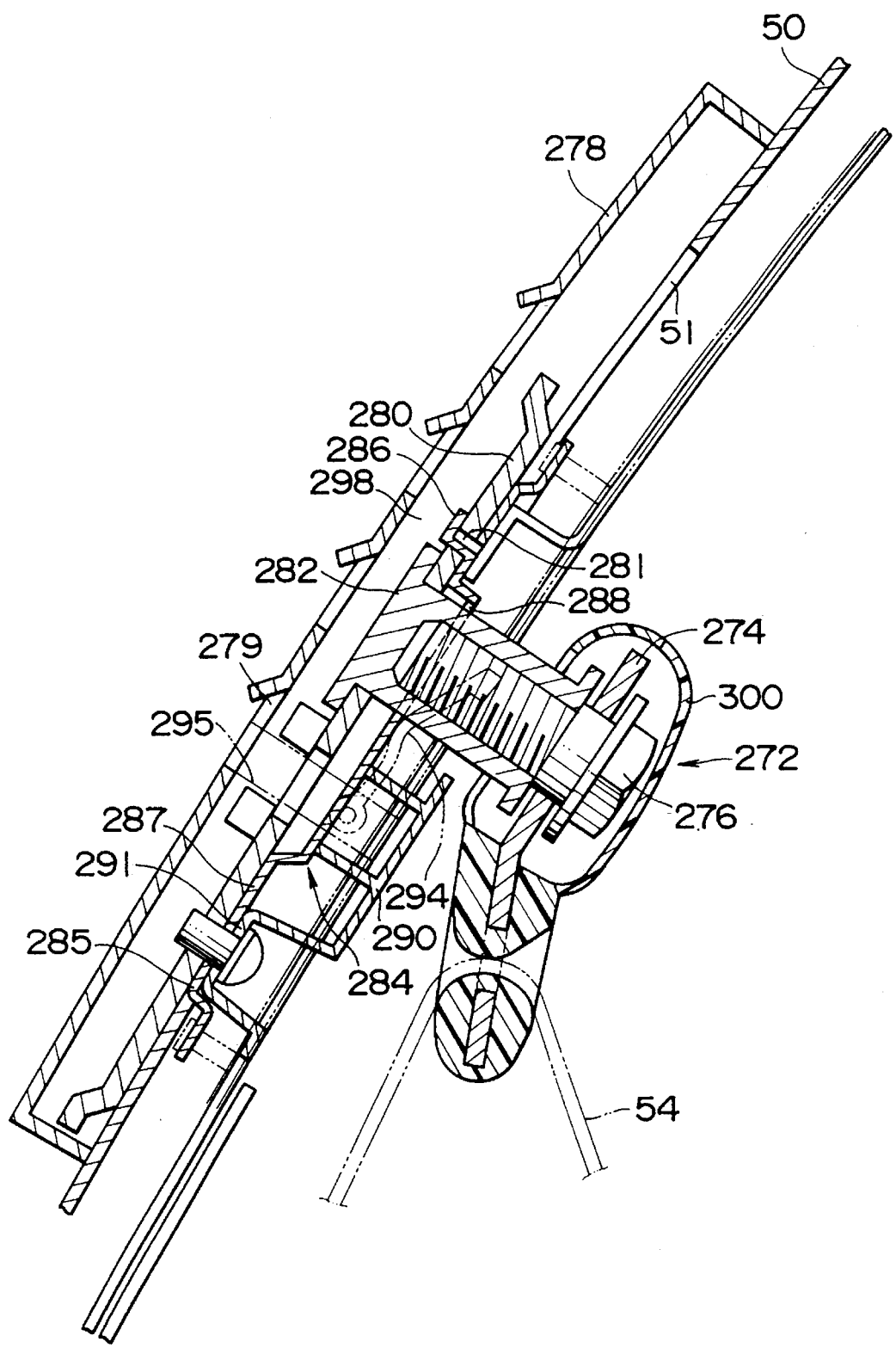
FIG. 27 is a sectional view taken along a substantially vertical plane of a seat belt device of a slide type for an automobile as another embodiment according to the present invention.

In an embodiment shown in FIG. 27, a seat belt anchor 272 includes an anchor plate 274 for supporting the seat belt 54, a bolt 276 for fixing the anchor plate 274, a rail 278 embedded in the center pillar 50, a slider 280 disposed in the center pillar 50 movably along the rail 278, a nut 282 for screwing the bolt 276 and fixed to the slider 280, and a plate 284 disposed on the inside of the compartment apart from the center pillar 50 and connected to the slider 280 at one end 285.

A hole 51 extending in the vertical direction is provided in the center pillar 50, and the slider 280 welded with the nut 282 is disposed in the center pillar 50 to project the nut 282 from the hole 51 inward. The plate 284 has an extension portion 287 extending from the end 285 connected to the slider 280 to the other end 286. The extension portion 287 has a width smaller than that of the hole 51 of the center pillar 50, i.e., smaller than the distance in the direction perpendicular to a plane of FIG. 27 and is capable of advancing into the hole 51. Further, the extension portion 287 has a hole 288 allowing for the insertion of the nut 282. The other end 286 of the plate 284 extends through a hole 281 provided in the slider 280, and is caught by the slider 280 at a portion on the outside of the hole 281. A slider plate 290 is connected to the slider 280 and the plate 284. A connection portion 291 of the slider plate 290 is formed to be slidable along a portion on both sides of the hole 51 of the center pillar 50, i.e., a portion located in the direction perpendicular to the plane. Thereby, the slider 280 is prevented from getting out of the slider plate.

A displacement permission space 298 is defined between the rail 278 and the slider 280, and the other end 286 of the plate 284 caught by the slider 280 constitutes an energy absorbing means.

Figure 28:
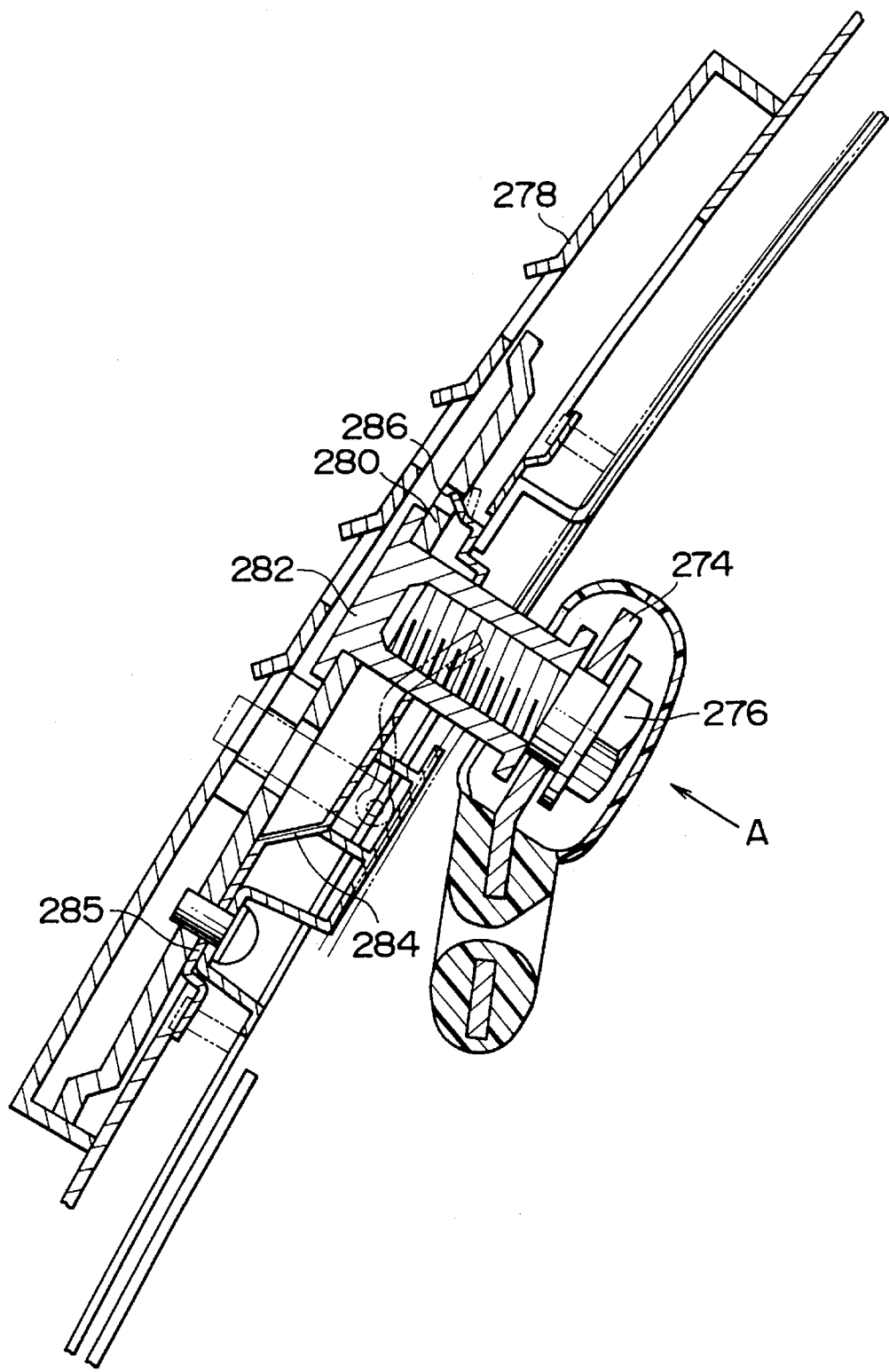
FIG. 28 is a sectional view showing the operation of the seat belt device for the automobile shown in FIG. 27.

A lever 294 is operated by a knob (not shown) well known per se, and a lock pin 295 is drawn out to move the slider 280 to an appropriate position along the rail 278. Then, when the knob is released, the lock pin 295 is fitted into the hole 279 of the rail 278. In this state, when a load of not less than a predetermined value outward of the compartment in the direction indicated by an arrow A is applied to a cap 300 mounted on the anchor plate 274, the cap 300 is deformed to be brought into contact with the bolt 276, and the bolt 276, the nut 282 and the slider 280 are about to displace. However, as shown in FIG. 28, since one end 285 of the plate 284 is connected to the slider 280, the other end 286 of the plate 284 is extended, and the slider 280 gets out of the plate 284 at the end 286. The energy due to the load can be absorbed by the extension of the end 286 of the plate 284 at the time when the slider gets out of the plate.

According to the mode described above, the sufficient strength can be ensured against a tensile load applied to the seat belt, and the energy can be absorbed by separating the slider from the hook end of the plate by an outward load. Further, a value of an energy-absorbable load can be arbitrarily determined by modifying the plate thickness or shape of the hook end. Furthermore, since the rail and the slider are disposed in the center pillar, an existing space between the slider and the rail of the seat belt device can be effectively utilized.

Figure 29:
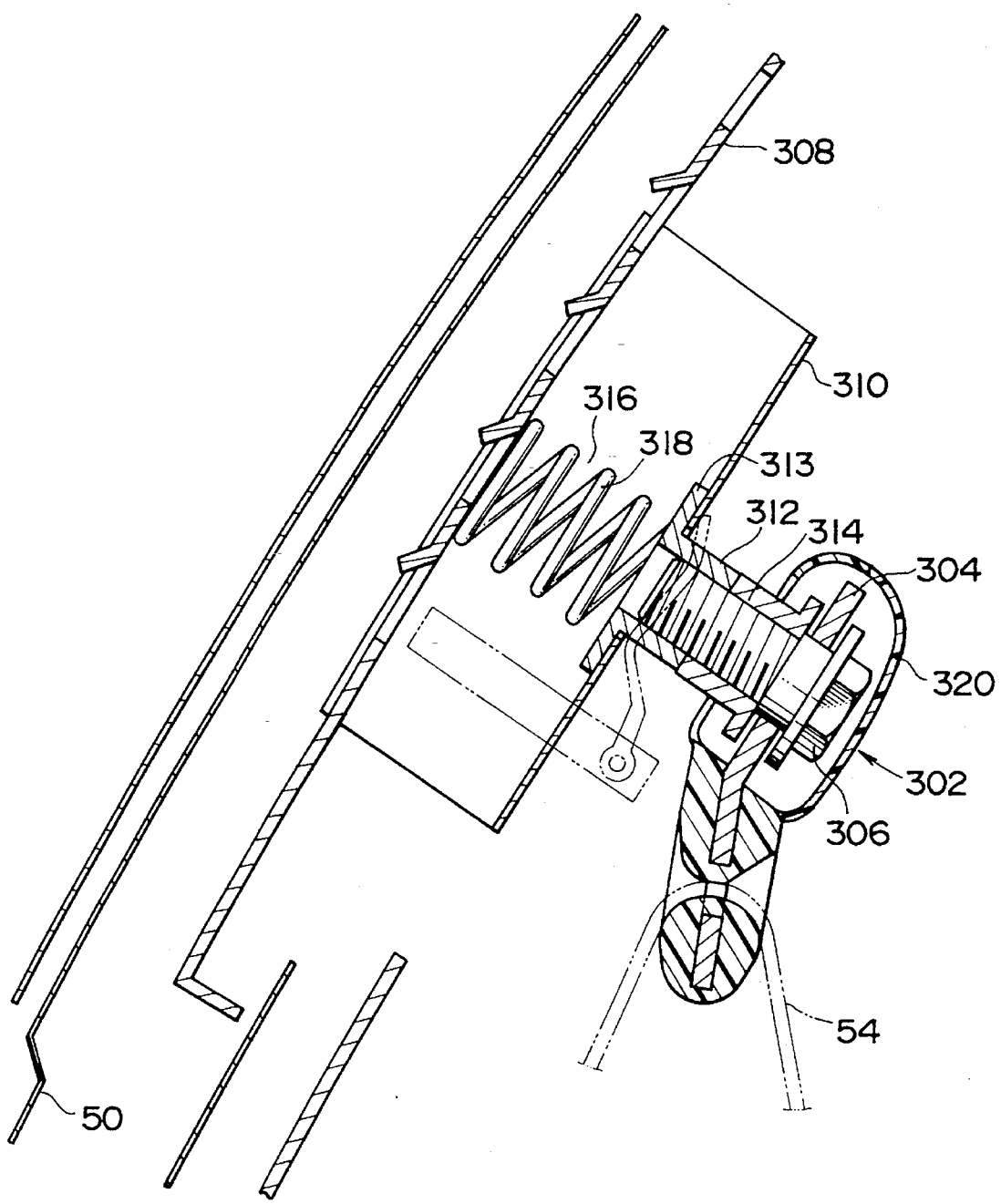
FIG. 29 is a sectional view taken along a substantially vertical plane of a seat belt device of a slide type for an automobile as a further embodiment according to the present invention.
Figure 30:
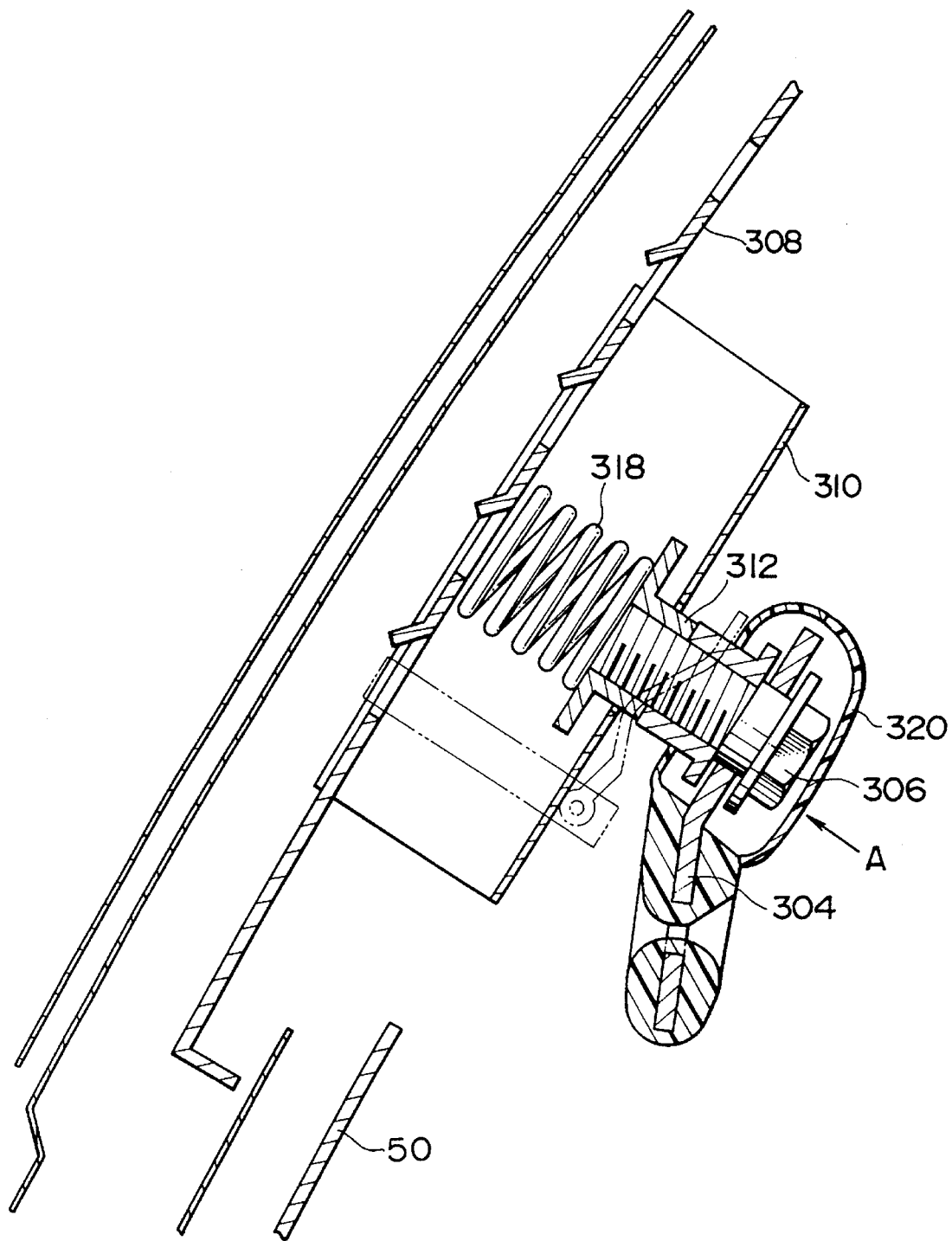
FIG. 30 is a sectional view showing the operation of the seat belt device for the automobile shown in FIG. 29.

In an embodiment shown in FIGS. 29 and 30, a seat belt anchor 302 includes an anchor plate 304 for supporting the seat belt 54, a bolt 306 for fixing the anchor plate 304, a rail 308 fixed to the center pillar 50, a slider 310 movable along the rail 308, and a nut 312 for screwing the bolt 306 mounted on the slider 310 immovably inward of the compartment and movably outward of the compartment. The bolt 306 is inserted into the anchor plate 304 and a cylindrical spacer 314, and the nut 312 with a flange 313 is fixed to the bolt 306 with screwing from outward of the slider 310.

A displacement permission space 316 is defined between the rail 308 and the nut 312, and an absorbing means 318 is disposed in the displacement permission space 316. The absorbing means 318 is constituted by a deformable part. While the absorbing means 318 is constituted by a coil spring in the illustrated embodiment, it can be constituted by a metallic bellows or a plate spring. The absorbing means 318 has also a function of pushing out the nut 312 inward, in addition to an original function of absorbing the energy.

As shown in FIG. 30, when a load of not less than a predetermined value outward of the compartment in the direction indicated by an arrow A is applied to a cap 320 mounted on the anchor plate 304, the cap 320 is deformed to be brought into contact with the bolt 306. Then, the absorbing means 318 is deformed by the bolt 306 and the nut 312, and as a result, the energy due to the load is absorbed. According to the mode described above, the sufficient strength can be ensured against a tensile load of the seat belt. Further, a value of an energy-absorbable load can be arbitrarily determined by selecting the deformable part.

Figure 31:
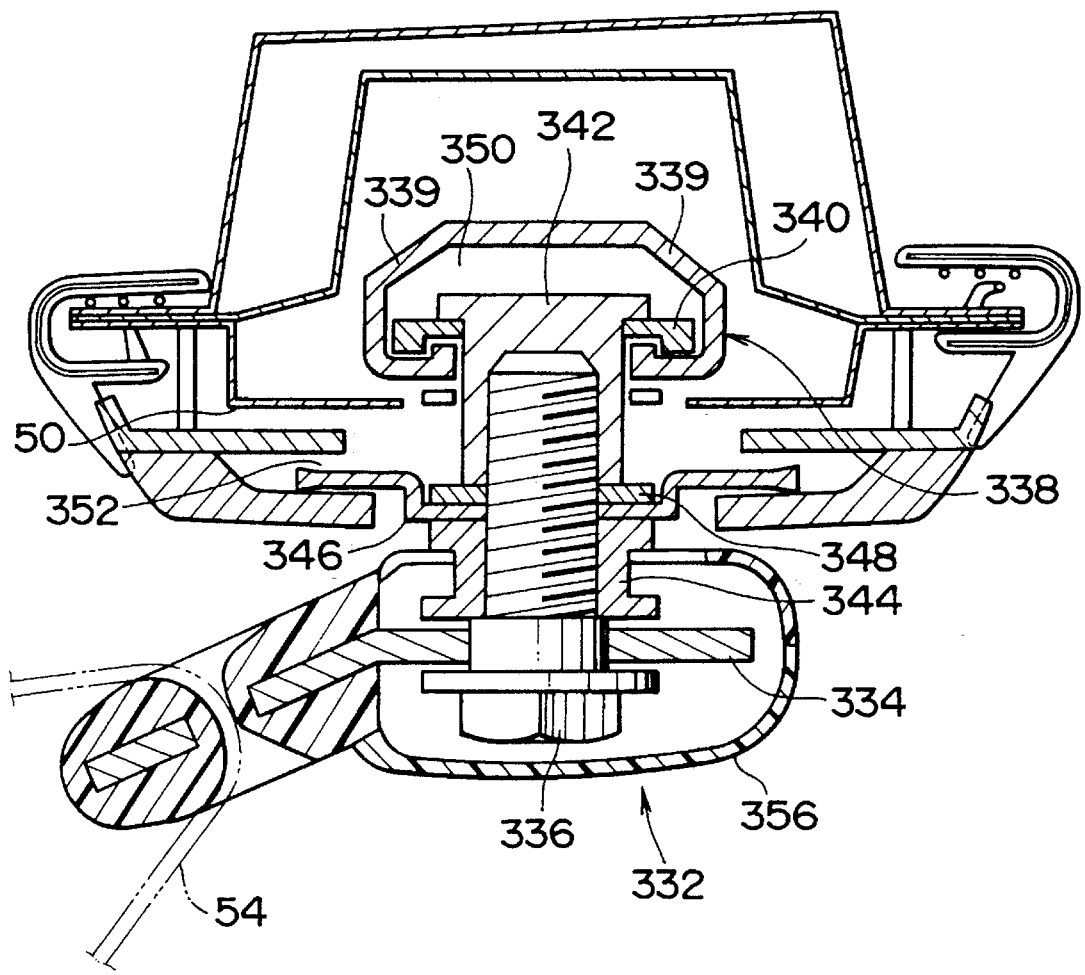
FIG. 31 is a sectional view taken along a substantially horizontal plane of a seat belt device of a slide type for an automobile as a still further embodiment according to the present invention, and showing an anchor plate in a turned state for the convenience of explanation.

In an embodiment shown in FIG. 31, a seat belt anchor 332 includes an anchor plate 334 for supporting the seat belt 54, a bolt 336 for fixing the anchor plate 334, a rail 338 embedded in the center pillar 50 and having a pair of outwardly tapered constraint portions 339 provided at portions on the outside of the compartment, a slider 340 movable along the rail 338 and deformable by the constraint portions 339 of the rail, and a nut 342 for screwing the bolt 336 and fixed to the slider 340. The bolt 336 is inserted into the anchor plate 334 and a cylindrical spacer 344. Further, an annular plate 346 and a washer 348 are inserted in this order onto the bolt 336, and the bolt 336 is screwed into the nut 342 welded to the slider 340. The rail 338 is formed so as to surround the slider 340.

A displacement permission space 350 is defined between the rail 338 and the slider 340, and an absorbing means is constituted by the constraint portions 339 of the rail and the slider 340. Further, another displacement permission space 352 is defined between the plate 346 and the center pillar 50, and another energy absorbing means is constituted by the plate 346.

Figure 32:
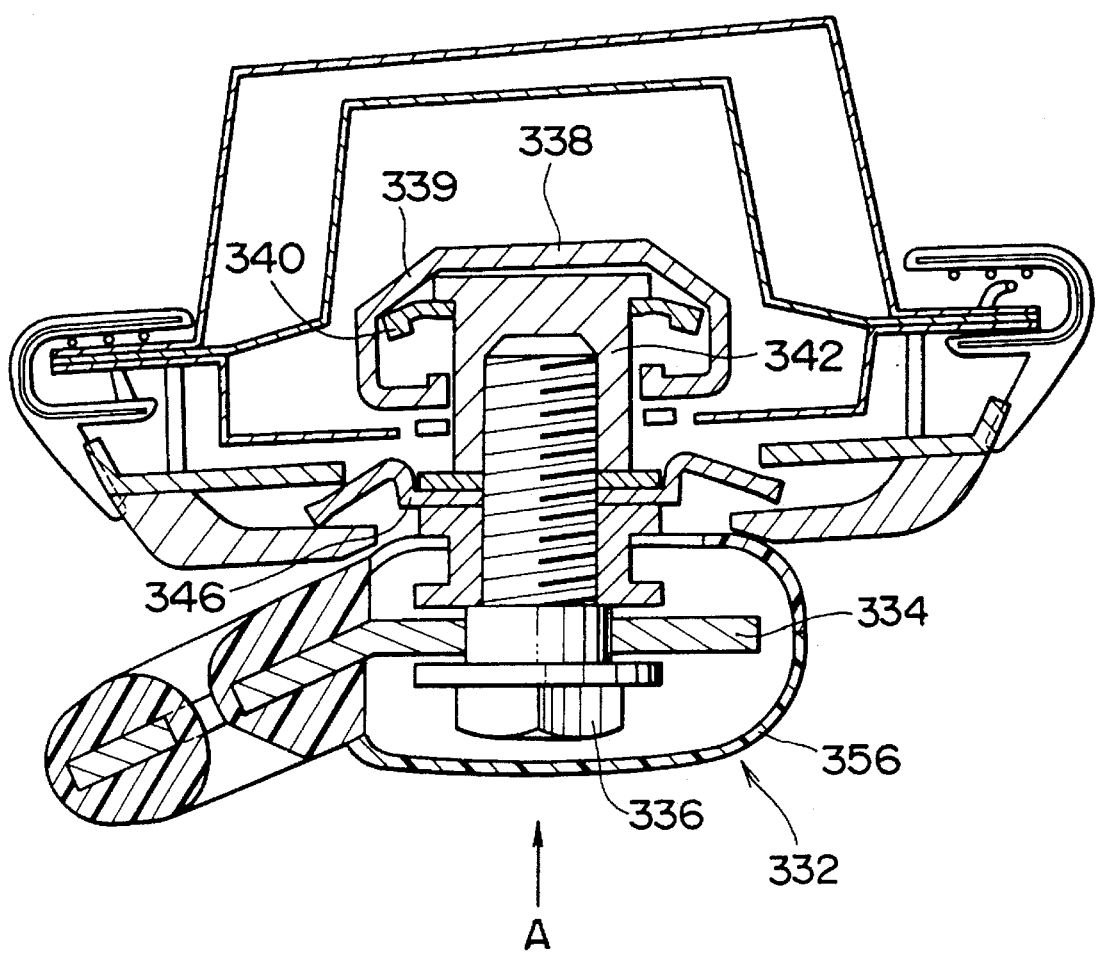
FIG. 32 is a sectional view showing the operation of the seat belt device for the automobile shown in FIG. 31.
Figure 33:
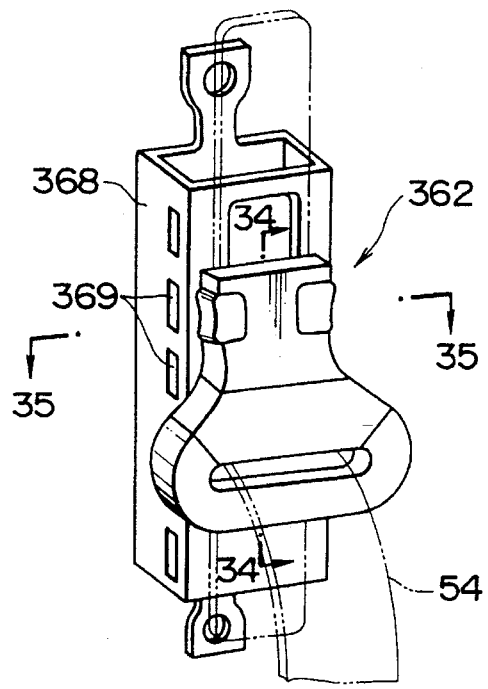
FIG. 33 is a perspective view showing a seat belt device of a slide type for an automobile as a yet further embodiment according to the present invention.
Figure 34:
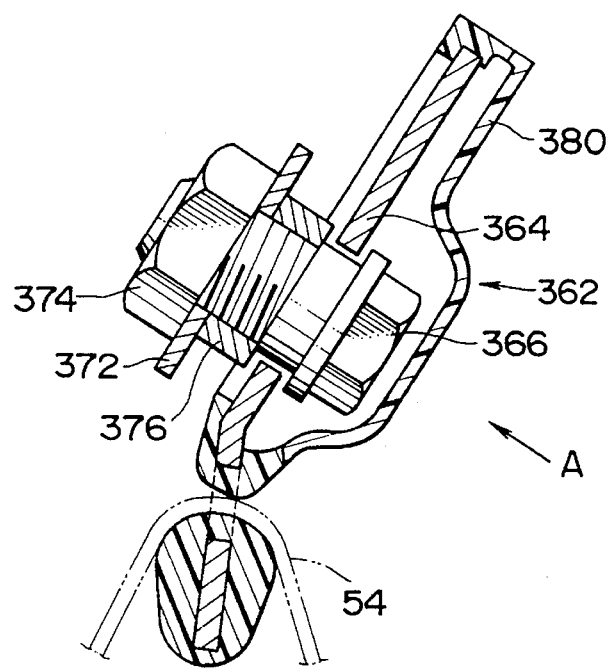
FIG. 34 is a sectional view taken along a line 34—34 in FIG. 33.
Figure 35:
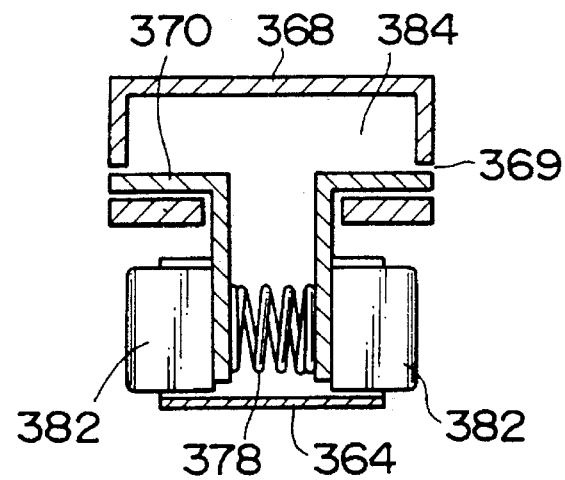
FIG. 35 is a sectional view taken along a line 35—35 in FIG. 33.
Figure 36:
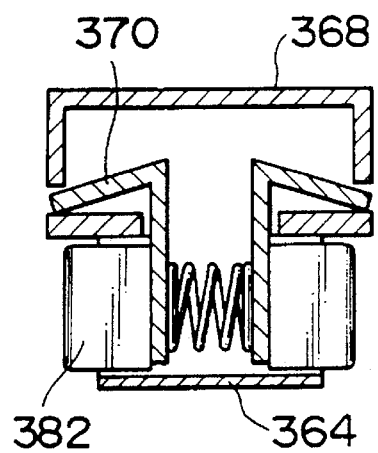
FIG. 36 is a sectional view similar to that of FIG. 35 and showing the operation of the seat belt device for the automobile shown in FIG. 33.

As shown in FIG. 32, when a load of not less than a predetermined value outward of the compartment in the direction indicated by an arrow A is applied to a cap 356, the cap 356 is deformed to be brought into contact with the bolt 336, and the bolt 336 and the nut 342 are displaced. In this manner, the plate 346 is butted against the center pillar 50 and deformed. Further, the slider 340 is butted against the constraint portions 339 of the rail and deformed to absorb the energy. It is also possible to absorb the energy only by the deformation of the slider 340 or the plate 346. According to the mode described above, the sufficient strength can be ensured against a tensile load of the seat belt. Further, since the rail is embedded in the center pillar, the energy can be absorbed by effectively using an existing space in a seat belt device of a position adjustable type.

In an embodiment shown in FIGS. 33 through 36, a seat belt anchor 362 includes an anchor plate 364 for supporting the seat belt 54, a bolt 366 for fixing the anchor plate 364, a rectangular rail 368 in section embedded in the center pillar (not shown) and having a plurality of positioning holes 369 at intervals in the vertical direction, a slider 372 movable along the rail 368 and having a pair of lock plates 370 capable of being inserted into and drawn out of each positioning hole 369 of the rail, and a nut 374 for fixing the bolt 366 to the slider 372. The bolt 366 is inserted into the anchor plate 364 and a spacer 376, and further inserted through the slider 372 disposed in the rail 368 and welded with the nut 374, and the bolt 366 is screwed into the nut 374. The pair of lock plates 370 respectively take the L-like planar shape. The pair of lock plates are pushed out by a coil spring 378 so as to be apart from each other, and then fitted in the positioning holes 369 of the rail 368. When a pair of knobs 382 provided on the cap 380 are pushed with two fingers, the pair of lock plates 370 are moved to come closer to each other and get out of the positioning holes 369.

A displacement permission space 384 is defined between the rail 368 and the lock plates 370, and the lock plates 370 constitute an absorbing means.

When a load of not less than a predetermined value outward of the compartment in the direction indicated by an arrow A is applied, the cap 380 and the anchor plate 364 are displaced to deform the lock plates 370, and as a result, the energy due to the load is absorbed. According to the mode described above, any part for the absorption of energy is not needed, and the seat belt device of the present invention can cope with the absorption of energy only by the slight modification of the lock plates.

Figure 37:
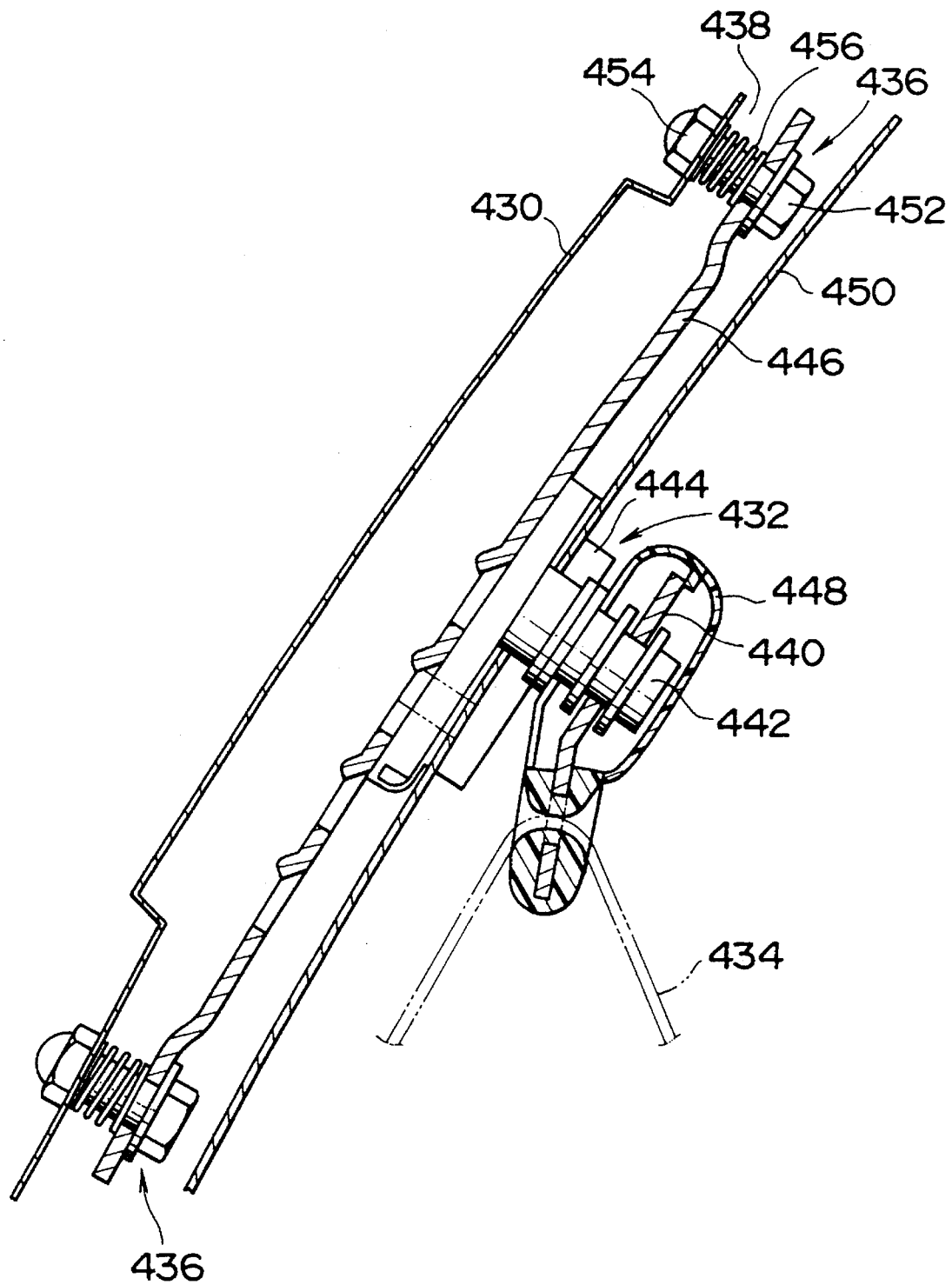
FIG. 37 is a sectional view taken along a substantially vertical plane of a seat belt device of a slide type for an automobile as a yet further embodiment according to the present invention.

As shown in FIG. 37, according to the present invention, there is also provided a seat belt device for an automobile including a seat belt anchor 432 mounted on a center pillar 430 having a structure well known per se for the automobile and composed of a plurality of parts and a seat belt 434 slidably supported by the seat belt anchor 432. The seat belt device of the present invention comprises a mounting means 436 for mounting one of the plurality of parts of the seat belt anchor 432 on the center pillar 430, and a space 438 for permitting the part mounted by the mounting means 436 or the mounting means 436 to displace outward of the compartment to absorb the energy. The part mounted by the mounting means 436 or the mounting means 436 is deformed in the displacement permission space 438 to absorb the energy.

In the embodiment shown in FIG. 37, the seat belt anchor 432 includes an anchor plate 440 allowing for piercing of the seat belt 434 to support the same, a bolt 42 for fixing the anchor plate 440, a slider 444 having a nut (not shown) for screwing the bolt 442, and a rail 446 for movably supporting the slider 444. A resin-made cap 448 is mounted on the anchor plate 440, and the rail 446 is covered with a covering plate 450 fixed to the slider 444. The detailed structure of the slider 444 and the rail 446 will be described later.

The mounting means 436 is composed of a bolt 452, a nut 454 welded to the center pillar 430, and a coil spring 456. The rail 446 is mounted on the center pillar 430 by the mounting means 436 disposed at intervals in the vertical direction. On the other hand, the displacement permission space 438 is defined between the center pillar 430 and the rail 446. The coil spring 456 is disposed in the displacement permission space 438, and functions as a spacer for pushing out the rail 446 inward of the compartment, while absorbing the energy due to the load applied to the seat belt anchor 432.

Figure 38A:
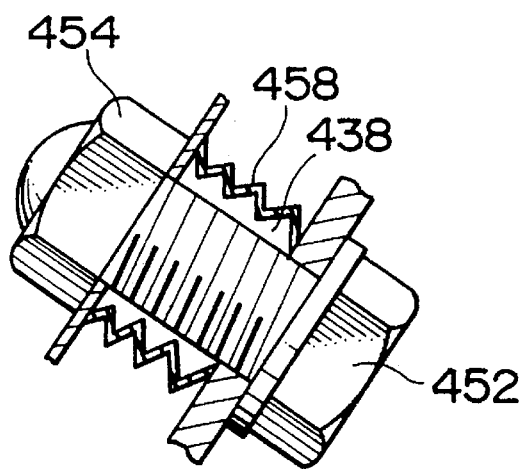
FIG. 38 is a sectional view showing energy absorption parts which can be disposed between a center pillar and a rail of the seat belt device for the automobile shown in FIG. 37, in which FIGS. 38(a) and 38(b) respectively show different absorption parts.
Figure 38B:
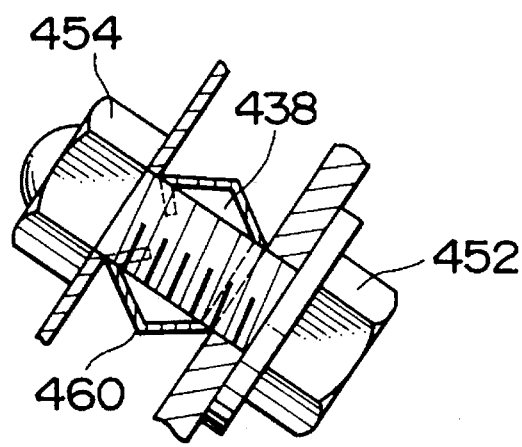

As shown in FIG. 38, instead of the coil spring 456, a bellows spacer 458 or a plate spring 460 can be disposed in the displacement permission space 438. The coil spring 456, the bellows spacer 458 and the plate spring 460 can be formed by plastics, in addition to metal. In case that these parts are formed by the metal, the energy can be absorbed by the elastic or plastic deformation of the parts. On the other hand, in case that these parts are formed by the plastics, the energy can be absorbed by the plastic deformation of the parts.

In the embodiment shown in FIG. 37, since a capped nut is used as the nut 454, the screwing amount of the bolt 452 can be held constant. As a result, since the distance of the displacement permission space 438 can be held constant, the embodiment using the capped nut ensures that the coil spring 456 or the like provided as the energy absorbing means is deformed by a predetermined amount by the application of a predetermined load. The similar effect can be also obtained by using a step bolt for the bolt 452.

In the embodiment shown in FIG. 37, the slider 444 can be moved vertically along the rail 446 and fixed to a predetermined height. The seat belt anchor 432 is of a height adjustable type. Then, the displacement permission space 438 is defined between the rail 446 and the center pillar 430, and the mounting means 436 includes the coil spring 456 provided as an energy absorbing part disposed in the displacement permission space 438.

Figure 39:
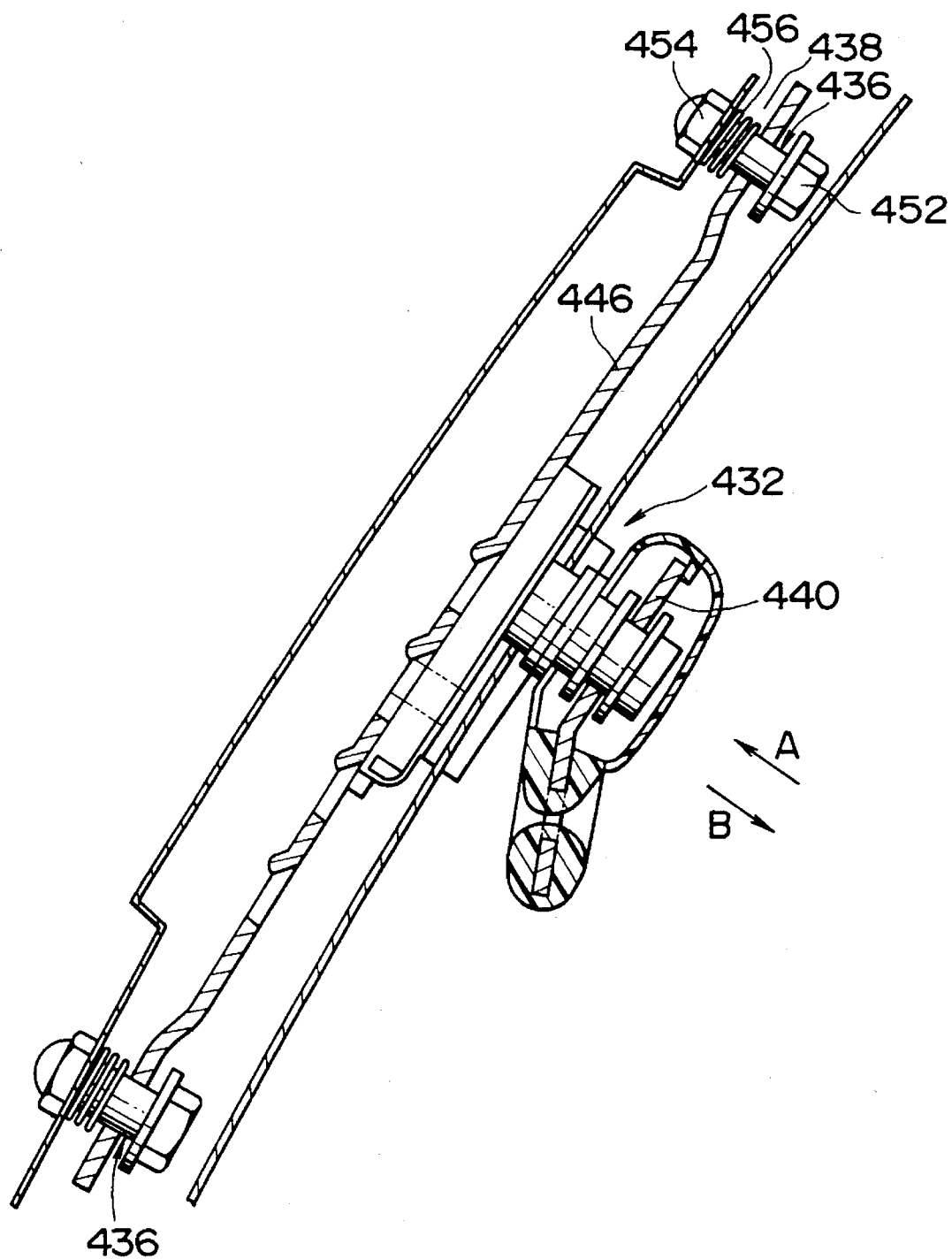
FIG. 39 is a sectional view showing the operation of the seat belt device for the automobile shown in FIG. 37.

As shown in FIG. 39, as a result that the side of an automobile is in collision, the head of an occupant is struck against the seat belt anchor 432, and a load outward of the compartment in the direction indicated by an arrow A is applied to the seat belt anchor 432. In this case, the rail 446 is displaced within the displacement permission space 438 to deform the coil spring 456, and as a result, the energy due to the load is absorbed.

The part of the seat belt anchor mounted by the mounting means or the mounting means has rigidity against a load inward of the compartment and rigidity against a load outward of the compartment, the latter being lower than the former. In other words, the part or the mounting means is mounted such that it is hard to deform by the load inward of the compartment, while being easy to deform by the load outward of the compartment. For example, as shown in FIG. 39, the rail 446 is supported by the bolt 452 of the mounting means 436. Thus, even though a load inward of the compartment in the direction indicated by an arrow B is applied to the rail 446, the rail is not substantially deformed and exerts large rigidity. On the other hand, in case that a load outward of the compartment in the direction indicated by an arrow A is applied, when the load exceeds a predetermined value, the coil spring 456 is deformed and exerts rigidity smaller than the rigidity against the load in the direction indicated by the arrow B.

A plurality of displacement permission spaces can be provided to absorb the energy at a plurality of portions. A combination of the plurality of displacement permission spaces and the mounting means corresponding to each displacement permission space or one of the plurality of parts of the seat belt anchor can be selectively obtained by selecting the plurality of displacement permission spaces, the mounting means and the part of the seat belt anchor among the embodiments described before or later. According to the mode shown in FIGS. 37 to 39, the energy can be absorbed effectively in a small space.

Figure 40:
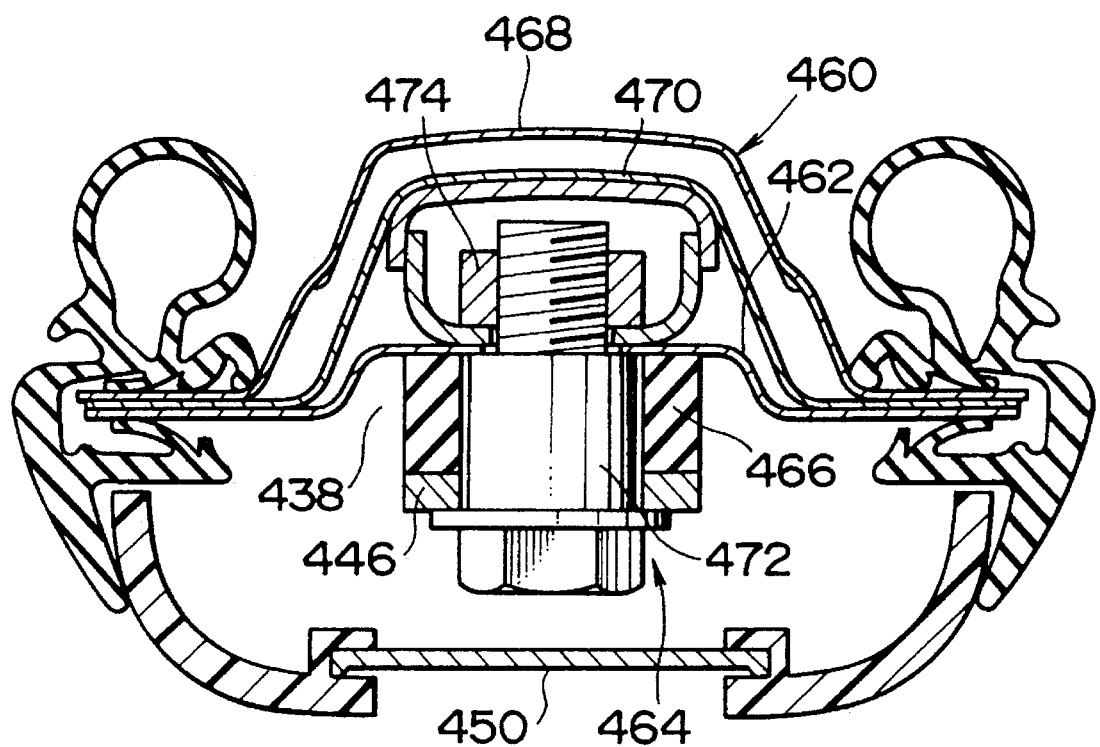
FIG. 40 is a sectional view taken along a substantially horizontal plane of a seat belt device for an automobile as a yet further embodiment according to the present invention.

In an embodiment shown in FIG. 40, the displacement permission space 438 is defined between the rail 446 and a pillar inner panel 462 of the center pillar 460, and the mounting means 464 includes an energy absorbing part 466 disposed in the displacement permission space 438. The center pillar 460 is composed of the pillar inner panel 462, a pillar outer panel 468 spaced outward from the pillar inner panel 462, and a reinforcing panel 470 disposed in the space between the inner and outer panels. The center pillar is formed in a closed section by welding flanges of three panels in an overlap state to one another. On the other hand, the mounting means 464 includes a step bolt 472, the energy absorbing part 466, and a nut 474 welded to the outside surface of the pillar inner panel 462.

Figure 41A:
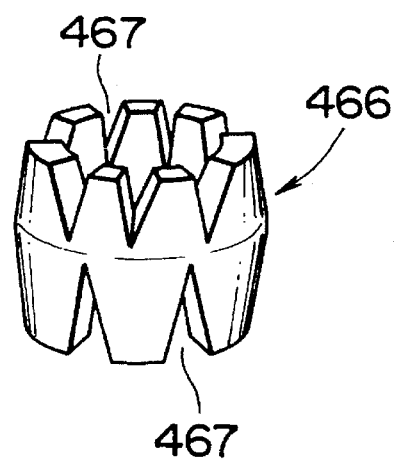
FIG. 41(a) is a perspective view showing the same.
Figure 41B:
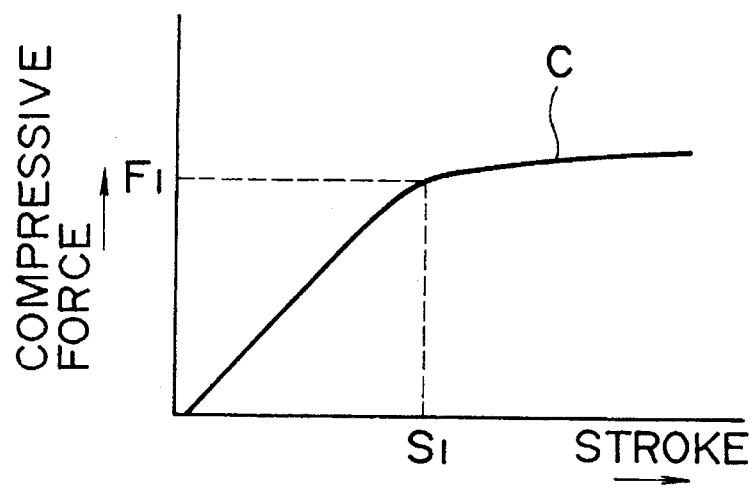
FIG. 41(b) is a characteristic graph of the same.

As shown in FIG. 41(a), the energy absorbing part 466 is formed cylindrically by rubber, and has zigzag-shaped notches 467 on both axial ends. While the absorbing part 466 can be also formed cylindrically by plastics without any notch, the absorbing part formed by rubber as shown in FIG. 41(a) is preferably used, since the absorbing part thus formed provides the load characteristic C shown in FIG. 41(b). The load characteristic C is approximately linear until compressive force becomes to be equal to a fixed value $F_1$, and a stroke corresponding to the amount of compression becomes to be equal to a fixed value $S_1$. However, in the range of the compressive force exceeding the fixed value, the stroke is sharply increased with the slight increment of the compressive force. In other words, when the stroke is not less than the fixed value $S_1$, the compressive force becomes approximately constant. Accordingly, the approximately constant energy can be absorbed by using the load characteristic for the absorption of energy, so that it is easy to tune the energy to be absorbed. Further, according to the mode described above, the conventional seat belt device can be changed into the seat belt device according to the present invention only by slightly modifying the shape of the conventional seat belt device. Furthermore, the amount of energy to be absorbed can be arbitrarily determined by selecting the energy absorbing part.

Figure 42:
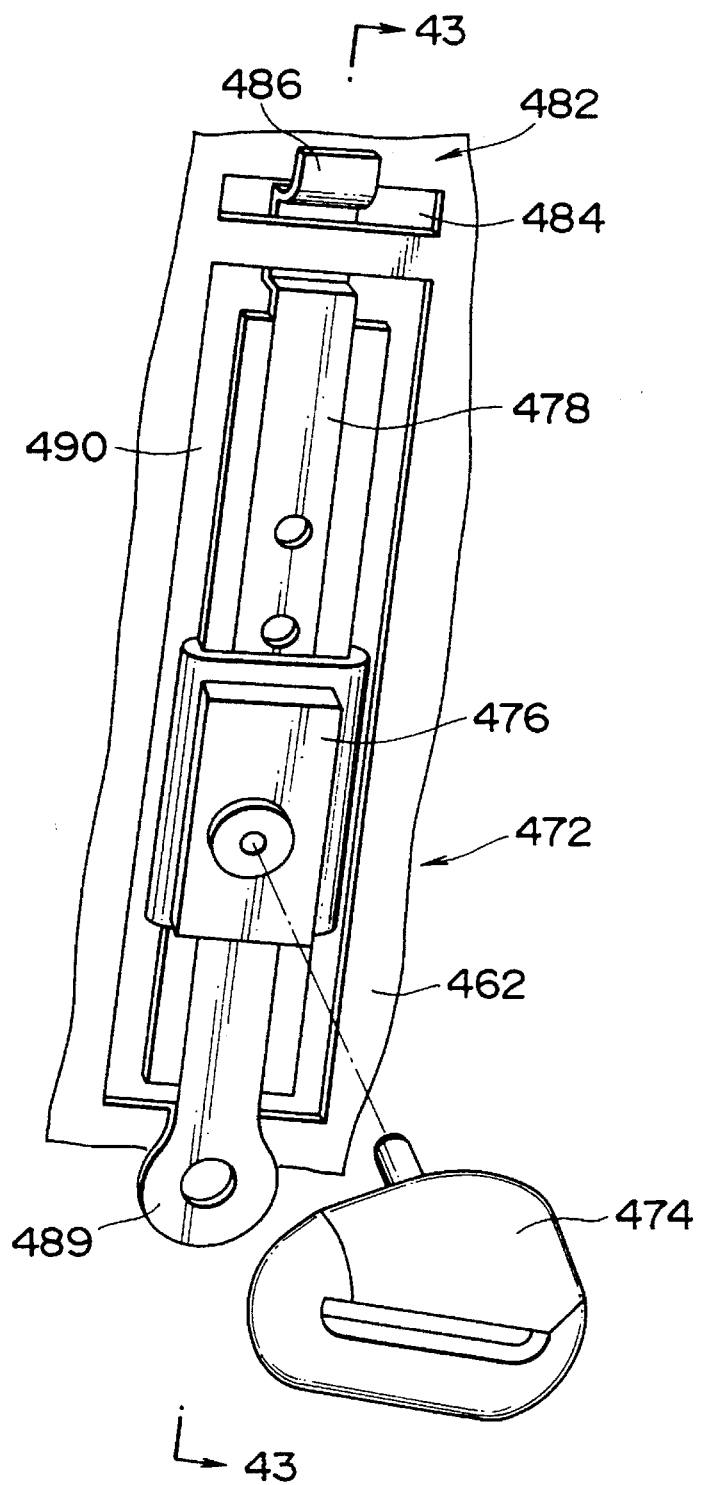
FIG. 42 is a perspective view showing a seat belt device for an automobile as a yet further embodiment according to the present invention, in which a part is partially shown in an exploded state.
Figure 43A:
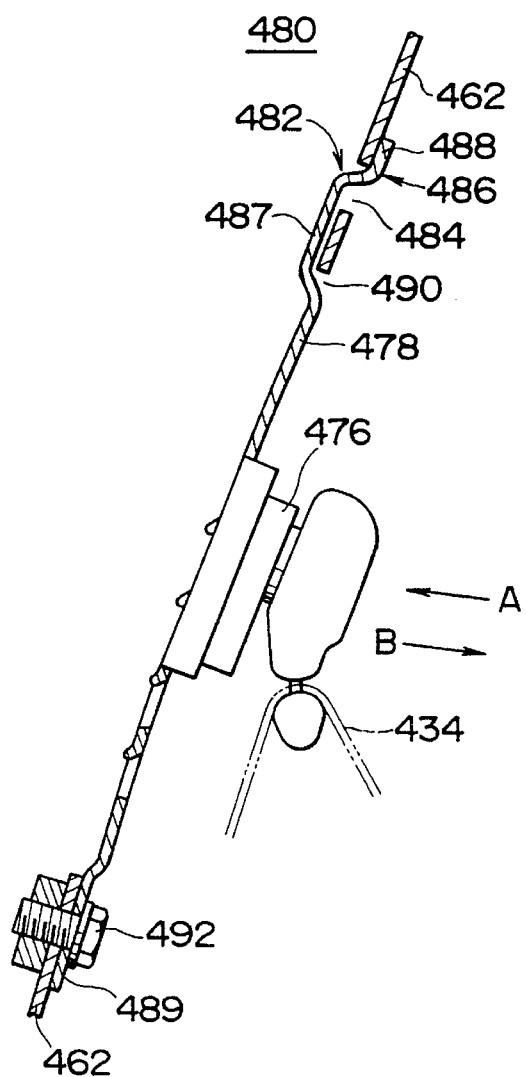
FIG. 43(a) shows the state of the seat belt device before the absorption of energy.
Figure 43B:
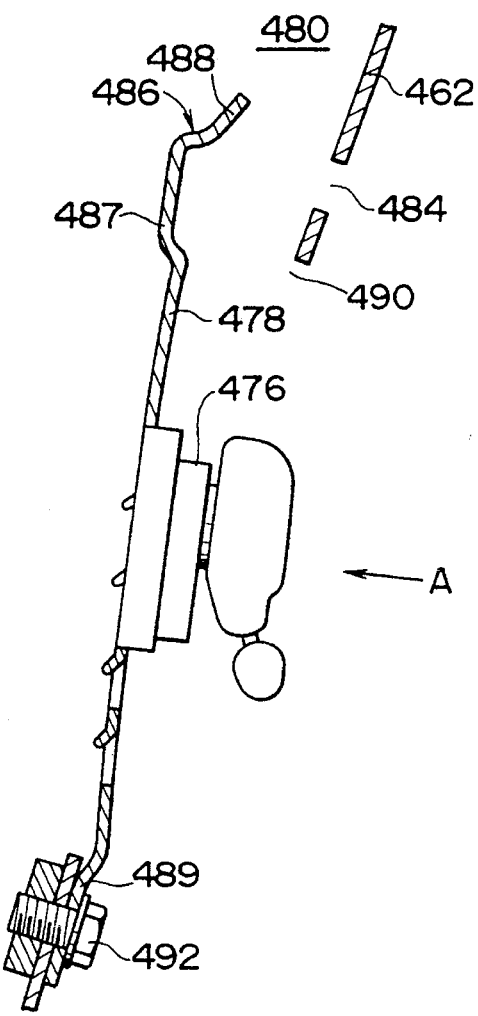
FIG. 43(b) shows the state of the seat belt device after the absorption of energy.

In an embodiment shown in FIGS. 42 through 44, a seat belt anchor 472 includes an anchor plate 474 for slidably supporting the seat belt 434, a slider 476 for mounting the anchor plate 474, and a rail 478 for movably supporting the slider 476. The rail 478 is mounted on the pillar inner panel 462 of the center pillar.

A displacement permission space 480 is defined between the rail 478 and a reinforcing panel (not shown) of the center pillar. On the other hand, a means 482 for mounting the rail 478 on the pillar inner panel 462 is composed of a hole 484 provided in the pillar inner panel 462, and one end 486 of the rail 478 inserted into the hole 484 inseparably by a load inward of the compartment and separably by a load outward of the compartment. Herein, the meaning of what the rail is inserted into the hole inseparably by the load inward of the compartment covers that when the seat belt supports an impact load applied from an occupant such as to fulfill the function of the seat belt, the rail cannot be separated from the hole only by the impact load. The same may be said of the following embodiments.

In the embodiment shown in FIGS. 42 and 43, the end 486 of the rail 478 is composed of a connecting portion 487 having a channel-shaped section, and a hook portion 488 extending from the connecting portion 487. On the other hand, a hole 490 for disposing the center portion of the rail 478 is provided below the hole 484 in the pillar inner panel 462 for mounting the rail. The upper end 486 of the rail 478 is inserted into the hole 490 from the inside of the hole 490, and the hook portion 488 is inserted into the hole 484 from the outside of the hole 484 to bring out the hook portion 488 toward the inside of the pillar inner panel 462. Thereafter, the lower end 489 of the rail 478 is attached to the inside surface of the pillar inner panel 462 to mount the lower end 489 on the pillar inner panel 462 with the bolt 492.

As a result that the rail 478 is mounted, when the inward load is applied to the rail 478, the connecting portion 487 is brought into contact with the outside surface of the pillar inner panel 462. On the other hand, when the outward load is applied to the rail 478, the hook portion 488 is brought into contact with the inside surface of the pillar inner panel 462. The hook portion 488 is located distant from the connecting portion 487 with respect to the slider 476 corresponding to an input portion of a load, and the rigidity of the hook portion 488 is smaller than that of the connecting portion 487. Thus, when the load outward of the compartment in the direction indicated by an arrow A becomes to be equal to a predetermined value, the end 486 is separated from the pillar inner panel 462. However, the end 486 is not separated from the pillar inner panel 462 by the load inward of the compartment in the direction indicated by an arrow B.

Figure 44A:
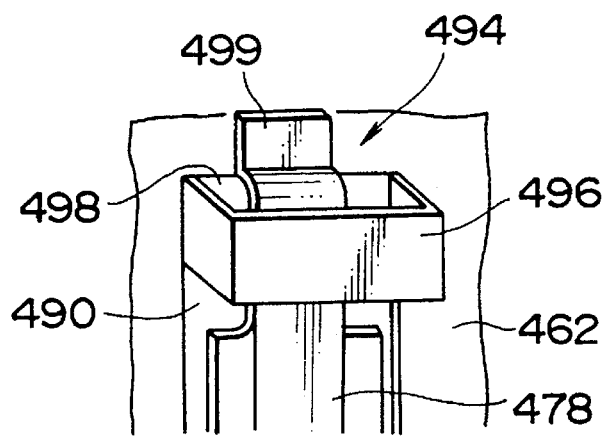
FIGS. 44(a) and 44(b) show respectively different embodiments.

A mounting means 494 shown in FIG. 44(a) is composed of a hole 498 formed by welding an enclosing material 496 having a channel-like planer shape to an upper portion of the hole 490 of the pillar inner panel 462, and a slightly outward bent end 499 of the rail 478. When the inward load is applied to the rail 478, the end 499 is brought into contact with the outside surface of the enclosing material 496. On the other hand, when the outward load is applied to the rail 478, the end 499 is brought into contact with the inside surface of the pillar inner panel 462. For the reasons similar to those described above, when the load outward of the compartment becomes to be equal to a predetermined value, the end 499 is separated from the pillar inner panel 462, whereas the end 499 is not separated from the pillar inner panel by the load inward of the compartment.

Figure 44B:
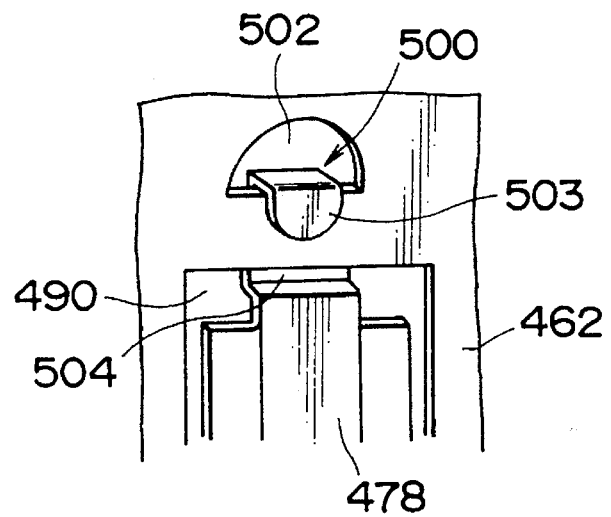

A mounting means 500 shown in FIG. 44(b) is composed of a hole 502 provided in the pillar inner panel 462 of the center pillar, and an end 503 of the rail 478 inserted into the hole 502. The end 503 is formed by bending the rail from a connecting portion 504 in an approximately L-like shape. When the inward load is applied to the rail 478, the connecting portion 504 is brought into contact with the outside surface of the pillar inner panel 462. On the other hand, when the outward load is applied to the rail 478, the outside surface of the end 503 is brought into contact with the inside surface of the pillar inner panel 462. Then, when the outward load becomes to be equal to a predetermined value, the L-shaped end 503 is extended and separated from the pillar inner panel 462.

As shown in FIG. 43, when a load of not less than a predetermined value outward of the compartment in the direction indicated by an arrow A is applied to the rail 478 through the slider 476, the hook portion 488 at the end 486 of the rail gets out of the hole 484 and is separated. Then, the rail 478 is deformed centering around the end 489 fixed by the bolt 492, and as a result, the energy is absorbed by the separation and deformation of the rail. According to the mode described above, the energy can be absorbed by a simple structure, and the seat belt device of the present invention can be used in common to different kinds of automobiles. Further, any special part for the absorption of energy is not needed.

In the embodiment shown in FIGS. 42 and 43, only the upper end 486 of the rail 478 is concerned with the mounting means 482, and the lower end 489 is fixed by the bolt 492. Otherwise, the lower end 489 may be also mounted by a mounting means having a structure similar to that of the mounting means 482.

Figure 45:
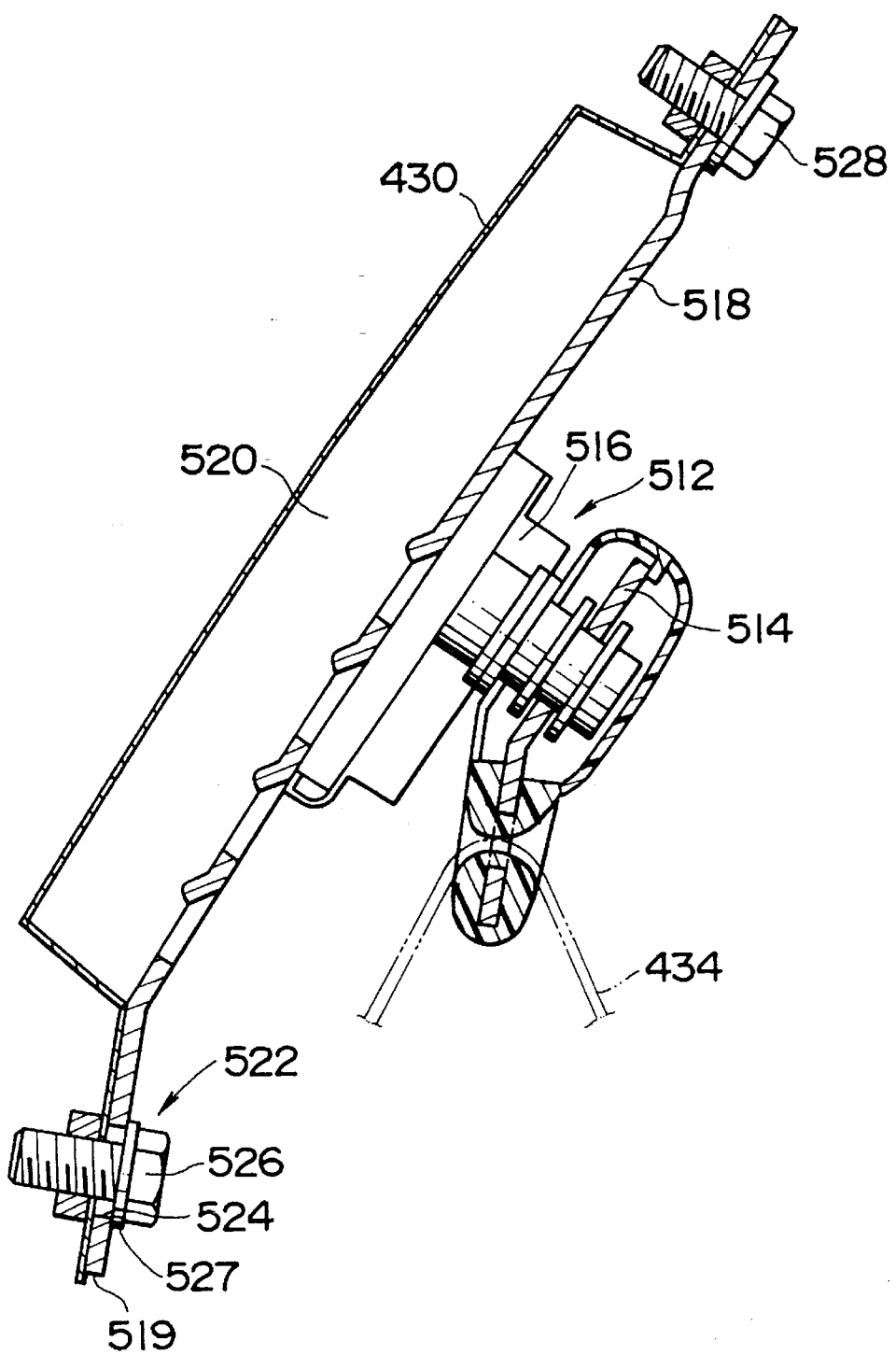
FIG. 45 is a sectional view taken along a substantially vertical plane of a seat belt device for an automobile as a yet further embodiment according to the present invention.
Figure 46:
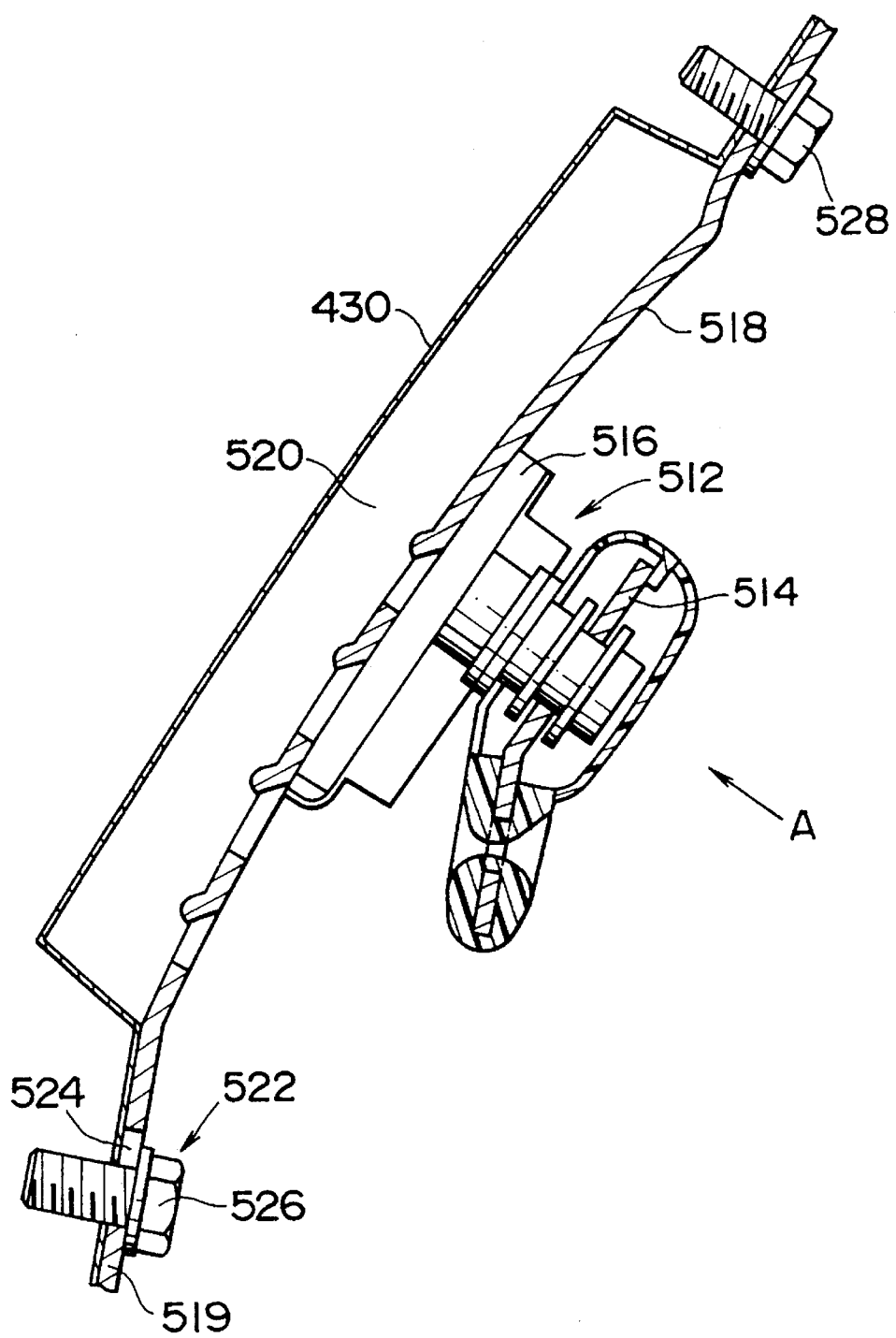
FIG. 46 is a sectional view showing the operation of the seat belt device for the automobile shown in FIG. 45.

In an embodiment shown in FIGS. 45 and 46, a seat belt anchor 512 includes an anchor plate 514 for slidably supporting the seat belt 434, a slider 516 for mounting the anchor plate 514, and a rail 518 for movably supporting the slider 516.

A displacement permission space 520 is defined between the rail 518 and the center pillar 430. The rail 518 is mounted on the center pillar 430 by a mounting means 522 and a bolt 528. The mounting means 522 is composed of a slot 524 provided in one end 519 of the rail 518, and a bolt 526 inserted through the slot 524 and screwed into the center pillar 430. The slot 524 is provided such that the longer axis extends in the vertical direction. On the other hand, the bolt 526 is screwed into the center pillar 430 such that the end 519 of the rail 518 can be slid by the load outward of the compartment. Namely, as a result that the bolt 526 is screwed, friction is generated between a collar 527 of the bolt and the inside surface of the rail 518, and further between the outside surface of the rail 518 and the inside surface of the center pillar 430. However, when the frictional force is equal to a load of not less than a predetermined value, the screwing amount of the bolt 526 is determined not so as to counteract the load.

When a load of not less than a predetermined value outward of the compartment in the direction indicated by an arrow A is applied to the seat belt anchor 512, the load is transferred to the rail 518 through the slider 516, and the end 519 of the rail 518 is slid against the friction force due to the screwing amount of the bolt 526. The rail 518 is also deformed in the displacement permission space 520, and as a result, the energy is absorbed by the sliding and deformation of the rail 518. According to the mode described above, the energy can be absorbed by a simple structure, and any special part for the absorption of energy is not needed.

Figure 47:
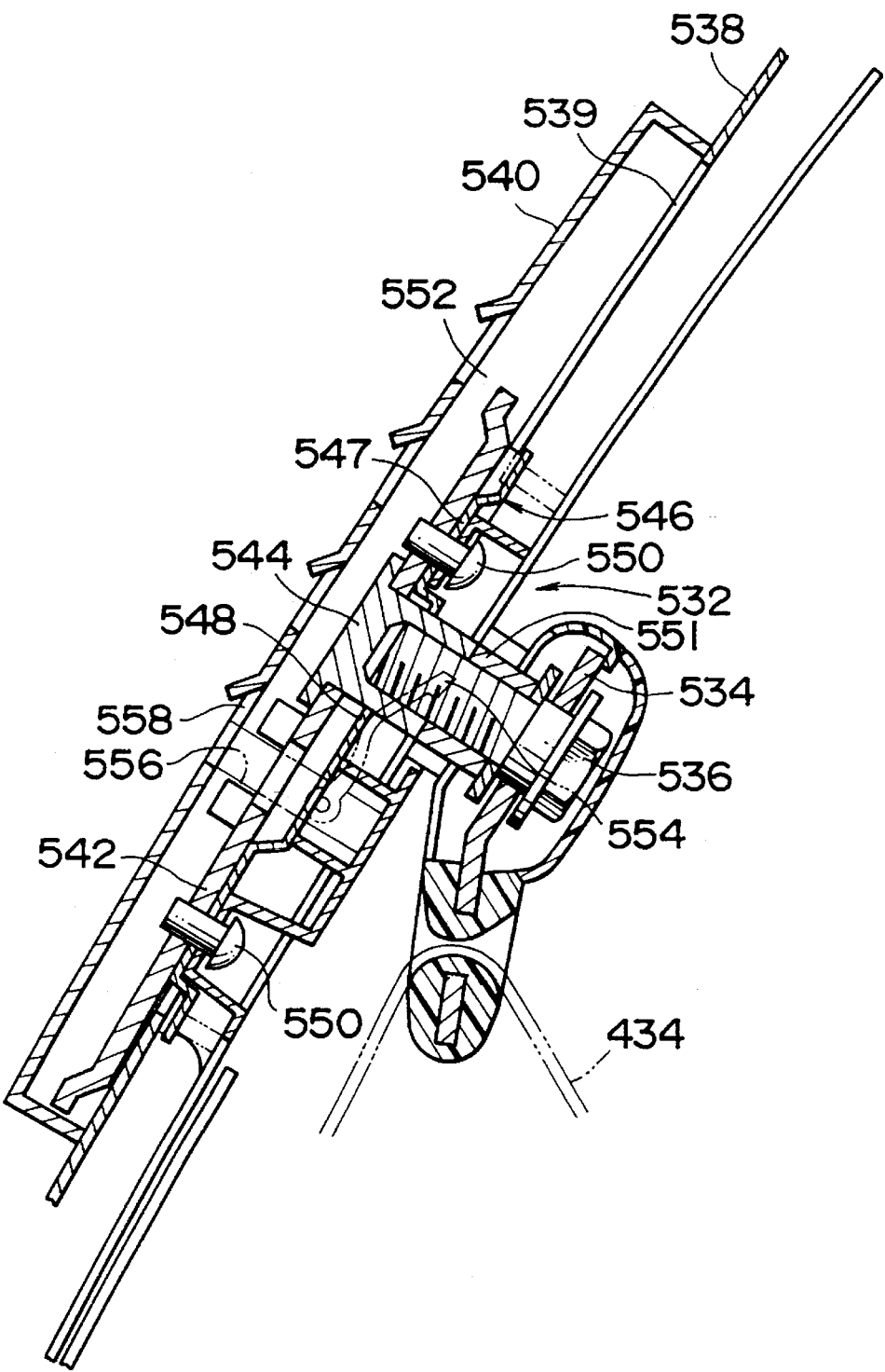
FIG. 47 is a sectional view taken along a substantially vertical plane of a seat belt device for an automobile as a yet further embodiment according to the present invention.
Figure 48:
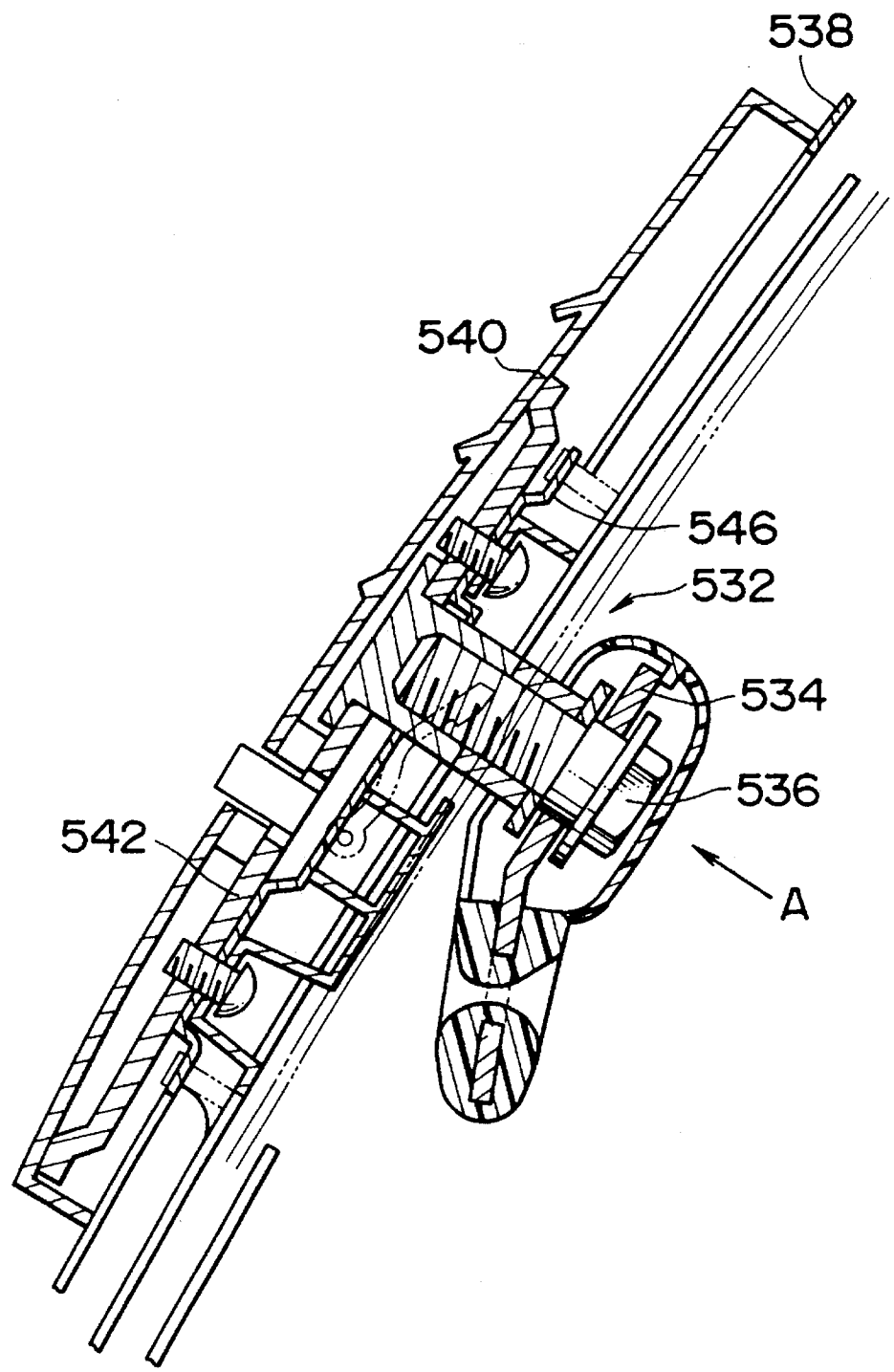
FIG. 48 is a sectional view showing the operation of the seat belt device for the automobile shown in FIG. 47.

In an embodiment shown in FIGS. 47 and 48, a seat belt anchor 532 includes an anchor plate 534 for supporting the seat belt 434, a bolt 536 for mounting the anchor plate 534, a rail 540 embedded in a center pillar 538 and welded to the center pillar 538, a slider 542 disposed in the center pillar 538 movably along the rail 540, and a nut 544 for screwing the bolt 536 fixed to the slider 542.

In the embodiments shown in FIGS. 37, 40, 42 and 46, the concave portion or the hole is provided in the center pillar 430, and the rail 446, 478 or 518 is disposed so as to face to the concave portion or the hole. On the other hand, in the embodiment shown in FIGS. 47 and 48, the rail 540 is disposed on the outside of the center pillar 538 such that the rail 540 forms a concave portion on the center pillar 538. In this case, the rail 540 is formed so as to have a channel-shaped vertical section, and welded to the center pillar 538 at the upper and lower ends.

A hole 539 extending in the vertical direction is provided in the center pillar 538, and the slider 542 welded with the nut 544 is disposed in the center pillar 538 so as to project the nut 544 inward from the hole 539. The width of the slider 542, that is, the distance of the slider in the direction perpendicular to a plane of FIG. 47 is larger than the width of the hole 539 of the center pillar 538. On the other hand, a plate 546 has two ends 547 each having a width smaller than the width of the hole 539 of the center pillar 538 and an intermediate portion 548 having a width larger than the width of the hole 539. The intermediate portion 548 of the plate 546 is attached to the inside surface of the center pillar 538, and the plate 546 is fixed to the slider 542 with screws 550 inserted through two ends 547. A spacer 551 is attached to the nut 544, and the bolt 536 is screwed into the nut 544 through the spacer 551.

As a result of the mounting described above, a displacement permission space 552 is defined between the rail 540 and the slider 542. The slider 542 is mounted on the center pillar 538 inseparably by a load inward of the compartment and separably by a load of not less than a predetermined value outward of the compartment. In this state, the slider 542 can be moved along the center pillar 538.

A lever 554 is operated by a knob (not shown) well known per se, and a lock pin 556 is drawn out to move the slider 542 to an appropriate position along the rail 540. Then, when the knob is released, the lock pin 556 is fitted into the hole 558 of the rail 540 to fix the slider 542 for use. In this state, when a load of not less than a predetermined value outward of the compartment in the direction indicated by an arrow A is applied to the bolt 536 of the seat belt anchor 532, the plate 546 is deformed, and the slider 542 is separated from the center pillar 538, as shown in FIG. 48. Thus, the energy is absorbed by the deformation of the rail 540 caused by the contact between the rail 540 and the slider 542 and the deformation of the plate 546.

According to the mode described above, since the rail is embedded in the center pillar, the energy can be absorbed by effectively using an existing space, that is, the space provided in the center pillar. Further, since the slider cannot be separated by the load inward of the compartment, the sufficient strength can be ensured against a tensile force applied to the seat belt. Furthermore, since the slider can be separated by the load outward of the compartment, and the plate and the rail are deformed, the amount of energy to be absorbed can be adjusted by selecting the strength of the connection portion between the slider and the center pillar and(/or) the rigidities of the rail and the plate.

Figure 49:
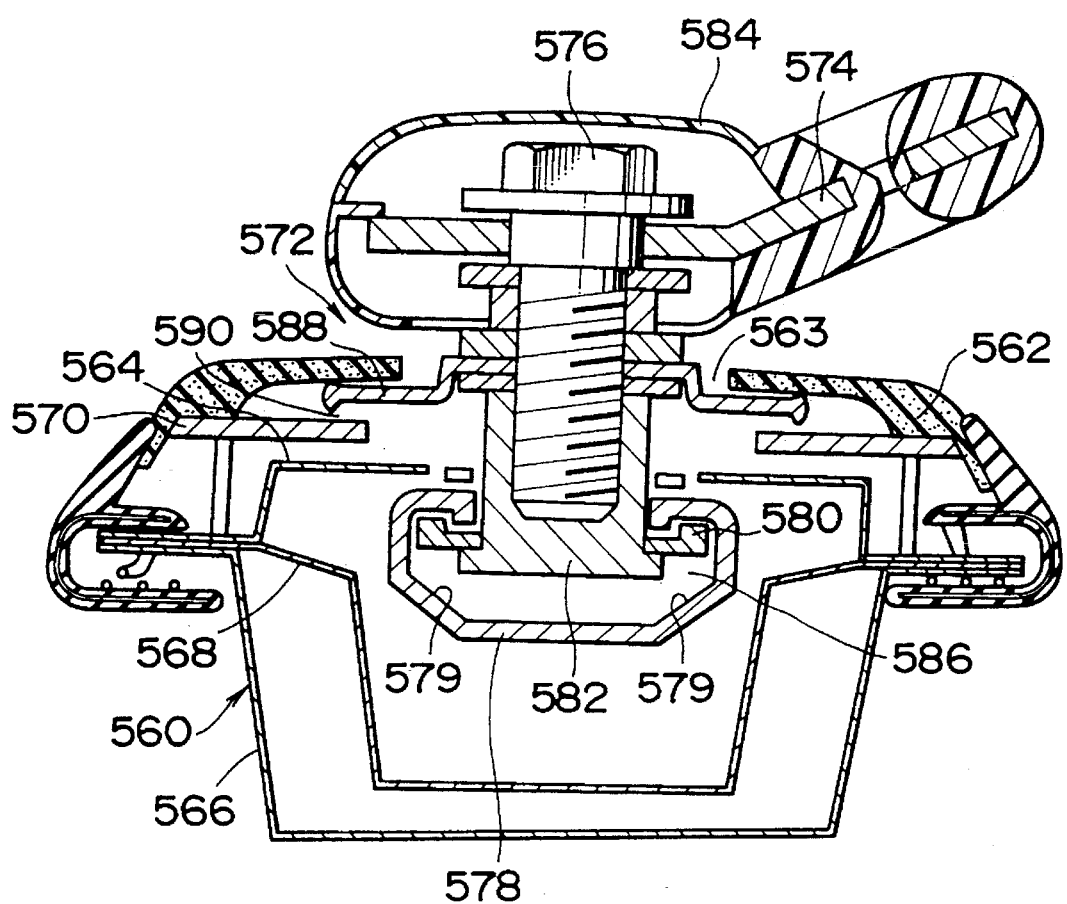
FIG. 49 is a sectional view taken along a substantially horizontal plane of a seat belt device for an automobile as a yet further embodiment according to the present invention, and showing an anchor plate which is turned approximately at 90° for the convenience of explanation.

In an embodiment shown in FIG. 49, an automobile is provided with a garnish 562 disposed on the inside of a center pillar 560. The garnish 562 is formed by an elastic material such as foamed urethane, and has energy absorbability. The center pillar 560 is composed of a pillar inner panel 564, a pillar outer panel 566, a reinforcing panel 568, and a mounting panel 570 projected inward from the pillar inner panel 564. The garnish 562 is mounted on the mounting panel 570 by means of adhesion or with a clip pin well known per se. On the other hand, a seat belt anchor 572 includes an anchor plate 574, a bolt 576 for mounting the anchor plate 574, a rail 578 disposed between the pillar inner panel 564 and the reinforcing panel 568 of the center pillar 560, and a slider 580 disposed movably along the rail 578.

A nut 582 is welded to the slider 580 to be projected inward from the rail 578, and the bolt 576 is screwed into the nut 582 to mount the anchor plate 574 on the slider 580. When a load outward of the compartment in the direction indicated by an arrow A is applied to the seat belt anchor 572, a cap 584 of the anchor plate 574 is butted against the garnish 562 to deform the garnish 562, and as a result, the energy is absorbed. According to the mode described above, the energy can be absorbed by effectively utilizing the deformation of the garnish itself.

In the embodiment shown in FIG. 49, the rail 578 is embedded in the center pillar 560, and has a pair of outwardly tapered constraint portions 579 disposed on the outside of the compartment. A displacement permission space 586 is defined between the slider 580 and the constraint portions 579 of the rail. The slider 580 can be deformed by the constraint portions 579 of the rail. Therefore, according to the embodiment, when a load in the direction indicated by an arrow A is applied to the seat belt anchor 572, the garnish 562 is deformed by the anchor plate 574. Further, the slider 580 is deformed by the constraint portions 579 of the rail 578, and as a result, the energy is absorbed by the deformation of the garnish and that of the slider. According to the mode described above, the energy can be absorbed by effectively utilizing the limited space. In addition, the energy can be absorbed effectively by the deformation of the garnish and that of the slider.

Figure 50:
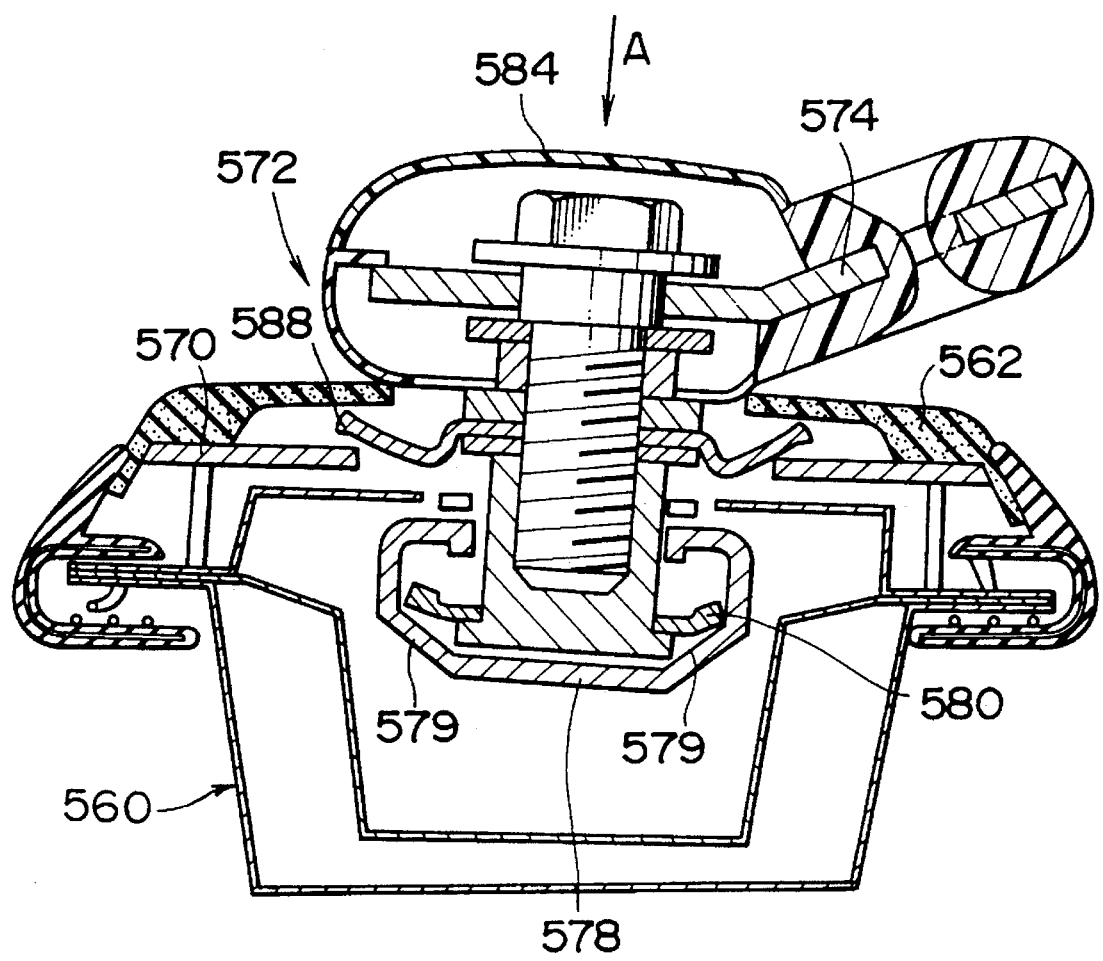
FIG. 50 is a sectional view showing the operation of the seat belt device for the automobile shown in FIG. 49.

Further, in the embodiment shown in FIG. 49, the seat belt anchor 572 includes a plate 588 disposed between the mounting panel 570 of the center pillar 560 and the anchor plate 574 so as to surround the bolt 576. A displacement permission space 590 is defined between the plate 588 and the mounting panel 570 of the center pillar. The plate 588 can be deformed by the mounting panel 570. Thus, according to the so-called multiple energy absorbing structure, when a load outward of the compartment in the direction indicated by an arrow A is applied to the seat belt anchor 572 as shown in FIG. 50, the garnish 562 is deformed by the anchor plate 574, and the plate 588 is deformed by the mounting plate 570. Further, the slider 580 is deformed by the pair of constraint portions 579 of the rail, and as a result, the energy is absorbed by the deformation of each of the garnish, the plate and the slider. According to the mode described above, since the energy is absorbed by the deformation of each of the garnish, the slider and the plate, the absorption of energy can be carried out extremely efficiently in the limited space.

Figure 51:
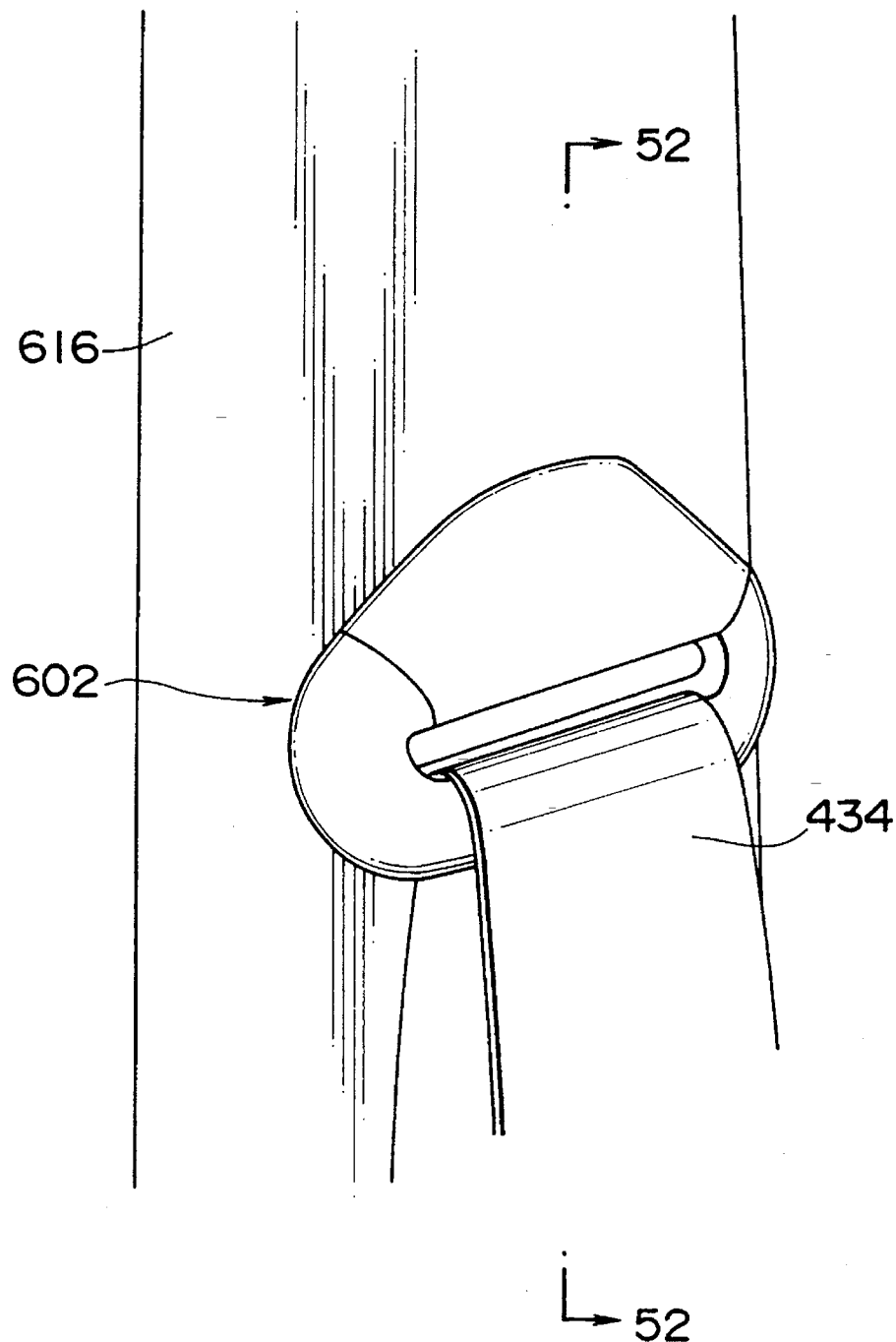
FIG. 51 is a perspective view showing a seat belt device for an automobile as a yet further embodiment according to the present invention.
Figure 52:
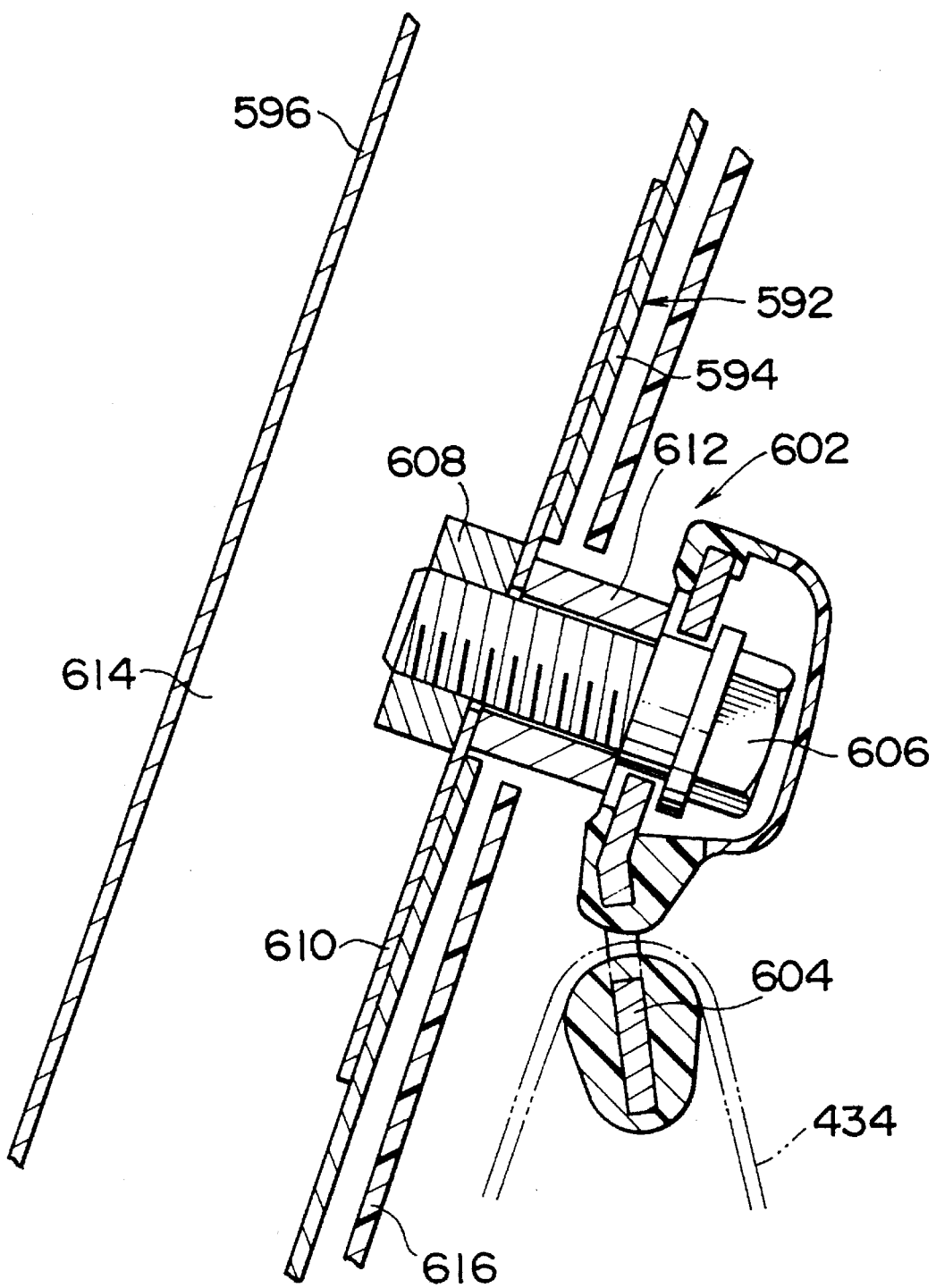
FIG. 52 is a sectional view taken along a line 52—52 in FIG. 51.
Figure 53:
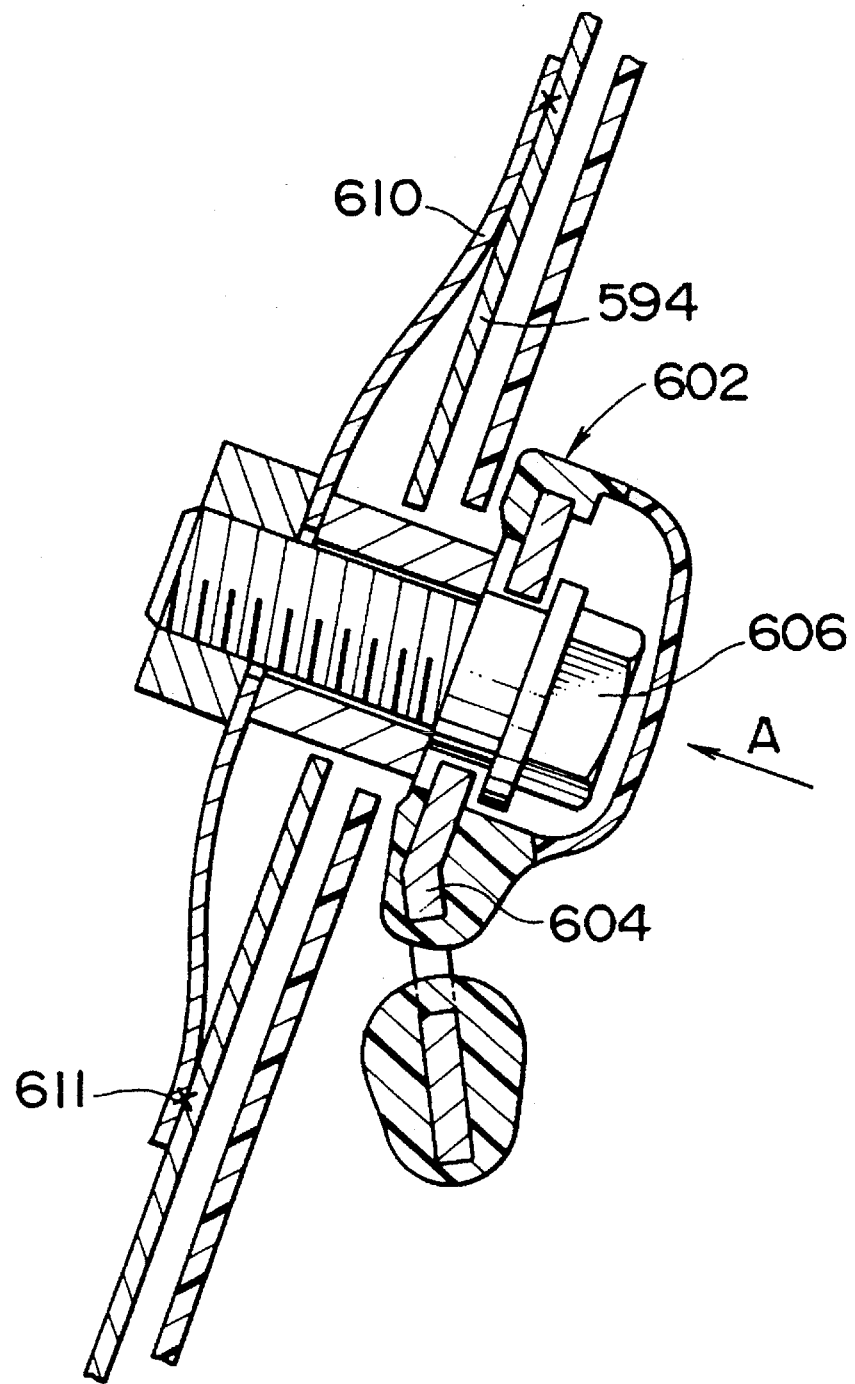
FIG. 53 is a sectional view showing the operation of the seat belt device for the automobile shown in FIG. 52.

In an embodiment shown in FIGS. 51 through 53, a center pillar 592 is composed of a pillar inner panel 594 and a pillar outer panel 596 disposed on the outside of the pillar inner panel 594. On the other hand, a seat belt anchor 602 includes an anchor plate 604 for slidably supporting the seat belt 434, a bolt 606 for mounting the anchor plate 604, and a nut 608 for screwing the bolt 606.

A spacer 612 is attached to a deformable plate 610 welded with the nut 608 at the center portion, and the bolt 606 is screwed into the nut 608 through the spacer 612 to mount the bolt 606 on the center portion of the plate 610. The plate 610 is welded at a peripheral edge portion to the outside surface of the pillar inner panel 594. As a result, a displacement permission space 614 is defined between the plate 610 and the pillar outer panel 596. The pillar inner panel 594 is covered with a garnish 616.

When a load outward of the compartment in the direction indicated by an arrow A is applied to the seat belt anchor 602, the bolt 606 is displaced. With the displacement of the bolt, the plate 610 is deformed outward as shown in FIG. 53, and as a result, the energy is absorbed by the deformation of the plate. Further, when the load becomes larger, a weld portion 611 of the plate 610 is broken to absorb the energy. According to the mode described above, in case of having the deformable plate fixed to the bolt of the seat belt anchor, since a tensile load applied to the seat belt is received by the pillar inner panel and the plate, the sufficient strength can be ensured. On the other hand, since the plate is deformed by the load outward of the compartment to absorb the energy, the amount of energy to be absorbed can be adjusted by selecting the thickness of the plate.

Figure 54:
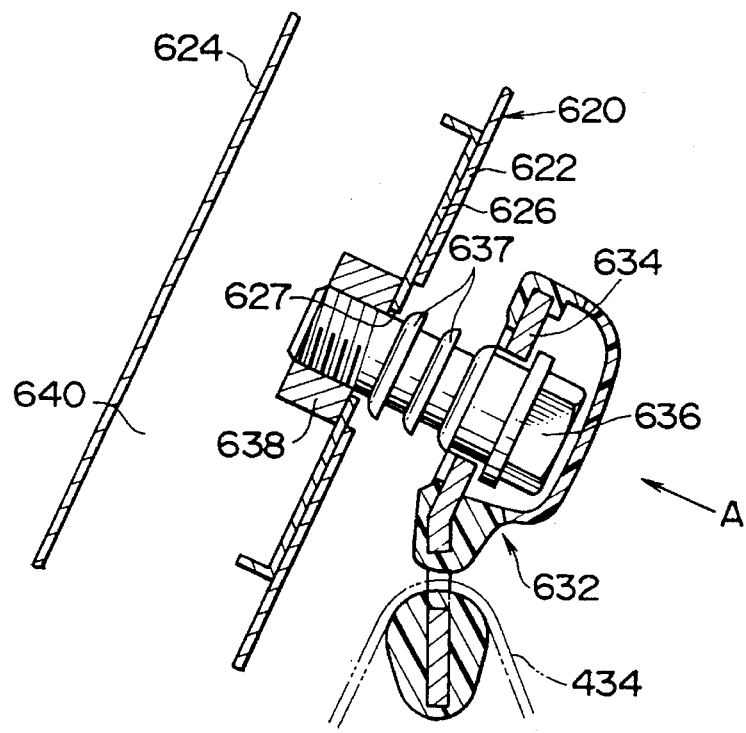
FIG. 54 is a sectional view taken along a substantially vertical plane of a seat belt device for an automobile as a yet further embodiment according to the present invention.
Figure 55:
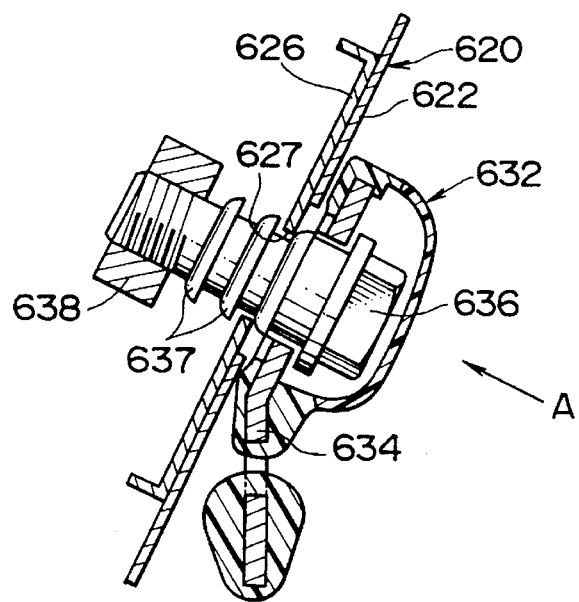
FIG. 55 is a sectional view showing the operation of the seat belt device for the automobile shown in FIG. 54.

In an embodiment shown in FIGS. 54 and 55, a center pillar 620 is composed of a pillar inner panel 622, a pillar outer panel 624 spaced outward from the pillar inner panel 622, and a reinforcing panel 626 welded to the outside surface of the pillar inner panel 622. On the other hand, a seat belt anchor 632 includes an anchor plate 634 for slidably supporting the seat belt 434, a bolt 636 for mounting the anchor plate 634, and a nut 638 welded to the outside surface of the reinforcing panel 626.

The bolt 636 has a plurality of projections 637 (two projections in the illustrated embodiment) at intervals in the axial direction. The outer diameter of each projection 637 is larger than the bore of the bolt hole 627 of the reinforcing panel 626. In the illustrated embodiment, each projection 637 extends over the whole periphery in the circumferential direction and is tapered outward. Otherwise, a plurality of cylindrical or spherical protuberance portions each having a small outer diameter can be irregularly arranged to constitute the projections as well. On the other hand, the welding strength of the nut 638 is determined such that the nut is broken by a load of a predetermined value outward of the compartment in the direction indicated by an arrow A. When the bolt 636 is screwed into the nut 638 and mounted on the center pillar 620, a displacement permission space 640 is defined between the nut 638 and the pillar outer panel 624.

When a load of not less than a predetermined value outward of the compartment in the direction indicated by an arrow A is applied to the seat belt anchor 632, the weld portion of the nut 638 is broken, and the projections 637 of the bolt 636 force the hole 627 of the reinforcing panel 626 open to be deformed. Then, the bolt 636 is displaced outward, and as a result, the energy is absorbed by the breakage of the weld portion of the nut and the deformation of the hole of the reinforcing panel. Incidentally, in case of having no reinforcing panel, the nut 638 is welded to the pillar inner panel 622, and the hole of the pillar inner panel 622 is deformed by the projections 637 of the bolt 636. According to the mode described above, the energy can be absorbed only by modifying the shape of the bolt.

In an embodiment shown in FIG. 56, a center pillar 650 is composed of a pillar inner panel 652, and a pillar outer panel 654 spaced outward from the pillar inner panel 652. On the other hand, a seat belt anchor 662 includes an anchor plate 664 for slidably supporting the seat belt 434, and a bolt 666 for mounting the anchor plate 664.

Further, the seat belt anchor includes a means 670 composed of a support portion 672, a pin 673 and a hole 674 and for mounting the anchor plate 664 on the pillar inner panel 652 of the center pillar 650. The bolt 666 extending through the anchor plate 664 is screwed into the pin 673 and mounted. The pin 673 takes the shape of a truncated cone, and has an outwardly taper surface 675. The pin 673 is mounted on the pillar inner panel 652 by the support portion 672, and the taper surface 675 is capable of advancing into the hole 674 of the pillar inner panel 652. A displacement permission space 678 is defined between the pillar inner panel 652 and the pillar outer panel 654.

Figure 56A:
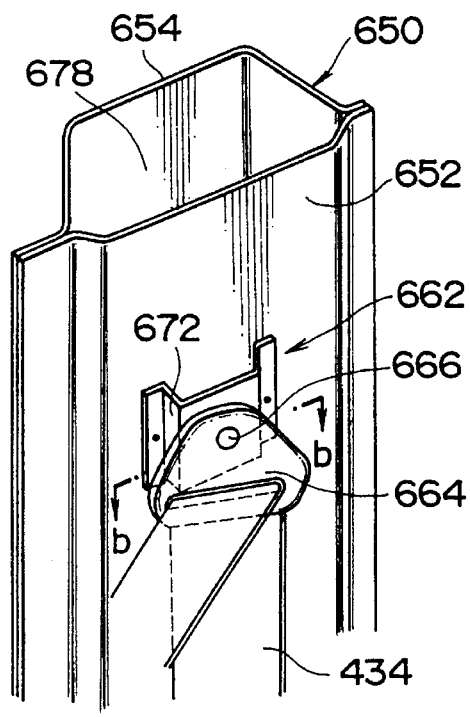
FIG. 56(a) is a perspective view showing the same.
Figure 56B:
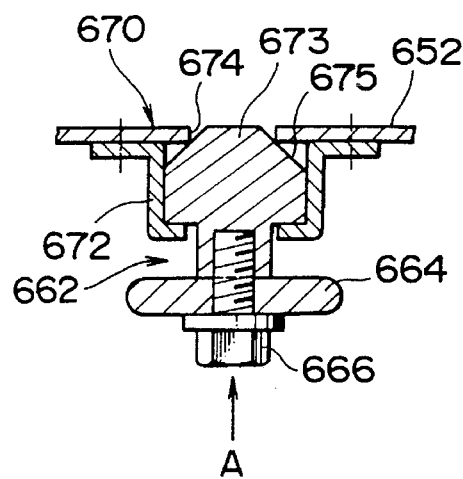
FIG. 56(b) is a sectional view taken along a line b—b in FIG. 56(a)
Figure 56C:
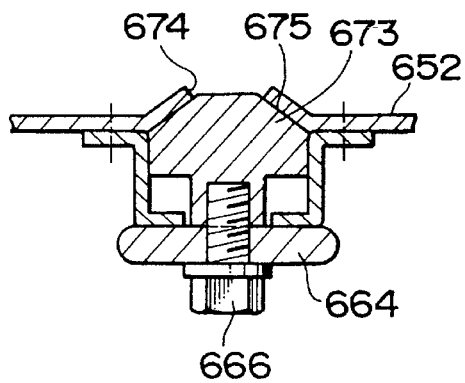
FIG. 56(c) is a sectional view showing the operation of the same.
Figure 56D:
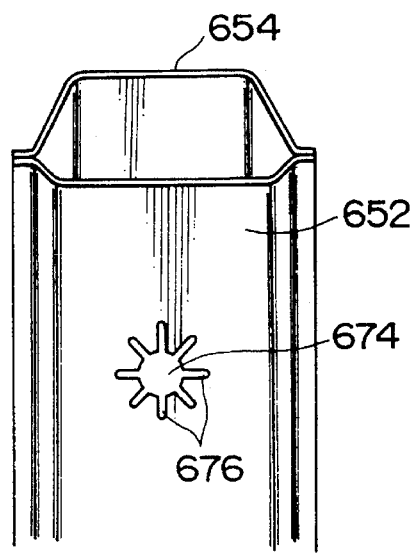
FIG. 56(d) is a perspective view showing a center pillar.

When a load outward of the compartment in the direction indicated by an arrow A is applied to the seat belt anchor 662, the taper surface 675 of the pin 673 is advanced into the hole 674 of the pillar inner panel 652 to deform the peripheral edge portion of the hole 674, as shown in FIG. 56(c) and as a result, the energy is absorbed. In this case, as shown in FIG. 56(d), the hole 674 of the pillar inner panel 652 is preferably provided with a plurality of radial slits 676 to surely deform the peripheral edge portion of the hole 674. According to the mode described above, the energy absorption characteristic can be varied only by modifying the shape of the hole of the pillar inner panel.

Figure 57A:
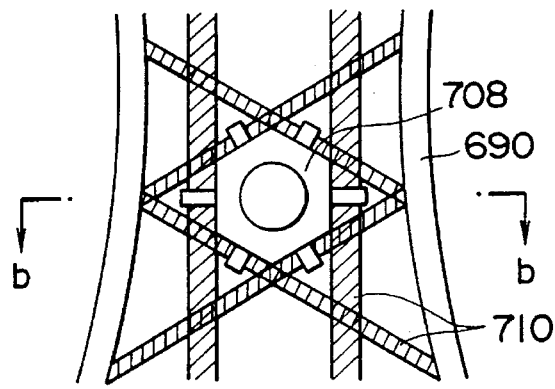
FIG. 57(a) is a front view showing energy absorbing means.
Figure 57B:
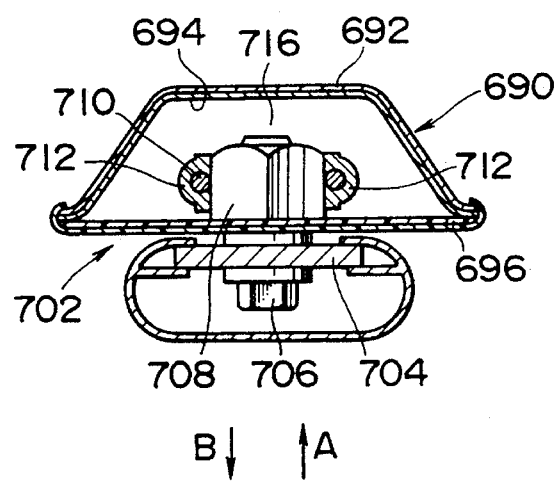
FIG. 57(b) is a sectional view taken along a line b—b in FIG. 57(a)
Figure 57C:
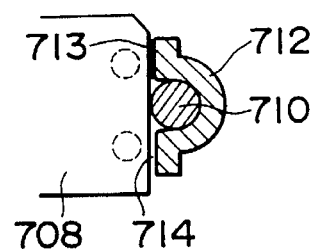
FIG. 57(c) is a sectional view similar to that of FIG. 57(b) and showing a connection portion between a nut and a wire on an enlarged scale.

In an embodiment shown in FIG. 57, a center pillar 690 is composed of a pillar outer panel 692 and a reinforcing panel 694. Any inner panel is not provided on a mounting portion of the seat belt anchor 702, and the center pillar 690 is covered with a garnish 696. On the other hand, a seat belt anchor 702 includes an anchor plate 704 for supporting the seat belt, a bolt 706 for mounting the anchor plate 704, and a nut 708 for screwing the bolt 706.

Further, a plurality of wires 710 are provided as a means for mounting the nut 708 on the center pillar 690. The wires 710 are stretched across the nut 708 and fixed to the center pillar 690. The wires 710 and the nut 708 are connected together such that the nut 708 and a fitting 712 having an approximately U-like shape are welded to each other at a portion 713 of the fitting 712 on the outside of the wire 710, while both the nut and the fitting are not welded or slightly welded to each other at a portion 714 of the fitting on the inside of the wire 710. As a result, a displacement permission space 716 is defined between the nut 708 and the reinforcing panel 694.

When a load inward of the compartment in the direction indicated by an arrow B is received such as to fulfill the original function of the seat belt device, the wires 710 can be prevented from detaching from the nut by the weld portion 713 between the nut 708 and the fitting 712. Therefore, the load in the direction indicated by the arrow B can be received by the elasticity of the wires 710. On the other hand, when a load outward of the compartment in the direction indicated by an arrow A is applied, the wires 710 are firstly extended to absorb the energy. In case that a larger load is applied, the wires 710 are detached from the portion 714, and as a result, the energy is absorbed.

According to the mode described above, the energy can be absorbed by the elasticity of the wires. Further, when a load is increased, the nut is detached from the wires to absorb the energy.

Figure 58:
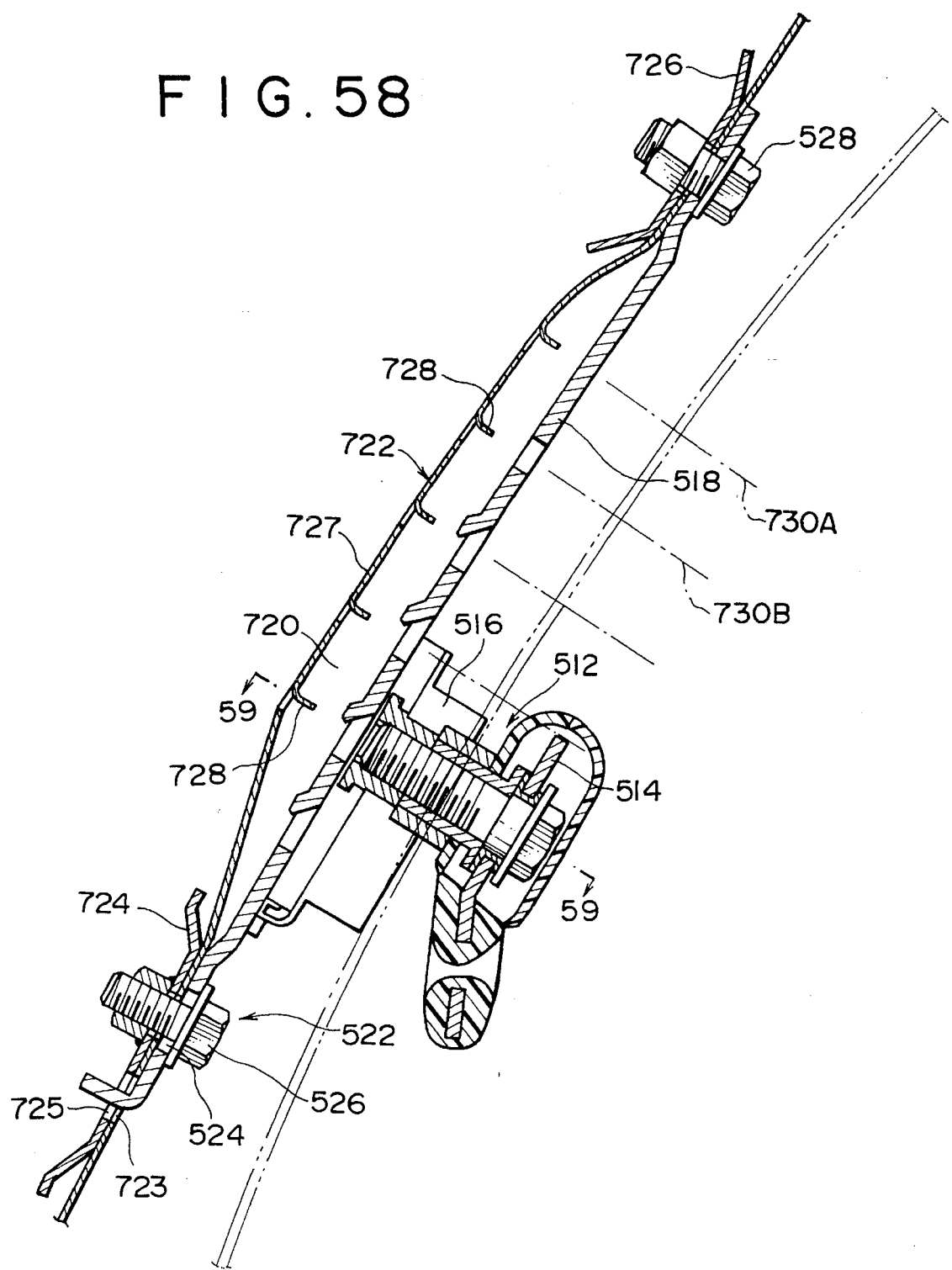
FIG. 58 is a sectional view taken along a substantially vertical plane of a seat belt device for an automobile as a yet further embodiment according to the present invention.

FIG. 58 shows a modification in the embodiment of FIG. 45, wherein the displacement permission space 720 is made narrower and the center pillar inner panel 722 is formed to absorb energy, but otherwise, it has substantially the same constitution as that of FIG. 45. Therefore, we explain the modified portions. In this embodiment, plates 724, 726 are applied respectively to portions of the bolts 526, 528 for connecting the pillar inner panel 722 and the rail 518 for reinforcement. The lower reinforcing plate 724 has a long hole 725, and the pillar inner panel 722 has a long hole 723 coinciding with the long hole 725. The lower end of the rail 518 is bent, and this bent portion is inserted into the long holes 723, 725.

Figure 59:
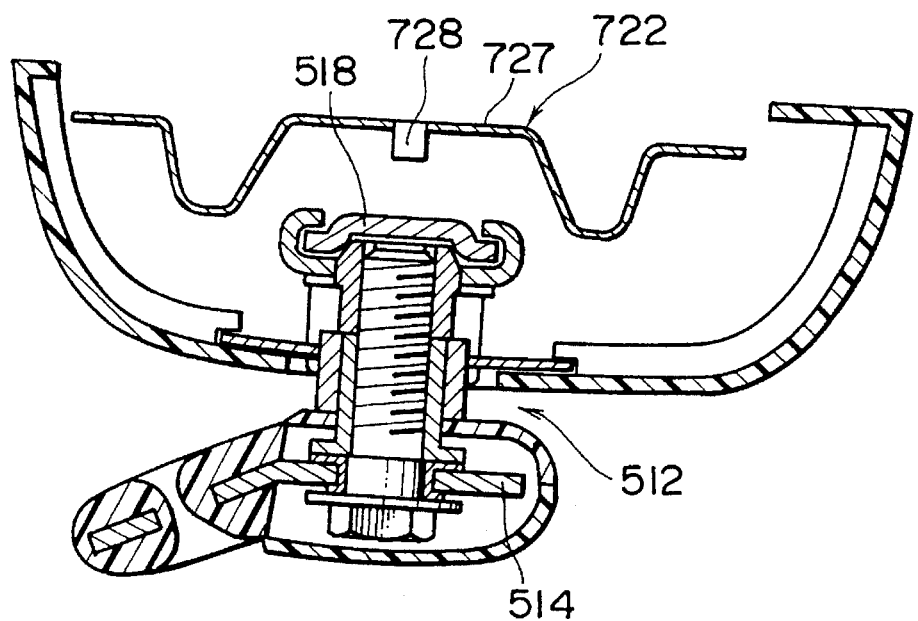
FIG. 59 is a sectional view taken along a line 59—59 in FIG. 58, and showing an anchor plate which is turned for the convenience of explanation.

As shown in FIGS. 58 and 59, the bottom 727 of the pillar inner panel 722 is provided with a plurality of cut and risen portions. Each cut and risen portion 728 has a hole opened by press fabrication, simultaneously by rising a part and is located in correspondence to the positions 730A, 730B . . . , where the seat belt anchor 512 is fixed to the rail and extends toward the rail 518. Before the rail 518 comes to the bottom 727 of the pillar inner panel 722 and is prevented from further deformation, the rail comes to the cut and risen portion 728 to deform it, and absorb the energy there, to begin with. Thereafter, the rail 518 comes to the bottom 727 of the pillar inner panel 722.

Figure 62:
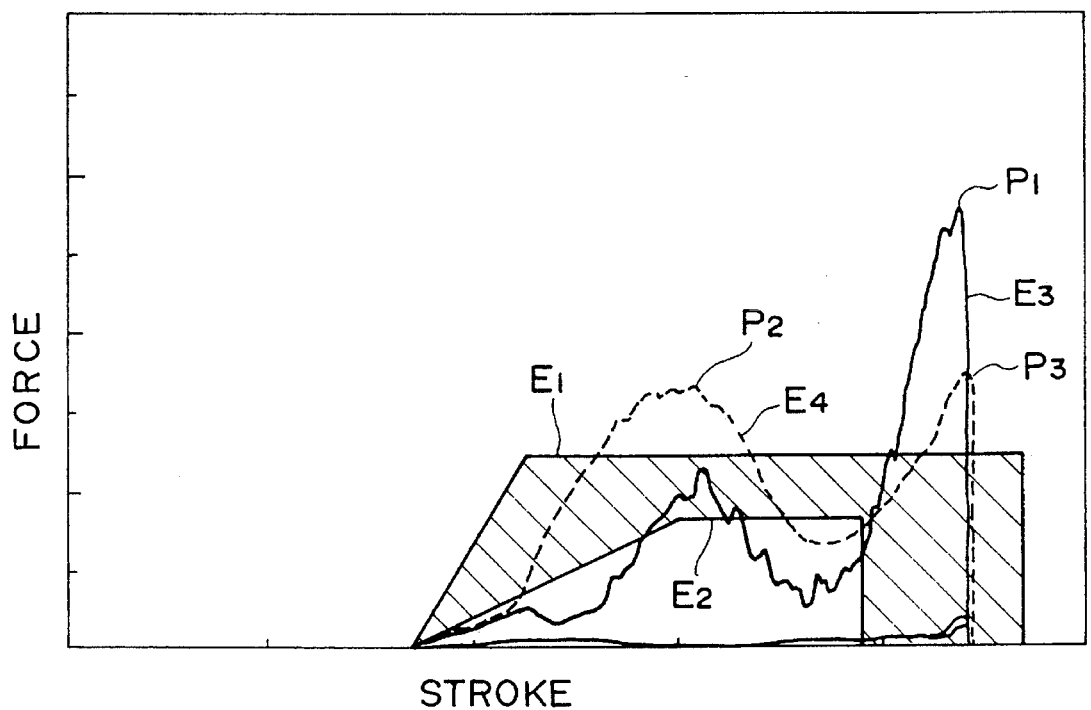
FIG. 62 is a characteristic graph showing the relation between the force and the stroke.

The hatching in FIG. 62 shows an ideal energy absorbing characteristic, with $E_1$ and $E_2$ respectively showing an upper limit value and a lower limit value. In the embodiment $E_3$ of FIG. 45 where a pillar inner panel has no means for energy absorption, a great peak value $P_1$ occurs when the rail butts against the bottom of the pillar inner panel, and the characteristic in the stroke is far off from the ideal characteristic. On the other hand, when another energy absorbing means such as a cut and risen portions is deformed before the rail butts against the bottom of the pillar inner panel, a peak value $P_2$ occurs at the time, and thereafter, a characteristic $E_4$ is obtained, in which a peak value $P_3$ occurs when the rail butts against the bottom of the pillar inner panel. The peak values $P_2$ and $P_3$ are smaller than the peak value 1, so that an impact can be reduced. Also, the characteristic as a whole can be brought close to the ideal characteristic.

Figure 60:
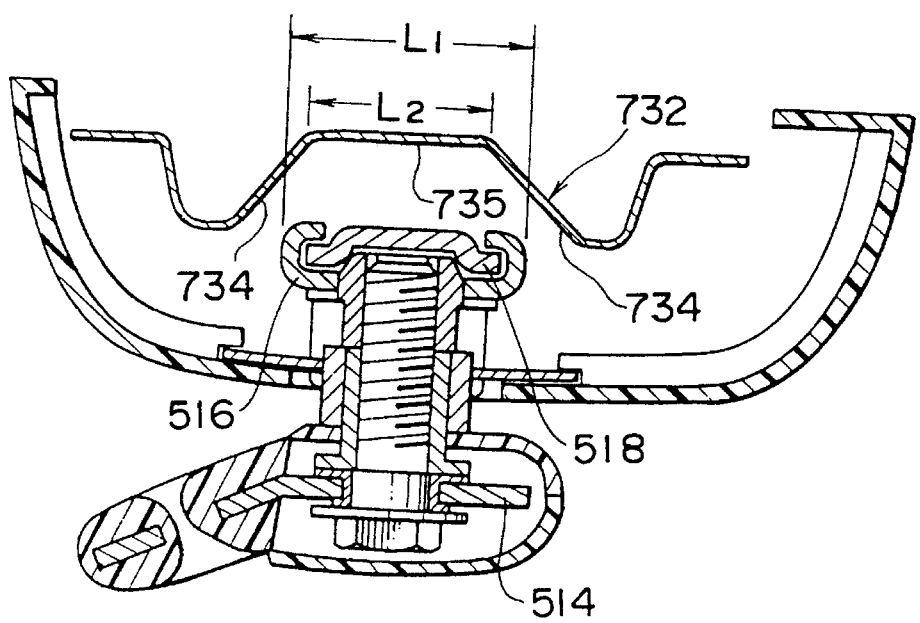
FIG. 60 is a sectional view similar to that of FIG. 59, and showing a yet further embodiment according to the present invention.

In the embodiment of FIG. 60, the pillar inner panel 732 includes a pair of outwardly tapered surfaces in plane, i.e. horizontal section, as well as a flat bottom 735. The width $L_1$ of the slider 516 and the width $L_2$ of the bottom 735 of the pillar inner panel 732 have a relation of $L_1 > L_2$. Accordingly, the rail 518 or the slider 516, before butting against the bottom 735, butts against the pair of surfaces 734 to deform the pair of the surfaces 734 and absorb the energy.

Figure 61:
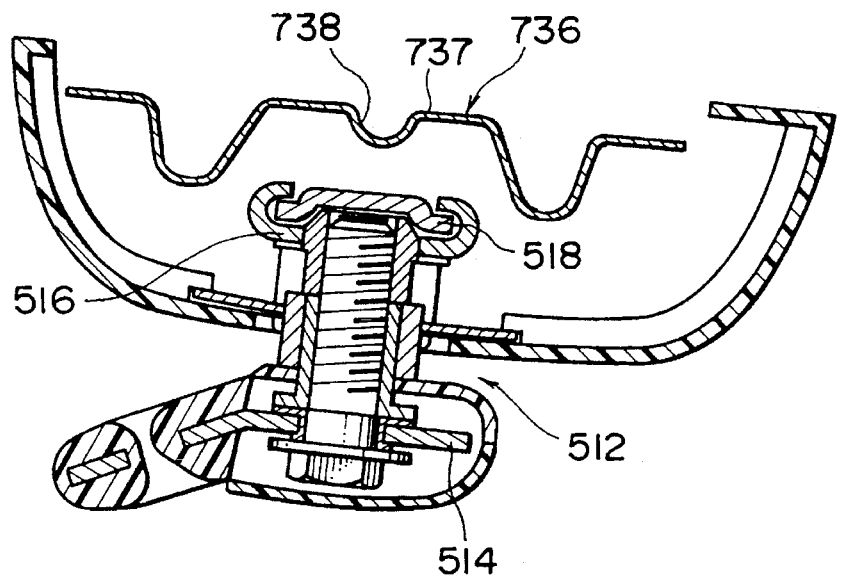
FIG. 61 is a sectional view similar to that of FIG. 59, and showing a yet further embodiment according to the present invention.

In the embodiment of FIG. 61, the pillar inner panel 736 has a plurality of protrusions 738 protruding inward from the bottom 737. Each protrusion 738, similarly to the cut and risen portion 728 in FIG. 58, is positioned in correspondence to the position where the seat belt anchor 512 is fixed. In the illustrated embodiment, the protrusions 738 are hemispherical beads. In this embodiment, too, the inner panel 736 has a pair of tapered surfaces, while the rail 518 or slider 516 does not contact the tapered surfaces but butts against the protrusions 738 before butting against the bottom 737, to deform the protrusions.

Auxiliary energy absorbing means, so to speak, are also applicable to the embodiments shown in FIGS. 37 through 40.

What is claimed is:

1. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy, the displacement permission space being in the range of 10 to 30 mm; and an energy absorbing means disposed in said displacement permission space.

2. A seat belt device for an automobile according to claim 1, wherein said displacement permission space includes at least one of a space between at least two of the plurality of parts of said seat belt anchor and a space between at least one of the plurality of parts of said seat belt anchor and said center pillar.

3. A seat belt device for an automobile according to claim 2, wherein a plurality of displacement permission spaces and a plurality of absorbing means are respectively provided.

4. A seat belt device for an automobile according to claim 2, wherein said absorbing means has rigidity against a load inward of a compartment and rigidity against a load outward of the compartment, the latter being lower than the former.

5. A seat belt device for an automobile according to claim 2, wherein the plurality of parts of said seat belt anchor include an anchor plate for supporting said seat belt, a bolt for fixing said anchor plate and having a short head, and a cap mounted on said anchor plate, and wherein said displacement permission space is defined between the head of said bolt and said cap.

6. A seat belt device for an automobile according to claim 2, wherein the plurality of parts of said seat belt anchor include an anchor plate for supporting said seat belt, and a bolt having a spacing portion and for mounting said anchor plate on said spacing portion displaceably outward of the compartment, wherein said displacement permission space includes one of a space between said anchor plate and said center pillar and a space between said anchor plate and a slider provided as one of the plurality of parts of said seat belt anchor and mounted movably on said center pillar, and wherein said absorbing means comprises a deformable spacer disposed in said displacement permission space.

7. A seat belt device for an automobile according to claim 2, wherein the plurality of parts of said seat belt anchor include a ring allowing for the piercing of said seat belt, and an anchor plate for supporting said ring such that said ring is capable of swinging outward of the compartment, wherein said displacement permission space is defined on the outside of said ring, and wherein said absorbing means is constituted by utilizing the friction between said ring and said anchor plate.

8. A seat belt device for an automobile according to claim 1, wherein said displacement permission space is defined so as to permit at least one of said part mounted by said mounting means and said mounting means to displace outward of the compartment, and wherein said one of said part and said mounting means is deformed in said displacement permission space to absorb energy.

9. A seat belt device for an automobile according to claim 8, wherein one of said part mounted by said mounting means and said mounting means has rigidity against a load inward of the compartment and rigidity against a load outward of the compartment, the latter being lower than the former.

10. A seat belt device for an automobile according to claim 8, wherein a plurality of displacement permission spaces are provided to absorb energy at a plurality of portions.

11. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, a bolt for fixing said anchor plate and having a step portion pressed against said anchor plate and a spacing portion extending from the step portion, and a cap mounted on the spacing portion of said bolt, wherein said displacement permission space is defined between said cap and the step portion of said bolt, and wherein said absorbing means comprises a plurality of projections provided on said bolt, and a claw provided on said cap and capable of getting over said projections.

12. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate having a hole allowing for the piercing of said seat belt and a support portion for supporting said seat belt, a cushion for covering a portion of said support portion located at least below said hole, and a cover having a low frictional coefficient and covering at least a portion of the cushion contacting with the seat belt, wherein said displacement permission space is defined as a compressible range of said cushion, and wherein said absorbing means is constituted by said cushion.

13. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, and a bolt having a spacing portion and for mounting said anchor plate on said spacing portion, wherein said displacement permission space is defined between said anchor plate and said center pillar, and wherein said absorbing means comprises a plurality of projections provided on the spacing portion of said bolt and a claw provided on said anchor plate and capable of getting over said projections.

14. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, a bolt for fixing said anchor plate, a rail fixed to said center pillar, a slider movable along said rail, and a nut for screwing said bolt and fixed to said slider, wherein said displacement permission space is defined between said rail and said slider, and wherein said absorbing means comprises a means for fixing said nut to said slider.

15. A seat belt device for an automobile according to claim 14, wherein said fixing means comprises a claw provided on said slider.

16. A seat belt deice for an automobile according to claim 14, wherein said fixing means comprises a caulking portion of said nut to said slider.

17. A seat belt device for an automobile according to claim 14, wherein said fixing means comprises a C-ring.

18. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, a bolt for fixing said anchor plate, a rail embedded in said center pillar, a slider disposed in said center pillar movably along said rail, a nut for screwing said bolt and fixed to said slider, and a plate disposed on the inside of the compartment apart from said center pillar and connected to said slider at one end, wherein said displacement permission space is defined between said rail and said slider, and said absorbing means is constituted by the other end of said plate hooked by the hole of said slider.

19. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, a bolt for fixing said anchor plate, a rail fixed to said center pillar, a slider movable along said rail, and a nut for screwing said bolt and mounted on said slider immovably inward of the compartment and movably outward of the compartment, wherein said displacement permission space is defined between said rail and said nut, and wherein said absorbing means is constituted by a deformable part disposed in said displacement permission space.

20. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, a bolt for fixing said anchor plate, a rail embedded in said center pillar and having a pair of outwardly tapered constraint portions provided on the outside of the compartment, a slider movable along said rail and capable of being deformed by the constraint portions of said rail, and a nut for screwing said bolt and fixed to said slider, wherein said displacement permission space is defined between said rail and said slider, and said absorbing means is constituted by the constraint portions of said rail and said slider.

21. A seat belt device for an automobile according to claim 20, wherein the plurality of parts of said seat belt anchor further include a plate disposed between said center pillar and said anchor plate, wherein another displacement permission space is defined between said plate and said center pillar, and wherein another absorbing means is constituted by said plate.

22. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, a bolt for fixing said anchor plate, a rail having a plurality of positioning holes at intervals in the vertical direction and embedded in said center pillar, a slider movable along said rail and having a lock plate capable of being inserted into and drawn out of each positioning hole of said rail, and a nut for fixing said bolt to said slider, wherein said displacement permission space is defined between said rail and said lock plate, and wherein said absorbing means is constituted by said lock plate.

23. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate having a support portion for supporting said seat belt, a fixed portion and a connection portion extending in an approximately U-like shape from the support portion to the fixed portion, and a bolt having a spacing portion and for mounting the fixed portion of said anchor plate on said spacing portion, wherein said displacement permission space is defined between the fixed portion of said anchor plate and said center pillar, and wherein said absorbing means is constituted by the connection portion of said anchor plate disposed in said displacement permission space so as to be capable of extending by a load outward of the compartment.

24. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space includes at least one of a space between at least two of the plurality of parts of said seat belt anchor and a space between at least one of the plurality of parts of said seat belt anchor and said center pillar, wherein the plurality of parts of said seat belt anchor include an anchor plate for supporting said seat belt, and a bolt having a spacing portion and for mounting said anchor plate on said spacing portion displaceably outward of the compartment, wherein said displacement permission space includes one of a space between said anchor plate and said center pillar and a space between said anchor plate and a slider provided as one of the plurality of parts of said seat belt anchor and mounted movably on said center pillar, and wherein said absorbing means comprises a deformable spacer disposed in said displacement permission space, wherein said spacer comprises a first spacer piece having a concave portion at a portion facing to said center pillar or said slider, and a second spacer piece having a convex portion at a portion facing to said first spacer piece and disposed between said anchor plate and said first spacer piece.

25. A seat belt device for an automobile according to claim 24, wherein the plurality of parts of said seat belt anchor further include a rail for movably supporting said slider, and a nut disposed between said rail and said slider for fixing said bolt to said slider, wherein another displacement permission space is defined between said rail and said slider, and wherein another energy absorbing means comprises a claw for fixing said nut to said slider.

26. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space is defined so as to permit at least one of said part mounted by said mounting means and said mounting means to displace outward of the compartment, wherein said one of said part and said mounting means is deformed in said displacement permission space to absorb energy, wherein the plurality of parts of said seat belt anchor include an anchor plate for supporting said seat belt, a slider for mounting said anchor plate, and a rail for supporting said slider so as to be capable of adjusting the height of said slider, and mounted on said center pillar, and wherein the height of said seat belt anchor is made adjustable.

27. A seat belt device for an automobile according to claim 26, wherein said displacement permission space is defined between said rail and said center pillar, and wherein said mounting means includes an energy absorbing part disposed in said displacement permission space.

28. A seat belt device for an automobile according to claim 27, wherein said energy absorbing part is formed cylindrically and has zigzag-shaped notches on both axial ends.

29. A seat belt device for an automobile according to claim 26, wherein said displacement permission space is defined between said rail and said center pillar, wherein said mounting means comprises at least one hole provided in said center pillar, and one end of said rail inserted into said hole inseparably by the load inward of the compartment and separably by the load outward of the compartment, and wherein the energy is absorbed by the separation of one end of said rail and the deformation of said rail.

30. A seat belt deice for an automobile according to claim 26, wherein said displacement permission space is defined between said rail and said center pillar, wherein said mounting means comprises a slot provided at least in one end of said rail such that the longer axis of the slot extends in the vertical direction, and a bolt inserted through said slot and screwed into said center pillar such that said one end of said rail is made slidable by the load outward of the compartment, and wherein the energy is absorbed by the sliding of said one end of said rail and the deformation of said rail.

31. A seat belt device for an automobile according to claim 26, wherein said displacement permission space is defined between said rail and said center pillar, wherein said rail is embedded in said center pillar and mounted on said center pillar at two portions on the upper and lower ends, wherein said slider is movably mounted on said center pillar inseparably by the load inward of the compartment and separably by the load outward of the compartment, and wherein the energy is absorbed by the separation of said slider and by the deformation of said rail caused by the contact of the slider with said rail.

32. A seat belt device for an automobile according to claim 26, further comprising:

a garnish disposed on the inside of said center pillar of said automobile and capable of absorbing energy, wherein said garnish is deformed by said anchor plate to absorb the energy.

33. A seat belt device for an automobile according to claim 26, further comprising:

a garnish disposed on the inside of said center pillar of said automobile and capable of absorbing energy while being deformed by said anchor plate, wherein said rail is embedded in said center pillar and has a pair of outwardly tapered constraint portions provided on the outside of the compartment, and wherein said displacement permission space is defined between said slider and said constraint portions of said rail, and wherein said slider is made deformable by the constraint portions of said rail.

34. A seat belt device for an automobile according to claim 33, wherein the plurality of parts of said seat belt anchor further include a bolt for mounting said anchor plate on said slider, and a plate disposed between said center pillar and said anchor plate so as to surround said bolt, and capable of being deformed by said center pillar, and wherein another displacement permission space is defined between said plate and said center pillar.

35. A seat belt device for an automobile according to claims 27, 28 or 30, wherein said center pillar includes a pillar inner panel defining said displacement permission space between said pillar inner panel and said rail, said pillar inner panel having another energy absorbing means capable of deforming by the contact with one of said rail and said slider before one of said rail and said slider comes to the bottom of the pillar inner panel and is prevented from deforming further when the seat belt anchor is displaced outward of the compartment.

36. A seat belt device for an automobile according to claim 35, wherein said pillar inner panel has a pair of outwardly tapered surfaces in plane and the bottom disposed at the outward ends of the pair of surfaces, and wherein said energy absorbing means is constituted by said pair of surfaces.

37. A seat belt device for an automobile according to claim 35, wherein said energy absorbing means is constituted by cut and risen portions provided in said bottom.

38. A seat belt device for an automobile according to claim 35, wherein said energy absorbing means is constituted by protrusions extending inward from said bottom.

39. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space is defined so as to permit at least one of said part mounted by said mounting means and said mounting means to displace outward of the compartment, wherein said one of said part and said mounting means is deformed in said displacement permission space to absorb energy, wherein said center pillar comprises a pillar inner panel, a pillar outer panel disposed on the outside of said pillar inner panel, wherein said mounting means has a deformable plate fixed at a peripheral edge portion to the outside surface of said pillar inner panel and fixed at a center portion to a bolt provided as one of the plurality of parts of said seat belt anchor, and said displacement permission space is defined between said plate and said pillar outer panel.

40. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space is defined so as to permit at least one of said part mounted by said mounting means and said mounting means to displace outward of the compartment, wherein said one of said part and said mounting means is deformed in said displacement permission space to absorb energy, wherein said center pillar comprises a pillar inner panel having a hole and a pillar outer panel disposed on the outside of said pillar inner panel, wherein the plurality of parts of said seat belt anchor include a bolt having a plurality of projections on the outer peripheral surface at intervals in the axial direction, and a nut aligned with the hole for screwing said bolt and fixed to said pillar inner panel, wherein said displacement permission space is defined between said nut and said pillar outer panel, and wherein the energy is absorbed by expanding and deforming the hole of said pillar inner panel by the projections of said bolt.

41. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space is defined so as to permit at least one of said part mounted by said mounting means and said mounting means to displace outward of the compartment, wherein said one of said part and said mounting means is deformed in said displacement permission space to absorb energy, wherein said center pillar is composed of a pillar inner panel, and a pillar outer panel disposed on the outside of said pillar inner panel, wherein said mounting means comprises a support portion provided on said pillar inner panel, a pin for mounting the anchor plate provided as one of the plurality of parts of said seat belt anchor, said pin being supported by said support portion and having a taper surface at a portion facing to said pillar inner panel, and a hole provided in said pillar inner panel so as allow for the advance of the taper surface of said pin, wherein said displacement permission space is defined between said pillar inner panel and said pillar outer panel, and wherein the energy is absorbed by deforming the peripheral edge portion of the hole by advancing the taper surface of said pin into said hole.

42. A seat belt device for an automobile including a seat belt anchor mounted on a center pillar for the automobile and composed of a plurality of parts, and a seat belt slidably supported by the seat belt anchor, comprising:

a means for mounting one of the plurality of parts of said seat belt anchor on said center pillar;

a displacement permission space for permitting at least one selected from at least one of the plurality of parts of said seat belt anchor and said mounting means to displace outward of a compartment to absorb energy; and an energy absorbing means disposed in said displacement permission space, wherein said displacement permission space is defined so as to permit at least one of said part mounted by said mounting means and said mounting means to displace outward of the compartment, wherein said one of said part and said mounting means is deformed in said displacement permission space to absorb energy, wherein the plurality of parts of said seat belt anchor include an anchor plate for supporting the seat belt, a bolt for mounting said anchor plate, and a nut fixed to said bolt with screwing, and wherein said mounting means includes a plurality of wires stretched across said nut and fixed to said center pillar.

* * * * *